(12) United States Patent
Savolainen

(10) Patent No.: US 10,725,886 B2
(45) Date of Patent: Jul. 28, 2020

(54) CAPACITY PLANNING METHOD

(71) Applicant: DB PRO OY, Espoo (FI)

(72) Inventor: Jani K. Savolainen, Espoo (FI)

(73) Assignee: DB PRO OY, Helsinki (FI)

( * ) Notice: Subject to any disclaimer, the term of this patent is extended or adjusted under 35 U.S.C. 154(b) by 224 days.

(21) Appl. No.: 15/772,334

(22) PCT Filed: Oct. 21, 2016

(86) PCT No.: PCT/FI2016/050743
§ 371 (c)(1),
(2) Date: Apr. 30, 2018

(87) PCT Pub. No.: WO2017/077178
PCT Pub. Date: May 11, 2017

(65) Prior Publication Data
US 2018/0314616 A1    Nov. 1, 2018

Related U.S. Application Data

(60) Provisional application No. 62/260,042, filed on Nov. 25, 2015.

(30) Foreign Application Priority Data

Nov. 2, 2015    (FI) ...................................... 20155792

(51) Int. Cl.
*G06F 9/46* (2006.01)
*G06F 11/34* (2006.01)
(Continued)

(52) U.S. Cl.
CPC .......... *G06F 11/3442* (2013.01); *G06F 9/505* (2013.01); *G06F 9/5061* (2013.01);
(Continued)

(58) Field of Classification Search
None
See application file for complete search history.

(56) References Cited

U.S. PATENT DOCUMENTS 8,015,454 B1    9/2011    Harrison et al.
9,093,840 B2 *    7/2015    Sun .......................... H02J 3/00
(Continued)

OTHER PUBLICATIONS

Extended European Search Report issued by the European Patent Office in relation to European Application No. 16861669.6 dated May 20, 2019 (10 pages).
(Continued)

*Primary Examiner* — Kenneth Tang
(74) *Attorney, Agent, or Firm* — Robert P. Michal, Esq.; Carter, DeLuca & Farrell LLP

(57) ABSTRACT

A method for capacity planning of a DBSM network, includes selecting at least one RESOURCE against which the TARGET_SYSTEM will be optimized, selecting at least one performance counter for which a planning engine forecast is created, collecting said performance counter MONITORING_DATA, defining rules for each performance counter against which a predicted TIME_SERIES is validated, adjusting SOURCE_SYSTEM OBJECT CONSTRAINTS and TIME_SERIES data, defining TARGET_SYSTEM LOGICAL_TOPOLOGY with desired OBJECTS setup, preferred configurations, maximum count for each setup OBJECT type and possible processing order, adjusting TARGET_SYSTEM OBJECT CONSTRAINTS, benchmarks and TIME_SERIES data, evaluating and comparing all needed refactored SOURCE_SYSTEM OBJECT TIME_SERIES against given TARGET_SYSTEM with preconfigured LOGICAL_TOPOLOGY and processing order of OBJECT SETUP_DATA to have minimum amount of primary target RESOURCE defined in total for all TARGET_SYSTEM host servers meeting their respective CONSTRAINTS and outputting results. The invention also relates to a computer program product for implementing said method.

18 Claims, 12 Drawing Sheets

(51) Int. Cl.
*G06F 9/50* (2006.01)
*G06F 16/00* (2019.01)

(52) U.S. Cl.
CPC .......... *G06F 9/5077* (2013.01); *G06F 9/5083* (2013.01); *G06F 11/34* (2013.01); *G06F 11/3428* (2013.01); *G06F 11/3433* (2013.01); *G06F 11/3447* (2013.01); *G06F 11/3452* (2013.01); *G06F 16/00* (2019.01); *G06F 2201/80* (2013.01); *G06F 2201/815* (2013.01); *G06F 2209/506* (2013.01); *G06F 2209/5014* (2013.01)

(56) References Cited

U.S. PATENT DOCUMENTS

| | | | |
|---|---|---|---|
| 9,824,319 | B2 * | 11/2017 | Sun .................. G06F 16/25 |
| 2006/0074970 | A1 | 4/2006 | Narayanan et al. |
| 2007/0083500 | A1 | 4/2007 | Zibitsker |
| 2007/0283326 | A1 | 12/2007 | Consolatti et al. |
| 2008/0033991 | A1 | 2/2008 | Basak et al. |
| 2008/0140469 | A1 * | 6/2008 | Iqbal .................. G06Q 10/04 705/7.37 |
| 2009/0187606 | A1 | 7/2009 | Allweil et al. |
| 2010/0083248 | A1 | 4/2010 | Wood et al. |
| 2010/0250748 | A1 | 9/2010 | Sivasubramanian et al. |
| 2011/0307291 | A1 * | 12/2011 | Rolia .................. G06Q 10/06 705/7.25 |
| 2013/0042003 | A1 | 2/2013 | Franco et al. |
| 2013/0085984 | A1 | 4/2013 | Burger et al. |
| 2014/0258254 | A1 | 9/2014 | Suleiman et al. |

OTHER PUBLICATIONS

International Search Report issued by the Finnish Patent and Registration Office acting as the International Searching Authority in relation to International Application No. PCT/FI2016/050743 dated Jan. 24, 2017 (5 pages).
Finnish Search Report issued by the Finnish Patent and Registration Office in relation to Finnish Patent Application No. 20155792 dated Jun. 3, 2016 (3 pages).
International Preliminary Report on Patentability issued by the Finnish Patent and Registration Office acting as the International Preliminary Examining Authority in relation to International Application No. PCT/FI2016/050743 dated Feb. 28, 2018 (10 pages).
Cui, X. A Capacity Planning Study of Database Management Systems with OLAP Workloads. MSc thesis, Queen's University, Ontario, Canada, Oct. 2003 [online], [retrieved on Jan. 19, 2017]. Retrieved from the Internet: <URL: http://research.cs.queensu.ca/home/cords2/publications/xilin.pdf> The whole document.
Xue, J et al. PRACTISE: Robust Prediction of Data Center Time Series. Eleventh International Conference on Network and Service Management (CNSM) [online], Nov. 9-13, 2015 [retrieved on May 24, 2016]. Retrieved from the Internet: <URL: http://ieeexplore.ieee.org/xpls/abs_all.jsp?arnumber=7367348>. The whole document.
Zhuang, Z et al. Capacity Planning and Headroom Analysis for Taming Database Replication Latency: Experiences with LinkedIn Internet Traffic. Proceedings of the 6$^{th}$ ACM/SPEC International Conference on Performance Engineering (ICPE '15) [online], Jan. 31-Feb. 4, 2015 [retrieved on May 24, 2016]. Retrieved from the Internet: <URL: http://dl.acm.org/citation.cfm?id=2688054>. The whole document.

* cited by examiner

| | Original | YEAR(0) INT | YEAR(5) INT | FIXED YEAR(0) FLOAT | PROJECTED YEAR(5) FLOAT | FIXED EXCD FLOATS |
|---|---|---|---|---|---|---|
| 2011-01 | 50% | 22.3% | 34.0% | 22.3% | 34.0% | 0 |
| 2011-02 | 40% | 17.9% | 27.2% | 17.9% | 27.2% | 0 |
| 2011-03 | 66% | 29.5% | 44.9% | 29.5% | 44.9% | 0 |
| 2011-04 | 73% | 32.6% | 49.7% | 32.6% | 49.7% | 0 |
| 2011-05 | 54% | 24.1% | 36.7% | 24.1% | 36.7% | 0 |
| 2011-06 | 47% | 21.0% | 32.0% | 21.0% | 32.0% | 0 |
| 2011-07 | 73% | 32.6% | 49.7% | 32.6% | 49.7% | 0 |
| 2011-08 | 45% | 20.1% | 30.6% | 20.1% | 30.6% | 0 |
| 2011-09 | 73% | 32.6% | 49.7% | 32.6% | 49.7% | 0 |
| 2011-10 | 46% | 20.6% | 31.3% | 20.6% | 31.3% | 0 |
| 2011-11 | 36% | 16.1% | 24.5% | 16.1% | 24.5% | 0 |
| 2011-12 | 58% | 25.9% | 39.5% | 25.9% | 39.5% | 0 |
| 2012-01 | 84% | 37.5% | 57.2% | 37.5% | 57.2% | 1 |
| 2012-02 | 44% | 19.7% | 29.9% | 19.7% | 29.9% | 0 |
| 2012-03 | 10% | 4.5% | 6.8% | 4.5% | 6.8% | 0 |
| 2012-04 | 56% | 25.0% | 38.1% | 25.0% | 38.1% | 0 |
| 2012-05 | 78% | 34.9% | 53.1% | 34.9% | 53.1% | 1 |
| 2012-06 | 47% | 21.0% | 32.0% | 21.0% | 32.0% | 0 |
| 2012-07 | 83% | 37.1% | 56.5% | 37.1% | 56.5% | 0 |
| 2012-08 | 58% | 25.9% | 39.5% | 25.9% | 39.5% | 0 |
| 2012-09 | 56% | 25.0% | 38.1% | 25.0% | 38.1% | 0 |
| 2012-10 | 57% | 25.5% | 38.8% | 25.5% | 38.8% | 0 |
| 2012-11 | 76% | 34.0% | 51.7% | 34.0% | 51.7% | 1 |
| 2012-12 | 70% | 31.3% | 47.6% | 31.3% | 47.6% | 0 |
| AVG OVER (All) | 57.5% | 25.7% | 39.1% | 25.7% | 39.1% | |

Fig. 8

| BASE CALCULATION OVER (All) | PERCENTILE | |
|---|---|---|
| targeted aggregation threshold value limit | 50.0% | or less |
| valuated aggregation threshold value limit | 57.5% | or less |
| aggregation adjustment centile | 13.0% | to add |
| lifecycle | 5 | years |
| lifecycle growth percentile | 52.3% | to add |
| annual growth | 8.8% | to add |
| lifecycle total adjustment percentile | 72.1% | to add |
| source cpu benchmark (int) | 100 | relative |
| source cpu benchmark (float) | 200 | relative |
| source margin adjustment | 30% | margin |
| target cpu benchmark (int) | 223.8 | adjusted with margin |
| target cpu benchmark (float) | 447.6 | adjusted with margin |
| targeted constraint threshold value limit #1 | 83.3% | |
| constraint1 limit | 50.0% | |
| targeted constraint threshold value limit #2 | 1.9% | |
| constraint2 limit | 60.0% | |

Fig. 8 (cont.)

| YYYY-MM | SERVER | INSTANCE1 | INSTANCE2 | INSTANCE3 | INSTANCE4 | INSTANCE5 | INSTANCE6 | INSTANCE7 | INSTANCE8 |
|---|---|---|---|---|---|---|---|---|---|
| 2011-01 | 420.3 | 25.0 | 115.0 | 73.2 | 18.7 | 72.3 | 117.1 | 46.3 | 53.8 |
| 2011-02 | 420.3 | 68.3 | 65.3 | 106.0 | 106.3 | 45.0 | 111.0 | 119.4 | 33.7 |
| 2011-03 | 420.3 | 5.1 | 87.5 | 54.2 | 83.1 | 105.9 | 7.3 | 82.2 | 10.1 |
| 2011-04 | 420.3 | 11.6 | 103.4 | 29.6 | 110.5 | 0.9 | 2.0 | 1.0 | 120.3 |
| 2011-05 | 420.3 | 63.4 | 12.3 | 99.1 | 44.6 | 83.0 | 125.1 | 107.3 | 67.0 |
| 2011-06 | 420.3 | 33.2 | 67.0 | 88.8 | 40.2 | 21.2 | 36.6 | 50.6 | 7.7 |
| 2011-07 | 420.3 | 3.5 | 84.7 | 106.8 | 68.0 | 31.5 | 81.5 | 88.9 | 39.2 |
| 2011-08 | 420.3 | 103.1 | 20.6 | 12.7 | 11.3 | 12.1 | 56.5 | 115.8 | 95.0 |
| 2011-09 | 420.3 | 61.5 | 105.8 | 78.6 | 100.5 | 50.3 | 17.4 | 69.8 | 120.5 |
| 2011-10 | 420.3 | 37.3 | 88.5 | 40.3 | 27.3 | 119.8 | 120.2 | 19.8 | 19.1 |
| 2011-11 | 420.3 | 27.8 | 2.0 | 9.4 | 100.6 | 77.6 | 39.9 | 69.0 | 67.9 |
| 2011-12 | 420.3 | 115.6 | 11.2 | 36.5 | 30.4 | 71.6 | 40.7 | 86.6 | 61.4 |
| AVG OVER (All) | | 46.3 | 63.6 | 61.3 | 61.8 | 57.6 | 62.9 | 71.4 | 58.0 |

| COMPARISON | SERVER | INSTANCE1 | INSTANCE2 | INSTANCE3 | INSTANCE4 | INSTANCE5 | INSTANCE6 | SIGMA6 | SIGMA6 sum | SIGMA6 |
|---|---|---|---|---|---|---|---|---|---|---|
| 2011-01 | 420.3 | 108.4 | 58.2 | 2.9 | 12.8 | 38.0 | 74.5 | | 294.8 | pass |
| 2011-02 | 420.3 | 29.8 | 70.8 | 10.8 | 64.9 | 79.3 | 84.2 | | 339.7 | pass |
| 2011-03 | 420.3 | 8.3 | 9.0 | 14.1 | 0.7 | 20.6 | 103.7 | | 156.4 | pass |
| 2011-04 | 420.3 | 44.0 | 30.8 | 114.6 | 27.4 | 60.7 | 119.5 | | 397.0 | pass |
| 2011-05 | 420.3 | 37.9 | 13.0 | 78.0 | 41.3 | 36.6 | 98.0 | | 304.7 | pass |
| 2011-06 | 420.3 | 103.6 | 23.7 | 119.6 | 51.7 | 116.4 | 3.5 | | 418.4 | pass |
| 2011-07 | 420.3 | 119.9 | 116.0 | 89.2 | 123.7 | 120.1 | 105.5 | | 674.4 | fail |
| 2011-08 | 420.3 | 8.2 | 37.3 | 39.7 | 18.4 | 89.8 | 91.0 | | 284.4 | pass |
| 2011-09 | 420.3 | 104.3 | 25.2 | 80.6 | 14.6 | 64.4 | 62.6 | | 351.7 | pass |
| 2011-10 | 420.3 | 41.8 | 71.4 | 93.7 | 76.1 | 104.1 | 54.1 | | 441.3 | fail |
| 2011-11 | 420.3 | 45.5 | 62.7 | 77.4 | 60.4 | 0.2 | 26.0 | | 272.2 | pass |
| 2011-12 | 420.3 | 16.1 | 117.4 | 84.6 | 111.0 | 41.0 | 25.2 | | 395.2 | pass |
| AVG OVER (All) | | 55.6 | 53.0 | 67.1 | 50.2 | 64.3 | 70.6 | | | |

Fig. 9

| INSTANCE9 | INSTANCE10 | | | SIGMA3 | | BASE CALCULATION OVER (All) | VALUE |
|---|---|---|---|---|---|---|---|
| 101.6 | 81.2 | | | | | target cpu benchmark (int) | 223.782447 |
| 67.5 | 125.7 | | | | | target cpu benchmark (float) | 447.564894 |
| 99.2 | 19.5 | | | | | target server benchmark (int) | 207 |
| 120.8 | 124.9 | | | | | target server benchmark (float) | 467 |
| 9.8 | 51.8 | | | | | target server max ram | 1500 |
| 2.2 | 55.0 | | | | | target server OS CPU reserve | 12 |
| 5.0 | 4.4 | | | | | target server OS CPU reserve (int) | 12.9375 |
| 18.5 | 1.1 | | | | | target server OS CPU reserve (float) | 29.1875 |
| 57.1 | 4.1 | | | | | target server cpu cores | 16 |
| 31.8 | 107.7 | | | | | target server cpu margin | 0.1 |
| 83.6 | 77.6 | | | | | margin adjusted target server cpu benchmark (float) | 420.3 |
| 70.6 | 85.4 | | | | | margin adjusted target server cpu benchmark (int) | 186.3 |
| 55.6 | 61.5 | | | | | | |
| | | | | | | | |
| SIGMA5 | SIGMA4 | | | SIGMA3 | | VIRTUALIZED TARGET SERVER CALCULATION OVER (All) | VALUE |
| pass | pass | | | pass | | number of target servers in pool | 1 |
| pass | pass | | | pass | | constraint adjusted target cpu benchmark (int) | 223.782447 |
| pass | pass | | | pass | | constraint adjusted target cpu benchmark (float) | 447.564894 |
| pass | pass | | | pass | | target server cpu benchmark (int) | 207 |
| pass | pass | | | pass | | target server cpu benchmark (float) | 467 |
| pass | pass | | | pass | | target server max ram | 1500 |
| fail | fail | | | pass | | target server OS RAM reserve | 12 |
| pass | pass | | | pass | | target server OS RAM reserve (int) | 12.9375 |
| pass | pass | | | pass | | target server OS RAM reserve (float) | 29.1875 |
| pass | pass | | | pass | | Chart Area r OS RAM reserve (float) | 16 |
| pass | pass | | | pass | | target server cpu cores | 0.5 |
| pass | pass | | | pass | | target virtual server hyperthreading factor | 4 |
| pass | pass | | | pass | | target virtual server(n) cpu cores | 0.8 |
| | | | | | | target virtual server(n) cpu clockspeed ratio | 27.9728059 |
| | | | | | | target virtual server(n) cpu benchmark (int) | 55.9456118 |
| | | | | | | target virtual server(n) cpu benchmark (float) | 512 |
| | | | | | | target virtual server max ram | 12 |
| | | | | | | target virtual server RAM reserve | 1.74830037 |
| | | | | | | target server OS CPU reserve (int) | 3.49660074 |
| | | | | | | target server OS CPU reserve (float) | 16 |
| | | | | | | target server cpu cores | 0.1 |
| | | | | | | virtual target server margin | 0.1 |
| | | | | | | server margin | |
| | | | | | | margin adjusted target server cpu benchmark (float) | 420.3 |
| | | | | | | margin adjusted target server cpu benchmark (int) | 186.3 |

Fig. 9(cont.)

CAPACITY PLANNING METHOD

CROSS-REFERENCE TO RELATED APPLICATIONS

This application is a National Phase Entry under 35 U.S.C. § 371 of PCT International Application No. PCT/FI2016/050743 filed Oct. 21, 2016, which claims the benefit of Finnish Patent Application No. 20155792 filed Nov. 2, 2015, and U.S. Provisional Patent Application No. 62/260,042 filed Nov. 25, 2015, the disclosure of each of these applications are expressly incorporated herein by reference in their entirety.

FIELD OF THE INVENTION

The present invention relates to CAPACITY_PLANNING of NETWORKS and SERVERS and especially to a SYSTEM, method and a computer program product to forecast capacity requirements of any number of DATABASES running on any number of possible DATABASE MANAGEMENT SYSTEM (DBMS) INSTANCES installed on any number of VIRTUAL and/or PHYSICAL SERVERS and/or CLOUD_SERVICE SERVICE_TIERS in case of partially or fully reorganizing old SYSTEM CONFIGURATION into new, existing, hypothetical or mixed item type SYSTEM by trying to harmonize and minimize CAPACITY_PLANNING RESOURCES such as PHYSICAL CPU computing power to be needed, defined in preambles of the independent claims.

SYSTEM is configured by a set of different kinds of DATA_CENTER SYSTEM SETUP_DATA, CONFIGURATION_DATA and USE_RESETTINGS data, in addition to this, SYSTEM actively collects generic MONITORING_DATA TIME_SERIES from NETWORK, SERVER- and STORAGE_SYSTEM hardware as well as from PHYSICAL and VIRTUAL_SERVERS, DBMS_INSTANCES, RESOURCE_POOLS, DATABASES and such.

This CONSTRAINT driven SYSTEM is able to, with preliminary statistics on SYSTEM overall MONITORING_DATA and health status and with information from existing SOURCE_SYSTEM and becoming TARGET_SYSTEM LOGICAL_TOPOLOGY and CONFIGURATION_DATA, SETUP_DATA and USER_SETTINGS data, create a set of prioritized forecast models based on this information, learn from these models to optimize forecast over time and to create hypothetical SCENARIOS on optimal TARGET_SYSTEM environment and configuration primarily based on statistical analysis, fuzzy logic and certain heuristic methodology.

This kind of SYSTEM is very useful for a large DATA_CENTER having big amount of PHYSICAL and VIRTUAL_SERVERS, DBMS_INSTANCES and DATABASES running mission-critical SYSTEMS because it brings in much more accuracy than traditional DBMS CAPACITY_PLANNING solutions.

BACKGROUND OF THE INVENTION

Traditionally great deal of actual capacity planning work has been done manually without comprehensive automation. Especially in large scale DBMS_SYSTEM environments it has typically been challenging, inaccurate and time consuming task to plan new TARGET_SYSTEM CONFIGURATION for existing SOURCE_SYSTEM CONFIGURATION to be upgraded, migrated and/or consolidated.

Also, even on existing SYSTEMS where there is some CAPACITY_PLANNING automation implemented, it does not provide effective method for DBMS_INSTANCE and/or DATABASE level CAPACITY_PLANNING and SCENARIOS within the whole LOGICAL_TOPOLOGY of the SYSTEM according to the DATABASE bound capacity. Some of those solutions are able to analyze one SOURCE_SERVER capacity at time but cannot effectively solve overall CAPACITY_PLANNING scenarios wherein minimal overall capacity can be planned to be used because existing capacity needs can be calculated, harmonized and therefore optimized as one entity, not in many little pieces at a time.

Even in smaller environments, there is almost endless amount of different possible TARGET_SYSTEM CONFIGURATION SCENARIOS in terms of HARDWARE, SERVERS, VIRTUALIZATION, NETWORK, STORAGE, CLOUD SERVICES and such. A method based on substituting one distinct SERVER, DBMS_INSTANCE or DATABASE at once is rarely optimal solution in terms of TARGET_SYSTEM capacity needs. All this often leads in following problematical use cases:

CAPACITY_PLANNING is split into smaller, more easily manageable sub projects focusing in one to few SERVERS at a time instead of all SERVERS (can be anything from distinct SERVERS up to hundreds of thousands of SERVE RS in real life scenarios) because planning whole TARGET_SYSTEM capacity needs at once has either been too complex problem to solve or there has not been insight of an advantage in planning the TARGET_SYSTEM at once from a larger set of SOURCE_SYSTEM data or from whole SOURCE_SYSTEM data.

Such a method easily causes a great overhead in total on RESOURCES such as hardware such as network devices, host servers, their respective RAM configuration, overall cpu capacity needs, operating system, software, SERVERS, DATA_CENTER space, electricity consumption, running costs and such when these smaller sub projects are being implemented one by one over time. And, in those scenarios wherein overall capacity from SOURCE_SYSTEM is being planned into a TARGET_SYSTEM in such way, the method itself is not able to solve capacity optimization over time in optimal fashion by organizing old data in such way it will consume the least overall capacity needed.

Instead, in many typical use cases database architects have been using simple and therefore inaccurate deduction like calculating existing average capacity needs over last year and giving it some growth estimate over wanted TARGET_SYSTEM lifecycle and proceeding CAPACITY_PLANNING estimate for each SOURCE_SYSTEM SERVER based on this type of thinking. Such a CAPACITY_PLANNING method is problematical in many ways and may easily end up with 30% or even more excessive TARGET_SYSTEM overall capacity compared to a CAPACITY_PLANNING method defined in this invention.

Another weak point for abovementioned simple CAPACITY_PLANNING method is it is not able to fit existing capacity in form of TIME_SERIES and therefore is more vulnerable for out of capacity situation of which later on defined a more precise illustration. That's why it is relatively common for Database Architects to put a significant SAFETY_MARGIN for their TARGET_SYSTEM capacity estimations, typically 30-50% which makes such a method even worse.

BRIEF DESCRIPTION OF THE INVENTION

The object of the present invention is to provide an improved CAPACITY_PLANNING method and ENGINE where at least one of disadvantages of the prior art is eliminated or at least alleviated. The object of the present invention are achieved with a system, method and computer program product according to the characterizing portions of the independent claims. The preferred embodiments of the invention are disclosed in the dependent claims.

In this context a SYSTEM is referred mostly to the overall database management systems (abbreviated as DBMS_SYSTEMS) production environment.

In this context by OBJECT is referred to as a data OBJECT having one to many properties or a data table having one to many columns and typically exists in LOGICAL_TOPOLOGY data model.

In this context a BRIDGE_OBJECT is an OBJECT to normalize many to many relationship in LOGICAL_TOPOLOGY data model.

In this context by CAPACITY_MANAGEMENT is referred to as a process used to manage information technology (IT). Its primary goal is to ensure that IT capacity meets current and future requirements in an effective manner. Here it also refers to overall DBMS_SYSTEM environment CAPACITY_MANAGEMENT. By applying CAPACITY_MANAGEMENT methodology overall CAPACITY_PLANNING method may improve.

In this context SYSTEM_RECONFIGURATION refers to any case wherein existing SYSTEM configuration such as PHYSICAL SERVER memory, amount of PHYSICAL processors VIRTUAL_SERVER pool settings etc. is being changed.

In this context SYSTEM_HARMONIZATION refers to arty case wherein existing SYSTEM is being reorganized by changing the location of DBMS INSTANCES and/or DATABASES located in certain PHYSICAL and/or VIRTUAL_SERVERS in order to get harmonized overall capacity.

In this context SYSTEM_MIGRATION refers to any renewal of old SYSTEM into a new SYSTEM environment with new hardware, virtualization, cloud environment and/or such.

In this context SYSTEM_CONSOLIDATION refers to a such renewal of old SYSTEM into a new SYSTEM environment wherein amount of hardware capacity such as PHYSICAL SERVERS and/or STORAGE_UNITS are in focus to be minimized.

In this context MIGRATION itself may refer in any of the terms SYSTEM_CONSOLIDATION, SYSTEM_MIGRATION and/or SYSTEM_HARMONIZATION as a whole.

In this context by CAPACITY_PLANNING is referred to as a process used to forecast information technology (IT) reconfiguration and/or renewal. Its primary goal is to ensure that IT capacity meets configuration requirements after SYSTEM_RECONFIGURATION and/or SYSTEM_HARMONIZATION and/or SYSTEM_MIGRATION and/or SYSTEM_CONSOLIDATION in an effective way and to minimize excessive RESOURCE overhead. Here it also refers to overall DBMS_SYSTEM environment CAPACITY_PLANNING.

Here a SYSTEM refers to both existing or becoming overall DBMS SERVERS SYSTEM.

Here a SOURCE_SYSTEM refers to existing overall DBMS SERVERS SYSTEM from which the capacity being planned is taken into predictions on new environment (TARGET_SYSTEM) in terms of CAPACITY_PLANNING.

Here a TARGET_SYSTEM refers to becoming overall DBMS SERVERS SYSTEM for which the capacity being planned is taken into from old SOURCE_SYSTEM in terms of CAPACITY_PLANNING.

In this context ENGINE is referred as a method and a software to proceed CAPACITY_PLANNING.

In this context a SERVER may refer to any server in existing SOURCE_SYSTEM, TARGET_SYSTEM or any SOURCE, MODEL, SETUP, TARGET or BENCHAMARK server.

Here a DBMS_INSTANCE refers to any distinct DATABASE MANAGEMENT SYSTEM installation, e.g. such as Microsoft, Oracle or MySQL DBMS_INSTANCE running any kind of service(s) such as OLTP, ETL, master data, analytics, reporting service etc. containing one or more DATABASES. There can be one or more DBMS_INSTANCE installations on a Single PHYSICAL or VIRTUAL SERVER. A DBMS_INSTANCE may be configured to use only a certain amount of VIRTUAL or PHYSICAL, hardware RESOURCES such as RAM and CPU having a minimum and maximum subset of overall VIRTUAL or PHYSICAL SERVER RESOURCES.

Here METADATA means any descriptive data about the nature of data itself and may be numeric, quantitative or textual data.

Here USER_DEFINED_SETTINGS refer to typically manual, environment specific METADATA which a user may define for each device and OBJECT in the SYSTEM. Most of the user defined settings for each device is common like planned decommission date for a certain PHYSICAL SERVER or is a current DBMS_INSTANCE in production use, testing use or in some other use.

Here DEDICATED_SERVER refers to a VIRTUAL SERVER or PHYSICAL SERVER which holds DATABASE MANAGEMENT SYSTEM OBJECTS which neither can be separated from each other nor do allow any other DBMS_INSTANCES to be configured for that SERVER.

Here a SETUP_DATA refers to data relating to defining a LOGICAL_TOPOLOGY of a SYSTEM; for all the NETWORKING, hardware and software in which CAPACITY_MANAGEMENT is done. This information may e.g. be current configured SERVER and STORAGE_UNIT specifications of the SYSTEM. The data is needed for determining theoretical limits for each hardware component in existent and/or hypothetical SYSTEM in terms of CAPACITY_PLANNING. For example, a STORAGE_UNIT has setup properties such as MAX_RANDOM_READ_IOPS and MAX_SEQUENTIAL_READ_IOPS to tell theoretical maximum for random and sequential reads on that device with the current CONFIGURATION. Some of this data can be collected from the device and some of it needs to be manually prepared from the specifications.

Here a CONFIGURATION_DATA refers to data that defines how a certain network, hardware or software component etc. is configured. This data may generally be read automatically from the SYSTEM and stored into the PLANNING_DATABASE. This kind of data is e.g. such as DATABASE MANAGEMENT SYSTEM SERVER bits, version, edition and SERVER_CONFIGURED_RAM, which tells us how much RAM memory is being configured on certain SERVER in SOURCE_SYSTEM and/or TARGET SYSTEM. Sometimes, some of this data needs to be manually maintained to be kept up to date.

Here a user needs to define different kinds of USER_SETTINGS on SOURCE and/or TARGET SYSTEMS. This data can be such as SERVER_PLANNED_SHUTDOWN_DATE which tells us when current SERVER should be shutdown. USER_SETTINGS is typically manual, environment-specific METADATA user defines for each device and OBJECT in the SYSTEM. Most of the USER_SETTINGS for each device is common like planned decommission date for certain PHYSICAL_SERVER or is current DBMS_INSTANCE in production use, testing use or in some other use.

Here ENVIRONMENT_VARIABLES refer to SETUP_DATA, CONFIGURATION_DATA and USER_SETTINGS in general.

Here MODEL data refers to data in which LOGICAL_TOPOLOGY refers to. It tells us the theoretical limits of current SETUP to be upgraded. For example, if we are having a PHYSICAL_SERVER setup of having 6 PHYSICAL CPU cores and current SERVER model has theoretical maximum of 12 cores, we will get this information from its model. This helps in making CAPACITY_MANAGEMENT_SCENARIO and CAPACITY_PLANNING_SCENARIO calculations on ENGINE.

Here a LOGICAL_TOPOLOGY refers to overall DATA_CENTER NETWORK-, SERVER-, STORAGE_UNIT-, DBMS_INSTANCE-, DATABASE- etc. hardware setup, for example, a distinct STORAGE_UNIT such as DELL EqualLogic PS6510ES as a part of the LOGICAL_TOPOLOGY, in order to be able to forecast CAPACITY_MANAGEMENT and CAPACITY_PLANNING needs and to FILTER only a desired set of OBJECTS for analysis, the ENGINE needs to know some setup and CONFIGURATION_DATA from existing LOGICAL_TOPOLOGY. This category includes specification data from DATA_CENTERS, NETWORK_GROUPS. NETWORKS, NETWORK_INTERFACES, PHYSICAL_SERVERS, VIRTUAL_SERVERS, STORAGE_UNITS, backup devices and such. This makes it possible to enhance forecasting across NETWORKS, NETWORK_GROUPS and even across the DATA_CENTERS.

Here a NETWORK_GROUP refers to a set of NETWORKS in a DATA_CENTER which can be administered as a single OBJECT such that a CAPACITY_PLANNING standalone SERVER or from end SERVER ENGINE can process all the data produced by the OBJECTS in any NETWORK within the NETWORK_GROUP.

Here a NETWORK is referred to a computer network which allows computers to exchanges data. Here CLOUD_SERVICE refers to any type of cloud service such as IaaS, PaaS, SaaS, DBaaS. These cloud services are such as Microsoft Azure and Amazon Web Services. A CAPACITY_MANAGEMENT and/or CAPACITY_PLANNING software may be partially or as whole implemented as a CLOUD_SERVICE.

A SERVICE_TIER is referred to as CLOUD_SERVICE service tier general abstraction OBJECT such as Azure SQL Database service tier against which actual SOURCE_DATABASE is being transferred into. There may exist any kind of SERVICE_TIER OBJECTS having different TOPOLOGICAL_MODELS, OBJECTS, data members, CONSTRAINTS and such. For example, in Microsoft Azure SQL Database CLOUD_SERVICE there are many different categories of SERVICE_TIERS providing different level of maximum capacity such as CPU, RAM and DATABASE size at maximum.

Here a DOMAIN refers to Active Directory DOMAIN Domain controller authenticates and authorizes all users and computers in a Windows DOMAIN type NETWORK— assigning and enforcing security policies for all computers and installing or updating software. For example, when a user logs into a computer that is part of a Windows DOMAIN, Active Directory checks the submitted password and determines whether the user is a SYSTEM administrator or normal user.

Here MONITORING_DATA refers to an automated stream of any measurable data and base attributes in form of a TIME_SERIES from a NETWORK to PHYSICAL and VIRTUAL SERVER, DBMS INSTANCES, DATABASES, users, connections etc. This is the most essential input variables for ENGINE. From monitoring context, we need to continuously collect, measure and calculate these TIME_SERIES and TRENDS for all the PERFORMANCE_COUNTER data streams we need in order to forecast TARGET, SYSTEM CAPACITY_PLANNING needs. These data members are the most essential input variables for the ENGINE. PERFORMANCE_COUNTERS are such as USED_DATA_FILE_SIZE_MB, which tells us current allocated size for certain DATABASE at the moment.

Here all the MONITORING_DATA measures are referred as "PERFORMANCE_COUNTERS". This means all measurable data and their base attributes in form of TIME_SERIES from NETWORK to PHYSICAL and VIRTUAL_SERVERS, DBMS_INSTANCES, RESOURCE_POOLS, DATABASES, users and connections. As an examples, a typical SERVER level PERFORMANCE_COUNTER is CPU_AVERAGE_USAGE %.

In this context PERFORMANCE_COUNTERS can be collected from various OBJECTS, especially when hardware virtualization is being used. Most of the OBJECTS are hardware devices but some of them are software side OBJECTS like DBMS_INSTANCE and DATABASE. All the OBJECTS typically expose one or more APIS to collect PERFORMANCE_COUNTER data from.

In this context word RESOURCE refers to any physical RESOURCE in TARGET_SYSTEM such as CPU_COUNT, RAM_USAGE, DISK_USAGE etc. for against which the TARGET_SYSTEM setup is wanted to be forecasted. Each RESOURCE is comprised of certain set of PERFORMANCE_COUNTERS. RESOURCES can be prioritized in CAPACITY_PLANNING calculations.

Here a CONSTRAINT is a standard or a specification in quantitative manner or any logical CONSTRAINT being set to observe actual, historical and ENGINE forecasted monitoring PERFORMANCE_COUNTERS or any logical rule or restriction concerning CAPACITY_PLANNING. In ENGINE, all the MONITORING_DATA member TIME_SERIES such as ALLOCATED_DATABASE_SIZE_MB are being constrained. These CONSTRAINTS can be any absolute values or calculation formulas and there can be basically unlimited number of CONSTRAINTS for each PERFORMANCE_COUNTER. CAPACITY_MANAGEMENT CONSTRAINTS are set into two categories: WARNINGS and ALERTS. User can configure ENGINE to calculate different FORECASTS for each given set of CONSTRAINT LIMITS to be compared. One example CONSTRAINT could be "annual SERVER downtime %" which could be set on "minimum of 99.999%" LEVEL i.e. maximum of ~5 minutes and 15 seconds per annum. Now, with these CONSTRAINTS and some additional METADATA such as HARDWARE BENCHMARK_DATA, it is possible to forecast MONITORING_DATA PERFORMANCE_COUNTERS TIME_SERIES sufficiency over time on TARGET_SYSTEM with ENGINE.

In this context the NETWORK_SETUP_DATA is information concerning NETWORK settings such as how much NETWORK_THROUGHPUT certain NETWORK or NETWORK_INTERFACE can handle at its maximum. NETWORK_MONITORING_DATA refers to actual current NETWORK traffic. This is essential information for ENGINE to know the LIMITS and CONSTRAINTS on CAPACITY_PLANNING calculation over time for TARGET_SYSTEM.

In this context the SERVER_MONITORING_DATA tells us in a form of TIME_SERIES how heavy the hardware RESOURCE usage is on a particular PHYSICAL_SERVER or VIRTUAL_SERVER. In contrary, the SERVER SETUP_DATA tells their current configurations against the LOGICAL_TOPOLOGY. This is essential information for ENGINE to approximate hardware and/or virtualization capacity sufficiency over time and which are the actual configuration possibilities against the LOGICAL_TOPOLOGY for adjusting overall TARGET_SYSTEM lifespan with wanted CONSTRAINT LEVELS.

In this context the DBMS_INSTANCE_MONITORING_DATA tells us in a form of TIME_SERIES how heavy the hardware RESOURCE usage is on particular DBMS_INSTANCE. DBMS_INSTANCE_SETUP_DATA describes their current configurations. ENGINE needs this information in forecasting how long and in what terms current SYSTEM can handle the DBMS_INSTANCES with wanted CONSTRAINT LEVELS. This is also essential information for ENGINE to approximate hardware and/or virtualization sufficiency over time and which are the actual configuration possibilities against the LOGICAL_TOPOLOGY for adjusting overall TARGET_SYSTEM lifespan with wanted CONSTRAINT LEVELS.

In this context the DATABASE_MONITORING_DATA tells us in a form of TIME_SERIES such as how much the DATABASE has allocated and reserved data and log file space over time in particular DBMS_INSTANCE. DATABASE_SETUP_DATA describes their current configurations. ENGINE can forecast how long it is possible to keep DATABASES running on planned TARGET_SYSTEM.

In this context CPU_PERFORMANCE_RATIO number refers to a numeric variable which tells us benchmarked relative integer or floating point calculation performance with certain algorithm. There is available plenty of online portals from third parties and benchmark tests by hardware vendors etc. providing this information of how well relatively different CPUS perform on different hardware server platform. Different kind of server performance can be also benchmarked online against each desired server with a benchmark software but many times this is not possible because there is continuous production load going on SOURCE_SYSTEM SERVERS. For example, certain 3.30 Ghz Intel Xeon processor may have a relative CPU_PERFORMANCE_RATIO of 198 for integer calculation and 161 for floating point calculation and some other 2.60 Ghz processor may have a relative CPU_PERFORMANCE_RATIO of 160 for integer calculation and 131 for floating point calculation. This is very important when we are calculating relative CPU processing performance on CAPACITY_PLANNING ENGINE and makes it possible to create different kinds of CAPACITY_PLANNING scenarios with hypothetical hardware and/or virtualization setups and configurations because we can scale up and down CPU_PERFORMANCE_RATIO like CPU_PERFORMANCE_RATIO for 4 sockets, CPU_PERFORMANCE_RATIO for 1 core, CPU_PERFORMANCE_RATIO for 1 hyperthread, CPU_PERFORMANCE_RATIO for virtualize hyperthread having 50% of overall dockspeed and so on. These are very simple to scale up and down because of their strongly linear nature in terms of cpu computing performance.

User defined settings are manually mapped CONFIGURATION_DATA and it may be connected to the OBJECTS monitored from the SYSTEM. Settings are used to reinforce such SYSTEM information that cannot be automatically created and to improve ENGINE FORECAST accuracy. These data members are such as planned SERVER shutdown date or DBMS migration date and version/edition.

Many of the configuration variables change over time and therefore should be proactively updated and the changes being registered, in order to provide better accuracy for the ENGINE and to avoid causing misleading forecasting results.

A most typical usage scenario is to proceed a CAPACITY_PLANNING FORECAST for DBMS SERVERS renewal from SOURCE_SYSTEM into a TARGET_SYSTEM on hypothetical hardware configuration and LOGICAL_TOPOLOGY.

Across multiple DATA_CENTERS by utilizing cloud aggregation
On CLOUD_SERVICE level
On DATA_CENTER level
On NETWORK_GROUP level
On NETWORK level
On DOMAIN level
On PHYSICAL_SERVER level
On PHYSICAL_SERVER VIRTUALIZATION_RESOURCE_POOL level
On PHYSICAL_FAILOVER_CLUSTER level
On VIRTUAL_FAILOVER_CLUSTER level
On VIRTUAL_SERVER level
On SERVICE_TIER level
On DBMS_INSTANCE level
On DBMS_INSTANCE RESOURCE_POOL level
On DATABASE level
On STORAGE_UNIT level
Any of the network switches, interfaces and ports in between
Any logical combination of above mentioned
etc.

The sample solution defined in this document is built on Microsoft Windows and SQL SERVER environment but the ENGINE itself can be implemented very independently of OS, virtualization technology or DBMS_SYSTEM. Method has got such a broad range on LOGICAL_TOPOLOGY to be utilized in CAPACITY_PLANNING it is relatively pointless to try to describe ail the possible OBJECTS with their respective properties that may exist because the logic behind the method and its best practices can be very understandably presented in general level with most common, typical use cases.

The invention is directed to a method for planning capacity of any DBMS_SERVERS SYSTEM, comprising steps of selecting at least one RESOURCE against which the TARGET_SYSTEM will be optimized, selecting at least one PERFORMANCE_COUNTER for which a CAPACITY_PLANNING ENGINE FORECAST is created, collecting said PERFORMANCE_COUNTER MONITORING_DATA, defining rules for each PERFORMANCE_COUNTER against which a predicted TIME_SERIES is validated, adjusting SOURCE_SYSTEM OBJECT CONSTRAINTS and TIME_SERIES data, defining TARGET_SYSTEM LOGICAL_TOPOLOGY with desired OBJECTS setup, preferred configurations, maximum count for each setup OBJECT type and possible processing order, adjusting TARGET_SYSTEM OBJECT CONSTRAINTS, benchmarks and TIME_SERIES data, evaluating and comparing all needed refactored SOURCE_SYSTEM OBJECT TIME_SERIES against given TARGET_SYSTEM with preconfigured LOGICAL_TOPOLOGY and processing order of OBJECT SETUP_DATA to have minimum amount of primary target RESOURCE defined in total for all TARGET_

SYSTEM host servers meeting their respective CONSTRAINTS and outputting results.

The invention is also directed to a computer program product that when run on a computer implements said method.

An advantage of the invention is that it is able to create more accurate CAPACITY_PLANNING FORECAST of becoming SYSTEM and therefore enable minimized RESOURCE overhead for existing SYSTEM renewal in agreement with CONSTRAINTS.

Another advantage of the invention is it reduces and/or disables need prior investment on hardware, software and/or other needed RESOURCES dramatically in agreement with CONSTRAINTS.

Yet another advantage of the invention is that it provides hasted CAPACITY_PLANNING lifecycle due the level of automation in agreement with CONSTRAINTS.

Yet another advantage of the invention is that ENGINE makes it possible to proceed overall CAPACITY_PLANNING over SYSTEM at once, instead of splitting CAPACITY_PLANNING process into smaller SUB_SYSTEMS, therefore minimizing overhead for total investment on SYSTEM renewal RESOURCES such as hardware, software, SERVERS, DATA_CENTER space, electricity consumption, running casts and such when these sub projects are implemented. This method also enables advantage of SERVER, DBMS_INSTANCE and DATABASE CONSOLIDATION to minimize RESOURCE overhead.

Yet another advantage of the invention is that it provides a way of enabling hypothetical scenarios of different TOPOLOGIES, hardware and virtualization SETUPS and CONFIGURATIONS for planned SYSTEM, such as comparing hardware requirements for TARGET_SYSTEM SETUP between different vendors and therefore optimize SYSTEM renewal costs in agreement with CONSTRAINTS.

Yet another advantage of the invention is that is makes it possible to forecast how long reserve SYSTEM RESOURCES not in use such as SERVERS are sufficient for existing SYSTEM if MIGRATED or CONSOLIDATED.

Still one advantage of the invention is that is makes it possible be able to use TARGET_SYSTEM RESOURCES as efficiently in a load-harmonized configuration over time.

BRIEF DESCRIPTION OF THE DRAWINGS

In the following the invention will be described in greater detail by means of preferred embodiments with reference to the accompanying drawings, in which

FIGS. 8 and 9 show a sample TARGET_SYSTEM variable-based calculation for desired DBMS instances in SOURCE_SYSTEM to fit into a certain TARGET_SYSTEM server.

DETAILED DESCRIPTION OF THE INVENTION

Figure 1:
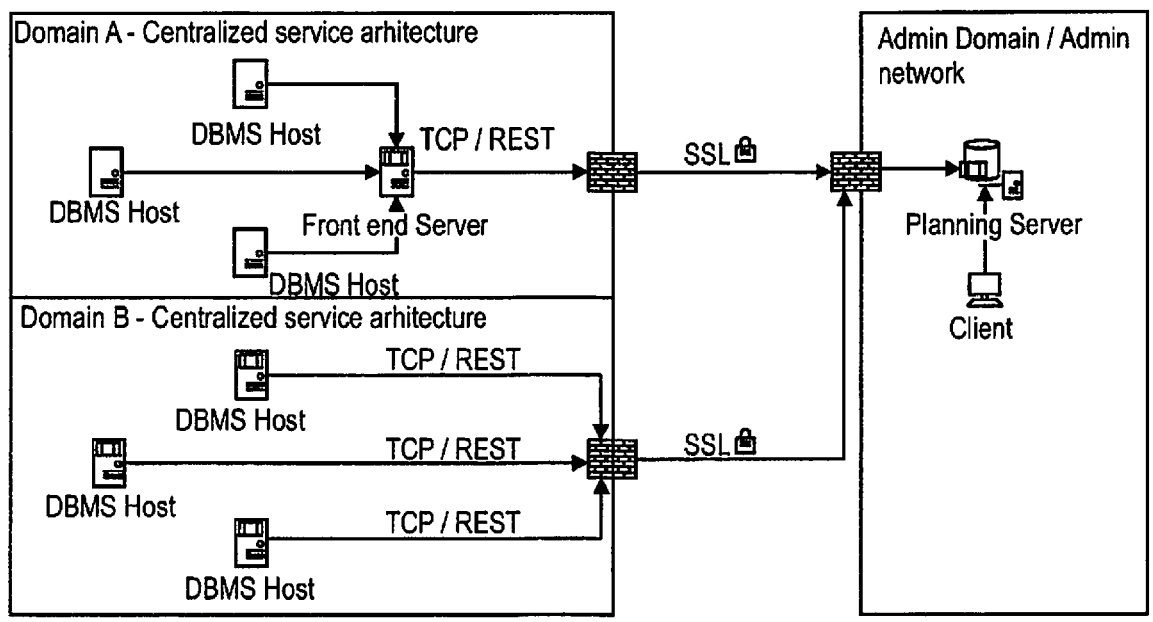
FIG. 1 shows a hybrid architecture from two use cases.

The invention is directed to a method for capacity planning of a DBMS SYSTEM, comprising the steps of selecting at least one RESOURCE against which the TARGET_SYSTEM will be optimized, selecting at least one performance counter for which a planning engine forecast is created, collecting said performance counter MONITORING_DATA, defining rules for each performance counter against which a predicted TIME_SERIES is validated, adjusting SOURCE_SYSTEM OBJECT CONSTRAINTS and TIME_SERIES data, defining TARGET_SYSTEM LOGICAL_TOPOLOGY with desired OBJECTS setup, preferred configurations, maximum count for each setup OBJECT type and possible processing order, adjusting TARGET_SYSTEM OBJECT CONSTRAINTS, benchmarks and TIME_SERIES data, evaluating and comparing all needed refactored SOURCE_SYSTEM OBJECT PERFORMANCE_COUNTER TIME_SERIES against TARGET_SYSTEM and outputting results.

The method wherein the step of selecting at least one RESOURCE comprises selecting at least one RESOURCE and/or cost-based CONSTRAINT to be prioritized in calculation for against which the TARGET_SYSTEM will be optimized to at any level of the SOURCE_SYSTEM and/or TARGET_SYSTEM LOGICAL_TOPOLOGY.

The method further comprising a step of finding a smallest capacity of system RESOURCES to meet respective CONSTRAINTS.

The method further comprising a step of setting desired TARGET_SYSTEM minimum and maximum range CONSTRAINTS and any kind of OBJECT reserve and a step of creating a scenario for each desired logical combination of TARGET_SYSTEM setups.

The method further comprising a step of setting desired TARGET_SYSTEM minimum and maximum range CONSTRAINTS and any kind of OBJECT reserve and a step of creating a scenario for each desired logical combination of TARGET_SYSTEM setups according to the model data.

The method wherein the server reserve is one or more of an OS RAM reserve and/or a normed CPU ratio reserve.

The method further comprising a step of selecting at least one RESOURCE against which the TARGET_SYSTEM will be optimized wherein any of the prioritized RESOURCES may be bound to a certain Level in LOGICAL_TOPOLOGY OBJECT in SOURCE_SYSTEM and/or in TARGET_SYSTEM.

The method further comprising a step of selecting at least one RESOURCE against which the TARGET_SYSTEM will be optimized comprising splitting CAPACITY_PLANNING into multiple SOLUTIONS having their own prioritized RESOURCES which may be bound to a certain level in LOGICAL_TOPOLOGY OBJECT in SOURCE_SYSTEM and/or in TARGET_SYSTEM.

The method further comprising a step of selecting at least one RESOURCE against which the TARGET_SYSTEM will be optimized wherein if any prioritized RESOURCE is cpu, use CPU_BENCHMARK based calculation.

The method further comprising a step of selecting at least one performance counter for which a planning engine forecast is created wherein if any cpu related performance_counter, may use CPU_BENCHMARK based calculation.

The method further comprising a step of setting desired TARGET_SYSTEM minimum and maximum range CONSTRAINTS and optionally a server reserve and a step of creating a scenario for each desired logical combination of TARGET_SYSTEM setups.

The method further comprising a step of setting desired TARGET_SYSTEM minimum and maximum range CONSTRAINTS and optionally a server reserve and a step of creating a scenario for each desired logical combination of TARGET_SYSTEM setups according to the model data.

The method further comprising a step of defining rules for each performance counter against which a predicted TIME_SERIES is validated wherein define aggregation-based and/or CONSTRAINT such as sla-based rules for any performance counter TIME_SERIES.

The method further comprising a step of adjusting SOURCE_SYSTEM OBJECT CONSTRAINTS and TIME_ SERIES data wherein adjust TIME_SERIES against aggregation-based and/or CONSTRAINT such as sla-based rules for any performance counter.

The method further comprising a step of adjusting SOURCE_SYSTEM OBJECT CONSTRAINTS and TIME_ SERIES data wherein adjust TIME_SERIES against trend-based calculation for any performance counter.

The method further comprising a step of adjusting SOURCE_SYSTEM OBJECT CONSTRAINTS and TIME_ SERIES data wherein may use CPU_BENCHMARK based calculation.

The method further comprising a step of evaluating and comparing all needed refactored SOURCE_SYSTEM OBJECT PERFORMANCE_COUNTER TIME_SERIES against TARGET_SYSTEM wherein may use CPU_BENCHMARK based calculation with any SERVER_SETUP and/or VIRTUAL_SERVER_SETUP parameters.

The invention is further directed to a computer program product that when run on a computer implements said method.

System Objects

SYSTEM may have a wide range of OBJECTS having a lot of useful data for CAPACITY_PLANNING.

CLOUD_SERVICE
DATA_CENTER
NETWORK_GROUP
NETWORK
(Windows) DOMAIN, workgroup or contrary (if exists)
PHYSICAL_NETWORK_INTERFACE
VIRTUAL_NETWORK_INTERFACE
PHYSICAL_SERVER
PHYSICAL_FAILOVER_CLUSTER
VIRTUAL_SERVER
VIRTUAL_FAILOVER_CLUSTER
SERVICE_TIER
PHYSICAL_STORAGE_UNIT
VIRTUAL_STORAGE_UNIT
DBMS_INSTANCE (PHYSICAL or virtual)
DATABASE
etc.

ENGINE can be implemented in various scenarios. One of the possible architecture models is defined in this chapter. It is especially good in Microsoft environments when there is a need to create DOMAIN- and NETWORK independent multitenant TARGET_SYSTEM with loosely coupled service architecture.

In one sample architecture, there exists a separate service running on each client side DATABASE SERVER or DOMAIN specific front end SERVER. This service is responsible for reading and relaying ENVIRONMENT_VARIABLES and MONITORING_DATA from client side DATABASE SERVERS via standard SERVER APIS such as Windows Event Tracing and Diagnostics APIS as well as Microsoft SQL Server DMV:s into a centralized CAPACITY_PLANNING SERVER over TCP by SSL-secured REST API requests. This makes it possible to implement CAPACITY_PLANNING solution without linked SERVER- or registered SERVERS type of tightly coupled service architecture.

FIG. 1 presents a hybrid architecture from both of the above mentioned use cases: In DOMAIN A) there exists a front end SERVER in which a DOMAIN-dedicated client service is running. In DOMAIN B) there exists corresponding service running on each existing DBMS PHYSICAL_SERVER. On admin DOMAIN there exists separate CAPACITY_PLANNING SERVER containing host service. This kind of architecture model works fine from single to muititenant solutions.

Figure 2:
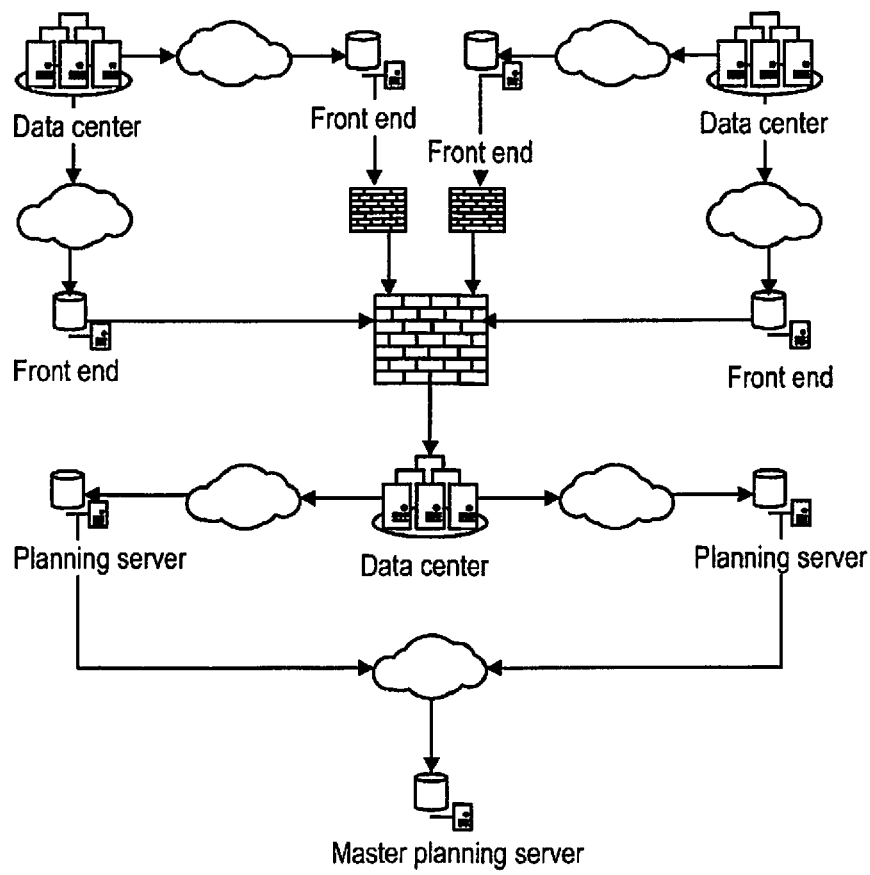
FIG. 2 shows a hybrid architecture for a multitenant use case.

For large scale use cases our sample architecture for multitenant solution is to dedicate and send data from distinct DATA_CENTERS into centralized cloud service having DATA_CENTER-specific CAPACITY_PLANNING SERVERS and a master CAPACITY_PLANNING SERVER over all the DATA_CENTERS, each containing their own DATABASE for CAPACITY_PLANNING data. For maintaining smaller environments; it is also possible to maintain all the DATA_CENTER DATABASES and the master CAPACITY_PLANNING DATABASE on same CAPACITY_PLANNING SERVER for each tenant or to create a hybrid model of these alternatives on-case-basis. This is depicted in FIG. 2.

There may be many other architecture models in addition to abovementioned models as well yet though the CAPACITY_PLANNING ENGINE ideology and functional logic remains all the same.

In order to be able to proceed CAPACITY_PLANNING for DBMS_INSTANCES with their container DATABASES, certain essential PERFORMANCE_COUNTER data need to be collected from the SYSTEM in form of TIME_SERIES and to be enriched with different kinds of ENVIRONMENT_VARIABLES and METADATA. In addition to this the MONITORING_DATA should preferably comprise a profound set of PERFORMANCE_COUNTERS with sufficient sampling interval such as 5 minutes. This makes it possible to create more accurate TIME_SERIES analysis.

In addition to the monitoring PERFORMANCE_COUNTERS it should be possible to set different kinds of CONSTRAINTS and CONSTRAINT goals on different LEVELS of TIME_DIMENSION. Typical PERFORMANCE_COUNTERS are different kinds of delta data, ratio numbers, percentage and any numeric data. CONSTRAINTS are explained with more detail further on in the document.

It is recommended to create LOGICAL_TOPOLOGY model from NETWORKS to distinct NETWORK_INTERFACES, PHYSICAL, SERVERS, STORAGE_UNITS and backup devices, VIRTUAL_SERVERS, DBMS_IN- STANCES, DATABASES and such in order to manage capacity on every LEVEL of the overall SYSTEM. In this data model you should keep up all the USER_SETTINGS, CONFIGURATION_DATA, MONITORING_DATA and SETUP_DATA in order to be able to provide book keeping for overall SYSTEM CAPACITY_MANAGEMENT and finally for TARGET_SYSTEM CAPACITY_PLANNING.

Not any of the PERFORMANCE_COUNTER or ENVIRONMENT_VARIABLE itself is valuable information if it is not set in LOGICAL_TOPOLOGY data model. Every OBJECT with all the necessary PERFORMANCE_COUNTERS and ENVIRONMENT_VARIABLES should be fit in the data model in ideal situation to cover maximum CAPACITY_MANAGEMENT and CAPACITY_PLANNING SCENARIOS in their respective forecasts. It is basically your choice which of the PERFORMANCE_COUNTERS, ENVIRONMENT_VARIABLES and LOGICAL_TOPOLOGY you will utilize—the ideology and functional logic inside ENGINE ideology is just the same independent of the OBJECT hierarchies being utilized. Because most of the topologies, OBJECTS and their respective PERFORMANCE_COUNTERS and ENVIRONMENT_VARIABLES may differ on case basis, instead of trying to define all the possible combinations FIG. 3 shows just one sample SYSTEM configuration on LOGICAL_TOPOLOGY LEVEL.

Figure 3:
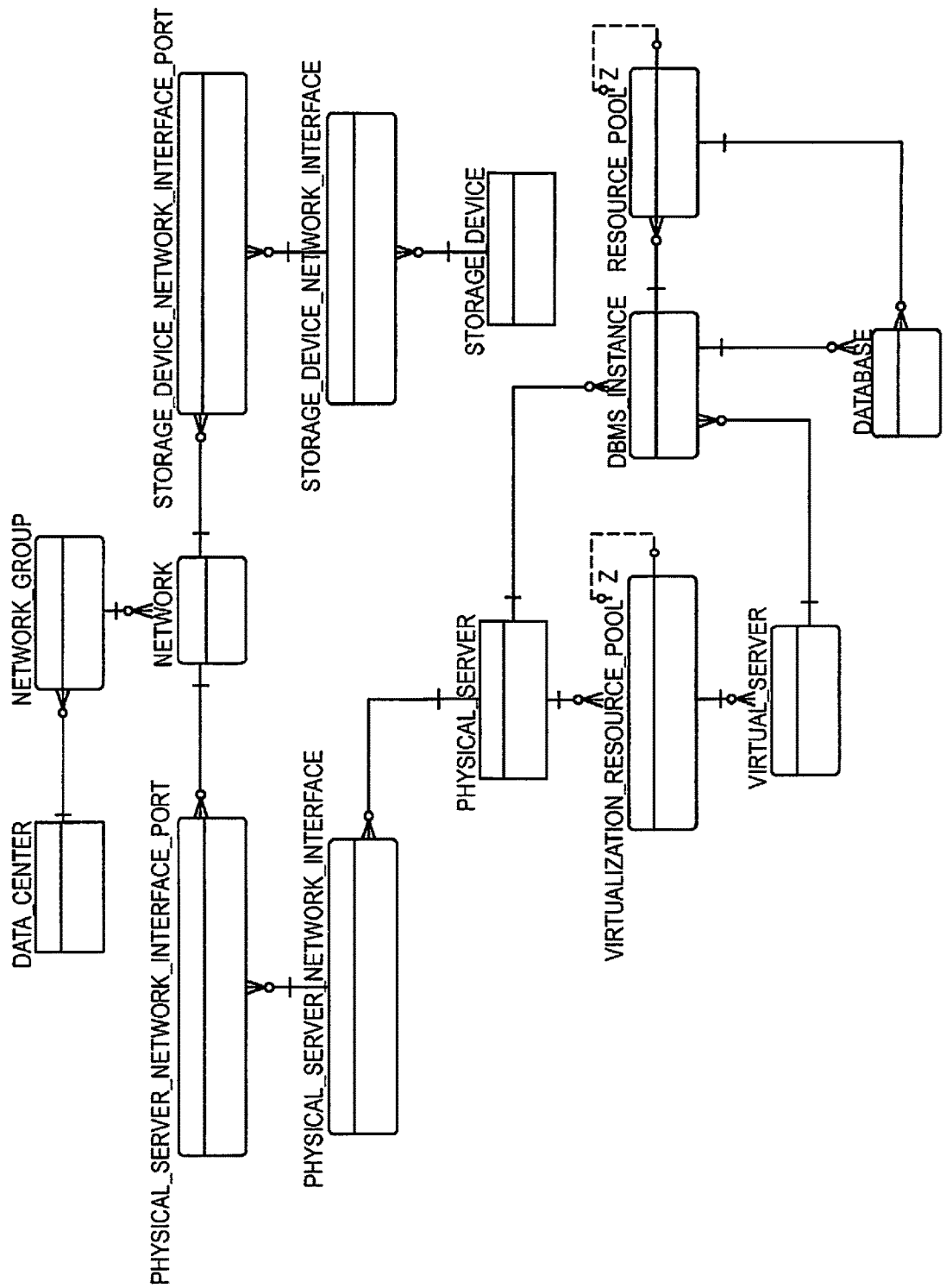
FIG. 3 shows a sample OBJECT LOGICAL_TOPOLOGY in a SOURCE_SYSTEM.

FIG. 3 represents one possible SYSTEM configuration with many essential OBJECTS on logical LEVEL. Virtualized NETWORK instances, STORAGE_UNITS and hardware basically produce corresponding PERFORMANCE_COUNTERS for CONSTRAINT-based CAPACITY_MANAGEMENT and CAPACITY_PLANNING purposes as PHYSICAL ones. OBJECT hierarchies may vary depending of current OS, virtualization technology DBMS SERVER etc. For example; in windows environment we could add up a DOMAIN OBJECT into the logical data model.

Sample OBJECT LOGICAL_TOPOLOGY in SOURCE_SYSTEM: for each of these LOGICAL_TOPOLOGY OBJECTS you should define SETUP_DATA members and MODEL_DATA OBJECTS being referred to. Each of these above mentioned OBJECT is itself a SETUP_DATA OBJECT and should refer into a MODEL_DATA OBJECT.

OBJECTS may be as follows:

DATABASE: There can be one to many system DATABASES and user DATABASES running under certain DBMS_INSTANCE. A DATABASE may be connected into a RESOURCE_POOL running on current DBMS_INSTANCE. DATABASES contain essential CAPACITY_MANAGEMENT and CAPACITY_PLANNING information such as DATABASE file actual size and reserved overall size.

RESOURCE_POOL: There can be one or more RESOURCE_POOLS for each DBMS_INSTANCE. RESOURCE_POOL can split DBMS_INSTANCE hardware RESOURCES such as RAM and CPU into smaller RESOURCE working units for desired set of one to many DATABASES, users, services and so.

DBMS_INSTANCE: There may be one to many DBMS_INSTANCES running on each VIRTUAL_SERVER or PHYSICAL_SERVER. There is a wide range of useful PERFORMANCE_COUNTERS on DBMS_INSTANCE LEVEL. A DBMS_INSTANCE may refer to a shared STORAGE_UNIT_SETUP when FAILOVER_CLUSTERING is used.

VIRTUAL_SERVER: A VIRTUAL_SERVER typically resides on one to many VIRTUALIZATION_RESOURCE_POOLS from which a certain amount of PHYSICAL capacity such as NETWORKING, memory and CPU hardware RESOURCES is dedicated or shared with other VIRTUAL_SERVERS. A VIRTUAL_SERVER may reside under virtual host SERVER or in a CLOUD_SERVICE like Microsoft Azure.

VIRTUALIZATION_RESOURCE_POOL: There may be one or more PHYSICAL_SERVERS and other connected hardware providing one to many (parallel, nested or both) VIRTUALIZATION_RESOURCE_POOLS for VIRTUAL_SERVER use. In some scenarios, especially when many VIRTUAL_SERVERS are sharing common VIRTUALIZATION_RESOURCE_POOL, it may be useful to monitor VIRTUALIZATION_RESOURCE_POOL PERFORMANCE_COUNTERS as well. VIRTUAL_SERVERS can use dedicated or shared hardware RESOURCES such as RAM, CPU, disk and NETWORK via this VIRTUALIZATION_RESOURCE_POOL PHYSICAL_SERVER: A PHYSICAL_SERVER contains many necessary PERFORMANCE_COUNTERS such as CPU USAGE (%). One PHYSICAL_SERVER may contain one to many VIRTUALIZATION_RESOURCE_POOLS. PHYSICAL_SERVER may be connected into one or more STORAGE_UNITS and utilize one or more PHYSICAL_SERVER_NETWORK_INTERFACE:s.

PHYSICAL_SERVER_NETWORK_INTERFACE: PHYSICAL_SERVER_NETWORK_INTERFACE throughput monitoring is essential in NETWORK side CAPACITY_MANAGEMENT and CAPACITY_PLANNING calculations. A PHYSICAL_SERVER_NETWORK_INTERFACE may contain many PHYSICAL_SERVER_NETWORK_INTERFACE_PORTS i.e. ports.

STORAGE_UNIT_NETWORK_INTERFACE. Also a STORAGE_UNIT_NETWORK_INTERFACE throughput monitoring is essential in NETWORK side CAPACITY_MANAGEMENT and CAPACITY_PLANNING calculations. A STORAGE_UNIT_NETWORK_INTERFACE may contain many STORAGE_UNIT_NETWORK_INTERFACE_PORTS i.e. ports.

PHYSICAL_SERVER_NETWORK_INTERFACE_PORT: PHYSICAL_SERVER_NETWORK_INTERFACE_PORT provides a connection from PHYSICAL_SERVER into NETWORK.

STORAGE_UNIT_NETWORK_INTERFACE_PORT: STORAGE_UNIT_NETWORK_INTERFACE_PORT provides a connection from STORAGE_UNIT into NETWORK.

NETWORK: NETWORK contains useful PERFORMANCE_COUNTERS for CAPACITY_MANAGEMENT and CAPACITY_PLANNING. There can be multiple NETWORKS in one DATA_CENTER.

STORAGE_UNIT: STORAGE_UNITS contain essential PERFORMANCE_COUNTERS for storage side CAPACITY_MANAGEMENT and CAPACITY_PLANNING such as disk milliseconds per read. There can be many STORAGE_UNITS being used by PHYSICAL_SERVERS or VIRTUAL_SERVERS and vice versa.

NETWORK_GROUP: NETWORK_GROUP contains is a collection of unified NETWORKS typically for administering purposes. There can be multiple NETWORK_GROUPS in one DATA_CENTER.

DATA_CENTER: Each individual DATA_CENTER may contain multiple NETWORK_GROUPS or NETWORKS.

There exists different kinds of quantitative information that can be logged from the environment. Most essential of these OBJECT types defined in the glossary with more detail are:
  MODEL_DATA
  SETUP_DATA
  USER_SETTINGS
  CONFIGURATION_DATA
  PERFORMANCE_COUNTERS
  CONSTRAINTS Monitored PERFORMANCE_COUNTER data TIME_SERIES data model should be enriched with some parallel statistical data such as MIN, MAX, AVERAGE, MEDIAN, MODE, STANDARD_DEVIATION and PEAKING_TIME in all those cases the TREND_CALCULATION benefits from it. For SETUP_DATA, CONFIGURATION_DATA and USER_SETTINGS it is mostly enough to have an actual value for each data member.

Now many essential PERFORMANCE_COUNTERS used for ENGINE forecast purposes will be defined. Some of these counters may exist with different name in different OS, virtualization- and DBMS's, some of the counters may be unavailable and there may be many more other reasonable PERFORMANCE_COUNTERS available as well.

Any of the PERFORMANCE_COUNTERS described can be used individually and as compositions with any other PERFORMANCE_COUNTER for CONSTRAINT calculations. For most of the PERFORMANCE_COUNTERS the MIN (minimum value), MAX (maximum value), WARNING and ALERT values may vary. These are just sample values and should be adjusted based on current SOURCE_SYSTEM and CONSTRAINT LIMITS.

Note that earlier mentioned NETWORK OBJECTS and different kinds of RESOURCE_POOLS may have different abstraction LEVELS in different SOURCE_SYSTEM and TARGET_SYSTEM environments. Some of the PERFORMANCE_COUNTERS may exist on various OBJECTS but in different abstraction LEVEL such as PHYSICAL NETWORK_THROUGHPUT (MBIT/SEC). Tables below are not trying to be a complete set of PERFORMANCE_COUNTERS; in lieu they should be used as a guidance for describing the ideology behind CONSTRAINT-based ENGINE calculations.

As a best practice, in order to follow actual and forecasted CONSTRAINTS on PHYSICAL_SERVER, VIRTUAL_SERVER-, DBMS_INSTANCE-, RESOURCE_POOL- and DATABASE LEVELS we define ALERTS and WARNINGS for desired PERFORMANCE_COUNTERS.

ALERT is such CONSTRAINT LIMIT value for certain PERFORMANCE_COUNTER that may profoundly endanger SYSTEM or a part of it or lead into a non-functionality or disaster scenarios. Some of these values are preliminary specified and some user-specific. For example, if PHYSICAL_SERVER PERFORMANCE_COUNTER CPU USAGE (%) has set an Alert value for 60% and if the actual value exceeds average of 60% in wanted sampling interval such as 5 minutes the Alert criteria is met for current counter.

WARNING CONSTRAINT LIMIT value for certain PERFORMANCE_COUNTER may potentially endanger, hamper or slow down SYSTEM or a part of it but is not that critical of its nature as Alert LIMIT value, yet though potentially serious threat to the SYSTEM functionality and would potentially lead into Alert scenario.

For each NETWORK it is essential to measure NETWORK traffic load over time on CAPACITY_MANAGEMENT and CAPACITY_PLANNING purposes.

| PERFORMANCE_COUNTER | WARNING | ALERT | MIN | MAX | DESCRIPTION |
|---|---|---|---|---|---|
| PHYSICAL NETWORK_THROUGHPUT (MBIT/SEC) | 50 | 70 | 0 | 100 | The usage of the NETWORK_INTERFACE in megabits per second. Very useful PERFORMANCE_COUNTER for many OBJECTS such as NETWORK core switches, NETWORK_INTERFACES and such within NETWORK TOPOLOGY. Essential PERFORMANCE_COUNTER for NETWORK, PHYSICAL_SERVER_NETWORK_INTERFACE, PHYSICAL_SERVER_NETWORK_INTERFACE_PORT, STORAGE_UNIT_NETWORK_INTERFACE or STORAGE_UNIT_NETWORK_INTERFACE_PORT OBJECTS etc. |

For each PHYSICAL_SERVER it is essential to measure different kinds of over time on CAPACITY_MANAGEMENT and CAPACITY_PLANNING purposes.

| CATEGORY | PERFORMANCE_COUNTER | WARNING | ALERT | MIN | MAX | DESCRIPTION |
|---|---|---|---|---|---|---|
| CPU | CPU USAGE (%) | 60 | 80 | 0 | 100 | The percentage of elapsed time that the PROCESSOR spends executing a non-idle thread. A value of 80% or higher indicates a bottleneck. |
| CPU | PROCESSOR QUEUE LENGTH | 5 | 8 | 0 | 10 | The number of requests outstanding on the disk at the time the performance data is collected. |
| DISK | DISK MILLISECONDS PER READ | 20 | 50 | 0 | 1000 | Measure of disk latency. Avg. Disk millisec/Write is the average time, in milliseconds, of a write of data to the disk. |

-continued

| CATEGORY | PERFORMANCE_COUNTER | WARNING | ALERT | MIN | MAX | DESCRIPTION |
|---|---|---|---|---|---|---|
| DIST | DISK MILLISECONDS PER WRITE | 20 | 50 | 0 | 1000 | Measure of disk latency. Avg. Disk millisec/Read is the average time, in milliseconds, of a read of data from the disk. While it is better to have fast disk read times, this can easily be compensated for by allocating enough RAM to the SERVER and to SQL. |
| DISK | DISK QUEUE LENGTH | 5 | 8 | 0 | 10 | The average number of both read and write requests that were queued for the selected disk during the sample interval. |
| DISK | DISK READS/ SEC | 500 | 800 | 0 | 5000 | The rate of read operations on the disk. |
| DISK | DISK TIME (%) | 60 | 80 | 0 | 100 | Measures the amount of PHYSICAL memory in MB available for running processes. If this value is less than 5% of the total PHYSICAL RAM there is insufficient memory, which can increase paging activity. |
| DISK | DISK WRITES/ SEC | 500 | 800 | 0 | 5000 | The rate of write operations on the disk. |
| MEMORY | AVAILABLE MEMORY (MB) | 2000 | 1000 | 0 | 20000 | This measure is the % of elapsed time that certain disk drive was busy servicing read or writes requests. A general guideline is that if this value is greater than 50%, it represents an I/O bottleneck. |
| MEMORY | PAGING FILE USAGE (%) | 60 | 70 | 0 | 100 | Current amount of Page file being used. This is a key number when weighing the amount of memory allocated to the OS. If this number is high, then the OS is choked for RAM. Either increase the RAM on the box or deallocate from SQL. If this is between 10% and 25% you should reboot. |
| OTHER | PHYSICAL NETWORK_THROUGHPUT (MBIT/ SEC) | 50 | 70 | 0 | 100 | The combined usage of the SERVER's NETWORK_INTERFACES in meabits per second. |

40

Storage Unit Performance Counters

| CATEGORY | PERFORMANCE_COUNTER | WARNING | ALERT | MIN | MAX | DESCRIPTION |
|---|---|---|---|---|---|---|
| DISK | DISK MILLISECONDS PER READ | 20 | 50 | 0 | 1000 | Measure of disk latency. Avg. Disk millisec/Write is the average time, in milliseconds, of a write of data to the disk. |
| DISK | DISK MILLISECONDS PER WRITE | 20 | 50 | 0 | 1000 | Measure of disk latency. Avg. Disk millisec/Read is the average time, in milliseconds, of a read of data from the disk. While it is better to have fast disk read times, this can easily be compensated for by allocating enough RAM to the SERVER and to SQL. |
| DISK | DISK QUEUE LENGTH | 5 | 8 | 0 | 10 | The average number of both read and write requests that were queued for the selected disk during the sample interval. |
| DISK | DISK READS/ SEC | 500 | 800 | 0 | 5000 | The rate of read operations on the disk. |
| DISK | DISK TIME (%) | 60 | 80 | 0 | 100 | Measures the amount of PHYSICAL memory in MB available for running processes. If this value is less than 5% of the total PHYSICAL RAM there is insufficient memory, which can increase paging activity. |

-continued

| CATEGORY | PERFORMANCE_COUNTER | WARNING | ALERT | MIN | MAX | DESCRIPTION |
|---|---|---|---|---|---|---|
| DISK | DISK WRITES/ SEC | 500 | 800 | 0 | 5000 | The rate of write operations on the disk. |

DBMS Instance Level Performance Counters

| CATEGORY | PERFORMANCE_COUNTER | WARNING | ALERT | MIN | MAX | DESCRIPTION |
|---|---|---|---|---|---|---|
| CPU | CPU USAGE (%) | 60 | 80 | 0 | 100 | The percentage of elapsed time that the PROCESSOR spends executing a non-idle thread. A value of 80% or higher indicates a bottleneck. |
| CPU | PAGE SPLITS/ SEC | 20 | 40 | 0 | 100 | Number of page splits per second. If you find out that the number of page splits is high, consider increasing the fill factor of your indexes. |
| CPU | WORKFILES CREATED/ SEC | 20 | 40 | 0 | 100 | Number of worktables created in tempdb per second. |
| CPU | WORKTABLES CREATED/ SEC | 20 | 40 | 0 | 100 | Number of work files created per second. |
| DISK | IO READS/ SEC | 3000 | 4000 | 0 | 5000 | The number of disk reads, not cache reads, per second. |
| DISK | IO WRITES/ SEC | 3000 | 4000 | 0 | 5000 | The number of disk writes per second. |
| DISK | IO BUSY/ SEC | 6000 | 8000 | 0 | 10000 | The number of input and output operations per second. |
| MEMORY | BUFFER CACHE HIT RATIO (%) | 70 | 30 | 0 | 100 | Percentage of pages that were found in the buffer pool without having to read from disk. |
| MEMORY | CHECKPOINT PAGES/ SEC | 10 | 20 | 0 | 100 | Monitors the number of dirty pages, per second, that are flushed to disk when SQL SERVER invokes the checkpoint process. Checkpoint frequency is influenced by the recovery interval setting in sp_configure. High values for this PERFORMANCE_COUNTER may indicate insufficient memory or that the recovery interval is too high. |
| MEMORY | LAZY WRITES/ SEC | 20 | 40 | 0 | 100 | Monitors the number of times per second that the Lazy Writer process moves dirty pages from the buffer to disk as it frees up buffer space. Lower is better with zero being ideal. When greater than 20, this PERFORMANCE_COUNTER indicates a need for more memory. |
| MEMORY | PAGE LIFE EXPECTANCY (SEC) | 1000000 | 1000000 | 0 | 2500000 | The number of seconds a page will stay in the buffer pool without references. |
| MEMORY | PAGE READS/ SEC | 50 | 75 | 0 | 100 | The rate at which pages are read from disk to resolve hard page faults. High values are indicative of possible page file usage, and a memory bottleneck somewhere on the SYSTEM. |
| MEMORY | PAGE WRITES/ SEC | 50 | 75 | 0 | 100 | The rate at which pages are written to disk to resolve hard page faults. High values are indicative of possible page file usage, and a memory bottleneck somewhere on the SYSTEM. |
| MEMORY | MEMORY USAGE (MB) | 7000 | 8000 | 0 | 8000 | Memory used by SQL SERVER. |
| OTHER | LATCH WAIT TIME (MS) | 90 | 100 | 0 | 100 | The average wait time for latch requests in milliseconds. |

-continued

| CATEGORY | PERFORMANCE_COUNTER | WARNING | ALERT | MIN | MAX | DESCRIPTION |
|---|---|---|---|---|---|---|
| OTHER | BATCH REQUESTS/ SEC | 3000 | 5000 | 0 | 10000 | Number of batch requests received per second, and is a good general indicator for the activity LEVEL of the SQL SERVER. This PERFORMANCE_COUNTER is highly dependent on the hardware and quality of code running on the SERVER. The more powerful the hardware, the higher this number can be, even on poorly coded applications. |
| OTHER | SQL COMPILATIONS/ SEC | 5 | 10 | 0 | 100 | Number of times that Transact-SQL compilations occurred, per second (including recompiles). Should be less than 10% of batch requests/sec. |
| OTHER | SQL RECOMPILATIONS/ SEC | 2 | 5 | 0 | 10 | Number of times, per second, that Transact-SQL OBJECTS attempted to be executed but had to be recompiled before completion. |
| TRANSACTIONS | WAIT TIME (MS) | 500 | 1000 | 0 | 5000 | The average wait time in milliseconds to acquire a lock. |
| TRANSACTIONS | LOCK REQUESTS/ SEC | 1000 | 2000 | 0 | 10000 | The number of new locks and locks converted per second. |
| TRANSACTIONS | DEADLOCKS/ SEC | 1 | 5 | 0 | 10 | Number of lock requests, per second, which resulted in a deadlock. |
| USERS | LOGINS/ SEC | 3 | 7 | 0 | 10 | The number of user logins per second. Any value over 2 may indicate insufficient connection pooling. |
| USERS | LOGOUTS/ SEC | 3 | 7 | 0 | 10 | The number of user logouts per second. Any value over 2 may indicate insufficient connection pooling. |
| USERS | USER CONNECTIONS | 90 | 100 | 0 | 100 | The number of users connected to the SQL SERVER. |

Database Level Performance Counters

| CATEGORY | PERFORMANCE_COUNTER | WARNING | ALERT | MIN | MAX | DESCRIPTION |
|---|---|---|---|---|---|---|
| DISK | DATA FILE SIZE (MB) | 5000 | 8000 | 0 | 10000 | Allocated DATABASE data file disk storage in megabytes. |
| DISK | LOG FILE SIZE (MB) | 3000 | 4000 | 0 | 5000 | Allocated log file disk storage in megabytes. |
| DISK | USED DATA FILE SIZE (MB) | 5000 | 8000 | 0 | 10000 | Used DATABASE data file disk storage in megabytes. |
| DISK | USED LOG FILE SIZE (MB) | 3000 | 4000 | 0 | 5000 | Used log file disk storage in megabytes. |
| USERS | DATABASE LOGINS | 50 | 80 | 0 | 100 | The number of DATABASE logins. |

Hyper-V Virtualization Performance Counters

Even though the ideology behind measuring virtualized environment PERFORMANCE_COUNTERS is much alike to PHYSICAL environment PERFORMANCE_COUNTERS, many exceptions occur in collecting the MONITORING_DATA. This may vary a lot depending on current virtualization platform. In sample below is enlisted top LEVEL PERFORMANCE_COUNTERS to be considered to monitor in Hyper-V environment. Similar PERFORMANCE_COUNTERS may be found on VMware environment as well.
  PROCESSOR
    PROCESSOR
    Hyper-V Hypervisor Logical PROCESSOR
    Hyper-V Hypervisor Virtual PROCESSOR
    Hyper-V Hypervisor Root Virtual PROCESSOR
  Memory
    Memory
    Hyper-V Hypervisor Partition
    Hyper-V Hypervisor Partition
    Hyper-V Root Partition
  Storage
    PHYSICAL Disk
    Hyper-V Virtual IDE Controller
    Hyper-V Virtual STORAGE_UNIT
  NETWORKING
    NETWORK_INTERFACE
    Hyper-V Virtual Switch Hyper-V Virtual NETWORK Adapter
Hyper-V Legacy NETWORK Adapter
Overall health
Hyper-V Hypervisor
Hyper-V Virtual Machine Health Summary For more information on essential Hyper-V Perform counters review MSDN documentation.

The following defines ENVIRONMENT_VARIABLES; USER_SETTINGS, CONFIGURATION_DATA, MODEL_DATA and SETUP_DATA used in ENGINE forecasts. Some of these ENVIRONMENT_VARIABLES may exist with different name in different OS, Virtualization- and DBMS's, some of the counters may be unavailable and there may be many more other reasonable PERFORMANCE_ COUNTERS available as well.

Note that earlier mentioned NETWORK OBJECTS and different kinds of RESOURCE_POOLS may have different abstraction LEVELS in different SOURCE_SYSTEM and TARGET_SYSTEM environments. Some of the ENVIRONMENT_VARIABLES as well may exist on various OBJECTS but in different abstraction LEVEL. Tables below are not trying to be a complete set of ENVIRONMENT_VARIABLES; in lieu they should be used as a guidance for describing the core ideology behind CONSTRAINT-based ENGINE calculations.

In table below is enlisted some generic USER_SETTINGS to maintain for any device, DBMS_INSTANCE or DATABASE within the DATA_CENTER TOPOLOGY. Such OBJECTS and such enlisted with such properties make CAPACITY_MANAGEMENT and CAPACITY_PLANNING FORECASTS easier to maintain and more precise. Some of these settings such as current SERVER series may be available in the SYSTEM automatically as well.

| COLUMN | SAMPLE VALUE | DESCRIPTION |
|---|---|---|
| CUSTOMER_SEGMENT | "Industrial T1" | Name of the CUSTOMER segment if we deal with shared multitenant environment/device. |
| CUSTOMER | "Fujitsu" | Name of the CUSTOMER if we deal with multitenant environment/device. |
| DATA_CENTER | "Helsinki HQ" | Name of the DATA_CENTER current device PHYSICALly exists in. |
| COUNTRY | "Finland" | Name of the country where current device PHYSICALly exists in. |
| REGION | "Uusimaa" | Name of the region where current device PHYSICALly exists in. |
| MUNICIPALITY | "Helsinki" | Name of the municipality where current device PHYSICALly exists in. |
| NETWORK_GROUP | "MyNETWORKGroup" | Id or name of the NETWORK_GROUP current device exists in. |
| NETWORK | "MyNETWORK" | Id or name of the NETWORK current device PHYSICALly exists in. |
| DOMAIN NAME | "MyDOMAIN" | Id or name of the (Windows) DOMAIN current SERVER PHYSICALly exists in (if used). |
| BRAND | "DELL" | Current device brand. |
| GENERATION | "13" | Current device generation. |
| SERIES | "Poweredge" | Current device series. |
| MODEL NAME | "R730xd" | Current device model name. |
| RESPONSIBLE | "John Doe" | Responsible DBA for current device. |
| DEVICE OWNER | "Own" | Owner of the device; business unit, company etc. |
| SERVICE PROVIDER | "Fujitsu" | Service provider if different from the owner. |
| IS PRODICTION DEVICE | "1" | "1" if current device is in production use, "0" if not. |
| DEPLOYMENT DATE | "2014 Dec. 31" | When device was deployed first time. |
| PLANNED DECOMMISSSION DATE | "2014 Dec. 31" | When current device is planned to be decommissioned. |
| IS INTERNET DEVICE | "1" | If current device is an internet device. |
| LIFECYCLE | "5-7 years" | Planned LIFECYCLE category for current device. You can create categories of your own. |
| USERS | "501-1000" | Planned end user amount category for current device. You can create categories of your own. |
| CRITICALITY | "Critical" | Planned CRITICALITY category for current device. You can create categories of your own. |
| DEVICE TYPE | "Virtual" | Tells us if device is PHYSICAL or virtual one. |

NETWORK Specific SETUP DATA

In table below is enlisted some useful NETWORK SETUP_DATA to collect and maintain.

| COLUMN | SAMPLE VALUE | DESCRIPTION |
|---|---|---|
| NETWORK TYPE | "Primary" | Which kind of NETWORK this is: Primary, Secondary, Backup, Admin etc. |

-continued

| COLUMN | SAMPLE VALUE | DESCRIPTION |
|---|---|---|
| CONFIGURED NETWORK CAPACITY MBITS | "100000" | Information on theoretical NETWORK capacity with current configuration. |
| TRUE NETWORK CAPACITY MBITS | "75000" | Information on true NETWORK capacity estimate with current configuration. |

NETWORK Specific MODEL DATA

In table below is enlisted some essential NETWORK MODEL_DATA CONSTRAINTS to collect and maintain.

| COLUMN | SAMPLE VALUE | DESCRIPTION |
|---|---|---|
| MAX NETWORK CAPACITY MBITS | "1000000" | Information on theoretical maximum of NETWORK capacity that is possible to configure in current NETWORK. |
| MAX TRUE NETWORK CAPACITY MBITS | "750000" | Information on theoretical maximum of true NETWORK capacity estimate that is possible to configure in current NETWORK. |

NETWORK INTERFACE Specific SETUP DATA

In table below is enlisted sample of some useful NETWORK_INTERFACE SETUP_DATA on port LEVEL to collect and maintain.

| COLUMN | SAMPLE VALUE | DESCRIPTION |
|---|---|---|
| TYPE | "PHYSICAL" | If current NETWORK_INTERFACE is PHYSICAL or virtualized. |
| PORT COUNT | "2" | NETWORK_INTERFACE configured port count. |
| PORT 1 CONFIGURED NETWORK CAPACITY MBITS | "10000" | Information on theoretical NETWORK_INTERFACE_PORT capacity with current configuration. |
| PORT 1 TRUE NETWORK CAPACITY MBITS | "8000" | Information on true NETWORK_INTERFACE_PORT capacity estimate with current configuration. |
| PORT 2 CONFIGURED NETWORK CAPACITY MBITS | "10000" | Information on theoretical NETWORK_INTERFACE_PORT capacity with current configuration. |
| PORT 2 TRUE NETWORK CAPACITY MBITS | "8000" | Information on true NETWORK_INTERFACE_PORT capacity estimate with current configuration. |
| PORT 3 CONFIGURED NETWORK CAPACITY MBITS | "1000" | Information on theoretical NETWORK_INTERFACE_PORT capacity with current configuration. |
| PORT 3 TRUE NETWORK CAPACITY MBITS | "800" | Information on true NETWORK_INTERFACE_PORT capacity estimate with current configuration. |
| PORT 4 CONFIGURED NETWORK CAPACITY MBITS | "1000" | Information on theoretical NETWORK_INTERFACE_PORT capacity with current configuration. |
| PORT 4 TRUE NETWORK CAPACITY MBITS | "800" | Information on true NETWORK_INTERFACE_PORT capacity estimate with current configuration. |

NETWORK INTERFACE Specific MODEL DATA

In table below is enlisted some essential NETWORK_INTERFACE MODEL_DATA to collect and maintain.

| COLUMN | SAMPLE VALUE | DESCRIPTION |
|---|---|---|
| TYPE | "PHYSICAL" | If current NETWORK_INTERFACE is PHYSICAL or virtualized. |
| PORT COUNT | "4" | NETWORK_INTERFACE maximum theoretical port count. |

-continued

| COLUMN | SAMPLE VALUE | DESCRIPTION |
| --- | --- | --- |
| PORT 1 CONFIGURED NETWORK CAPACITY MBITS | "20000" | Information on maximum theoretical NETWORK_INTERFACE_PORT capacity. |
| PORT 1 TRUE NETWORK CAPACITY MBITS | "16000" | Information on maximum teoretical NETWORK_INTERFACE_PORT capacity estimate. |
| PORT 2 CONFIGURED NETWORK CAPACITY MBITS | "20000" | Information on maximum theoretical NETWORK_INTERFACE_PORT capacity. |
| PORT 2 TRUE NETWORK CAPACITY MBITS | "16000" | Information on maximum theoretical NETWORK_INTERFACE_PORT capacity estimate. |
| PORT 3 CONFIGURED NETWORK CAPACITY MBITS | "2000" | Information on maximum theoretical NETWORK_INTERFACE_PORT capacity. |
| PORT 3 TRUE NETWORK CAPACITY MBITS | "1600" | Information on maximum theoretical NETWORK_INTERFACE_PORT capacity estimate. |
| PORT 4 CONFIGURED NETWORK CAPACITY MBITS | "2000" | Information on maximum theoretical NETWORK_INTERFACE_PORT capacity. |
| PORT 4 TRUE NETWORK CAPACITY MBITS | "1600" | Information on maximum theoretical true NETWORK_INTERFACE_PORT capacity estimate. |

SERVER Specific SETUP DATA
In table below is enlisted some useful SETUP_DATA to collect and maintain.

| COLUMN | SAMPLE VALUE | DESCRIPTION |
| --- | --- | --- |
| OS NAME | "Windows SERVER 2012 R2" | Current SERVER operating system name. |
| OS EDITION | "Datacenter" | Current SERVER edition. |
| SYSTEM TYPE | "64 bits/x64 CPU" | Current SYSTEM type. |
| IP ADDRESS | "148.198.170.24" | Current SERVER IP address. |
| MAC ADDRESS | "7C-A3-F0-7F-0B-FC" | Current SERVER MAC address. |
| LOGICAL CPU COUNT | "12" | Number of logical CPU cores on current SERVER. If hyper threading is active, logical CPU count is same as total thread count. |
| PHYSICAL CPU COUNT | "6" | Number of PHYSICAL CPU cores on current SERVER. |
| CPU SOCKETS IN USE | "12" | Number of RAM slots currently in use on SERVER. |
| PROCESSOR TYPE | "PHYSICAL" | Virtual or PHYSICAL. |
| PROCESSOR DETAILS | "Intel Xeon E5-2643 v3 3.4 GHz, 20M Cache, 9.60 GT/s QPI, Turbo, HT, 6C/12T" | Basic PROCESSOR SYSTEM info. |
| RAM MEMORY MB | "384000" | Amount of RAM memory installed on current SERVER. |
| RAM SLOTS IN USE | "24" | Number of PHYSICAL RAM module slots on motherboard. |
| RAM SPEED MBS | "1600" | Current RAM modules' maximum speed in MB/S. |
| NETWORK_INTERFACE COUNT | "4" | Information on how many NETWORK cards is currently installed in motherboard. |
| CONFIGURED NETWORK CAPACITY MBITS | "2" | Information on theoretical overall NETWORK capacity configured on motherboard. |
| TRUE NETWORK CAPACITY MBITS | "1.5" | Information on true overall NETWORK capacity estimate configured on motherboard. |

SERVER Specific MODEL DATA

In table below is enlisted many of the very essential SERVER MODEL_DATA CONSTRAINTS to collect and maintain.

| COLUMN | SAMPLE VALUE | DESCRIPTION |
| --- | --- | --- |
| MAX LOGICAL CPU COUNT | "24" | Information on maximum theoretical logical CPU cores that can be installed on current SERVER. If hyper threading is active, max logical CPU count is same as max total thread count. |
| MAX PHYSICAL CPU COUNT | "12" | Information on maximum theoretical PHYSICAL CPU cores that can be installed on current SERVER. |
| MAX CPU SOCKET COUNT | "2" | Information on maximum theoretical PHYSICAL PROCESSOR slots on motherboard. |
| MAX RAM MEMORY MB | "768000" | Information on maximum theoretical RAM memory that can be installed on current SERVER. |
| MAX RAM SLOTS | "24" | Information on maximum theoretical PHYSICAL RAM module slots on motherboard. |
| MAX RAM SPEED MBS | "1600" | Information on maximum theoretical supported RAM module speed in MB/S. |
| MAX DISK SPACE GB | "1000" | Information on maximum theoretical SYSTEM disk space on current SERVER. |
| MAX NETWORK_INTERFACE COUNT | "4" | Information on how many NETWORK cards can be installed on motherboard in maximum. |

STORAGE UNIT Specific SETUP DATA

In table below is enlisted some useful configurations to collect and maintain. Performance and therefore configuration values written on the STORAGE_UNIT depend a lot of used storage technology, LUN configurations, device usage (dedicated, NAS, SAN . . . ) and such. That's why, on-by case basis; for shared STORAGE_UNITS, you should calculate and keep up the record for both planned performance calculations and CONSTRAINT LIMITS for each of these OBJECT separately; one for each CUSTOMER, SERVER, DBMS_INSTANCE, DATABASE, DATABASE file type etc. For dedicated STORAGE_UNITS defining the CONFIGURATION_DATA is more straightforward because there will be no shared RESOURCES using same STORAGE_UNIT; there is only one CUSTOMER, SERVER and DBMS_INSTANCE, DATABASE or a set of DATABASE file types.

Calculating and booking in all this information comes handy when forecasting CAPACITY_MANAGEMENT and CAPACITY_PLANNING LIFECYCLE and possible configuration scenarios on STORAGE_UNIT area. In addition to the enlisted data it is a good idea to keep track on corresponding track record for each disk type and LUN type configured on current STORAGE_UNIT for different read and write performance figures, amount of configured units and total disk space configured.

| COLUMN | SAMPLE VALUE | DESCRIPTION |
| --- | --- | --- |
| RANDOM READ MBS | "100" | Maximum random read megabytes per second on current configuration. |
| RANDOM WRITE MBS | "50" | Maximum random write megabytes per second on current configuration. |
| SEQUENTIAL READ MBS | "1000" | Maximum sequential read megabytes per second on current configuration. |
| SEQUENTIAL WRITE MBS | "500" | Maximum sequential write megabytes per second on current configuration. |
| RANDOM READ IOPS | "1000" | Maximum random read I/O operations per second on current configuration. |
| RANDOM WRITE IOPS | "500" | Maximum random write I/O operations per second on current configuration. |
| SEQUENTIAL READ IOPS | "10000" | Maximum sequential read I/O operations per second on current configuration. |
| SEQUENTIAL WRITE IOPS | "5000" | Maximum sequential write I/O operations per second on current configuration. |
| TOTAL IOPS | "7500" | Maximum I/O operations per second (when performing a mix of read and write tests on current configuration. |
| RESERVED DATA STORAGE GB | "1000" | Tells us how much data storage disk space current configuration contains |
| RESERVED LOG STORAGE GB | "1000" | Tells us how much log storage disk space current configuration contains |
| RESERVED BACKUP STORAGE GB | "0" | Tells us how much backup storage disk space current configuration contains |
| NETWORK_INTERFACE COUNT | "4" | Information on how many NETWORK cards is currently installed in STORAGE_UNIT. |
| CONFIGURED NETWORK CAPACITY MBITS | "2" | Information on theoretical overall NETWORK capacity configured on STORAGE_UNIT. |

-continued

| COLUMN | SAMPLE VALUE | DESCRIPTION |
|---|---|---|
| TRUE NETWORK CAPACITY MBITS | "1.5" | Information on true overall NETWORK capacity estimate configured on STORAGE_UNIT. |

STORAGE UNIT Specific MODEL DATA

In table below is enlisted many of the very essential SERVER MODEL_DATA to collect and maintain. Also for the SETUP_DATA; it is a good idea to keep track on corresponding track record for each disk type and LUN type configured on current STORAGE_UNIT for different max read and write performance figures, amount of configurable units and total disk space on selected configurations.

| COLUMN | SAMPLE VALUE | DESCRIPTION |
|---|---|---|
| MAX RANDOM READ MBS | "1000" | Maximum theoretical random read megabytes per second that can be configured on current STORAGE_UNIT. |
| MAX RANDOM WRITE MBS | "500" | Maximum theoretical random write megabytes per second that can be configured on current STORAGE_UNIT. |
| MAX SEQUENTIAL READ MBS | "10000" | Maximum theoretical sequential read megabytes per second that can be configured on current STORAGE_UNIT. |
| MAX SEQUENTIAL WRITE MBS | "5000" | Maximum theoretical sequential write megabytes per second that can be configured on current STORAGE_UNIT. |
| MAX RANDOM READ IOPS | "10000" | Maximum theoretical random read I/O operations per second that can be configured on current STORAGE_UNIT. |
| MAX RANDOM WRITE IOPS | "5000" | Maximum theoretical random write I/O operations per second that can be configured on current STORAGE_UNIT |
| MAX SEQUENTIAL READ IOPS | "100000" | Maximum theoretical sequential read I/O operations per second that can be configured on current STORAGE_UNIT. |
| MAX SEQUENTIAL WRITE IOPS | "50000" | Maximum theoretical sequential write I/O operations per second that can be configured on current STORAGE_UNIT. |
| MAX TOTAL IOPS | "75000" | Maximum theoretical I/O operations per second (when performing a mix of read and write tests) that can be configured on current STORAGE_UNIT. |
| MAX RESERVED DATA STORAGE GB | "10000" | Tells us how much data storage disk that can be configured on current STORAGE_UNIT at maximum. |
| MAX RESERVED LOG STORAGE GB | "10000" | Tells us how much log storage disk space can be configured on current STORAGE_UNIT at maximum. |
| MAX RESERVED BACKUP STORAGE GB | "0" | Tells us how much backup storage disk space can be configured on current STORAGE_UNIT at maximum. |
| MAX NETWORK_INTERFACE COUNT | "2" | Information on how many NETWORK_INTERFACES can be configured on current STORAGE_UNIT at maximum. |
| MAX CONFIGURED NETWORK CAPACITY MBITS | "2" | Information on theoretical overall NETWORK capacity that can be configured on current STORAGE_UNIT at maximum. |
| MAX TRUE NETWORK CAPACITY MBITS | "1.5" | Information on Maximum theoretical true NETWORK capacity that can be configured on current STORAGE_UNIT at maximum. |

DBMS INSTANCE Specific conflagrations

For DBMS_INSTANCE specific configurations, in addition to below enlisted data members you should consider taking in count any other DBMS_INSTANCE configurations as well.

| INSTANCE NAME | SAMPLE VALUE | DESCRIPTION |
|---|---|---|
| DBMS_SYSTEM | "Microsoft SQL SERVER" | In which DBMS_SYSTEM instance is based on. |

-continued

| INSTANCE NAME | SAMPLE VALUE | DESCRIPTION |
| --- | --- | --- |
| NEEDS TO BE MIGRATED | "1" | If SERVER is set to be migrated. |
| WANTED MIGRATION SERVER VERSION | "SQL SERVER 2015" | DBMS_INSTANCE SERVER version for which it is planned to be migrated. |
| WANTED MIGRATION SERVER EDITION | "Enterprise" | DBMS_INSTANCE SERVER edition for which it is planned to be migrated. |
| PLANNED MIGRATION DATE | "2017 Dec. 31" | When current instance is planned to be migrated next time. |
| SERVICE | "SQL SERVER Integration Services" | IF DBMS_INSTANCE is dedicated into a certain service role only. This property can also be a list of services. |
| USERS | "1217" | True user count for current DBMS_INSTANCE. |
| CRITICALITY | "Critical" | Wanted CRITICALITY category for current DBMS_INSTANCE. |
| INSTANCE NAME | "SQL1\SSIS" | SERVER\INSTANCE name. |
| AUTHENTICATION METHOD | "Windows" | Windows, SQL SERVER, mixed mode, custom . . . |
| INSTANCE_VERSION | "SQL SERVER 2015" | Current DBMS_INSTANCE SERVER version. |
| INSTANCE_EDITION | "Enterprise" | Current DBMS_INSTANCE SERVER edition. |
| INSTANCE_SP | "SP1" | Current DBMS_INSTANCE service pack LEVEL (if available). |
| VERSION NUMBER | "9600" | Current DBMS_INSTANCE version. |
| MIN_INSTANCE_MEMORY_MB | 128000 | How much RAM current DBMS_INSTANCE is configured to use at minimum. |
| MAX_INSTANCE_MEMORY_MB | 256000 | How much RAM current DBMS_INSTANCE is configured to use at maximum. |
| IS_CLUSTERED | "0" | "1" if current DBMS_INSTANCE is clustered. |
| LOGIN_COUNT | "1" | True login count for current DBMS_INSTANCE. |

DBMS INSTANCE RESOURCE POOL Specific configurations

In addition to the below mentioned RESOURCE_POOLS, you should define possible workload groups with corresponding user groups and services using and sharing these RESOURCE_POOLS. This helps in CAPACITY_MANAGEMENT and CAPACITY_PLANNING configuration changes relates in CAPACITY_MANAGEMENT and CAPACITY_PLANNING FORECASTS.

| INSTANCE NAME | SAMPLE VALUE | DESCRIPTION |
| --- | --- | --- |
| POOL TYPE | "root" | Type of the RESOURCE_POOL. |
| POOL NAME | "default" | Name of the RESOURCE_POOL. |
| MIN CPU USAGE | "0" | Minimum CPU usage dedication for current RESOURCE_POOL. |
| MAX CPU USAGE | "100" | Maximum CPU usage dedication for current RESOURCE_POOL. |
| MIN RAM USAGE | "0" | Minimum RAM usage dedication for current RESOURCE_POOL. |
| MAX RAM USAGE | "100" | Maximum RAM usage dedication for current RESOURCE_POOL. |

DATABASE Specific Configurations

For DATABASE specific configurations, in addition to below enlisted data members you should consider taking in count any other DATABASE configurations as well.

| COLUMN | SAMPLE VALUES | DESCRIPTION |
| --- | --- | --- |
| DATABASE NAME | "Presales" | Current system DATABASE or user DATABASE logical name. |
| SERVICE | "SQL SERVER Integration Services" | If DATABASE is dedicated into a certain role only. |
| RECOVERY MODEL | "Full" | Current DATABASE recovery model. |
| IS ENCRYPTED | "1" | "1" if current DATABASE in encrypted. |

SPECIFYING PERFORMANCE_COUNTER CONSTRAINTS

CONSTRAINTS in General

Before FORECAST future CAPACITY_MANAGEMENT and CAPACITY_PLANNING needs on current SYSTEM can be done, desired CONSTRAINT LEVELS for each essential PERFORMANCE_COUNTER in the SYSTEM need to be set ideology behind the CONSTRAINTS is to be able to set desired THRESHOLD_VALUES, CONSTRAINT_GROUPS, CRITICAUTIES and quantitative LIMITS of their occurrences for each PERFORMANCE_COUNTER over one to many TIME_SPANS, AGGREGATION_LEVELS and CALCULATION_RULES. For each PERFORMANCE_COUNTER there can be different settings depending on environment; for example, a critical production SERVER may have very different CONSTRAINT requirements than some backend SERVER. Against these conditions, overall SYSTEM (or a SUB_SYSTEM) current CONSTRAINT health status can be diagnosed in quantitative manner which is a percentage from 0 to 100 on each PERFORMANCE_COUNTER and any fuzzy aggregation of them. With all this history data and conditions, we are able to FORECAST SYSTEM future health status more accurately.

CONSTRAINTS can be divided into any number of THRESHOLD_VALUES. CONSTRAINT THRESHOLD_VALUE can be precise value, a value range or it can be based on any scientific formula or calculation rule that can be derived from the PERFORMANCE_COUNTER_TIME_SERIES data alone or combined with other PERFORMANCE_COUNTER_TIME_SERIES or ENVIRONMENT_VARIABLES. In addition to this, one can comprise more than one CONSTRAINT viewpoint with different TIME_SPANS, LEVELS and CALCULATION_RULES based on any dimension ENVIRONMENT_VARIABLE(s) and/or other PERFORMANCE_COUNTER(s). For each individual CONSTRAINT we can define maximum occurrence during certain time period measured in percent, like 99.999% uptime for certain DBMS_INSTANCE per annum (positive CONSTRAINT) so reversibly maximum negative CONSTRAINT is 0.001%.

CONSTRAINTS can be generic or overriding CONSTRAINTS. A generic CONSTRAINT defines a generic CONSTRAINT rule for each PERFORMANCE_COUNTER. An overriding CONSTRAINT is the one which can override a general value. For example; we can define a PERFORMANCE_COUNTER "uptime" for all DBMS_INSTANCES to be generic 99.999% or the time but we can use overriding CONSTRAINT for a specific SERVER to be only 99.9% so the latter CONSTRAINT THRESHOLD_VALUE set for that specific SERVER overrides generic PERFORMANCE_COUNTER THRESHOLD_VALUE.

Furthermore; CONSTRAINTS can be FILTERED with restricted TIME_SERIES or any other given condition. For example; if we want to get rid of "DBMS_INSTANCE uptime" TIME_SERIES from during the service break, we will FILTER it out from the CONSTRAINT ENGINE analysis.

Constraint Levels

LEVEL restricts current PERFORMANCE_COUNTER. TIME_SERIES by including only certain dimension LEVELS to be analyzed in ENGINE. Below is enlisting of typical AGGREGATION_LEVELS on TIME_DIMENSION. TIME_DIMENSION may comprise many parallel time hierarchies consisting of different LEVELS like year-month-day, year-week-day etc. TIME_DIMENSION may also be as a Role Playing Dimension so the actual LEVEL members like "is working time" may differ depending on current PERFORMANCE_COUNTER; for example, working time hours can differ between the countries, business units and so on.

| TIME_DIMENSION LEVEL | DESCRIPTION |
| --- | --- |
| second | CONSTRAINT LEVEL aggregation on second LEVEL. |
| minute | CONSTRAINT LEVEL aggregation on minute LEVEL. |
| hour | CONSTRAINT LEVEL aggregation on hourly LEVEL. |
| day | CONSTRAINT LEVEL aggregation on daily LEVEL. |
| day of week | CONSTRAINT LEVEL aggregation on day of week LEVEL. |
| is working time | Boolean type of CONSTRAINT LEVEL aggregation when it was working time (or was not) |
| is working day | Boolean type of CONSTRAINT LEVEL aggregation when it was working day (or was not) |
| is weekend | Boolean type of CONSTRAINT LEVEL aggregation when it was weekend (or was not) |
| is holiday | Boolean type of CONSTRAINT LEVEL aggregation when it was holiday (or was not) |
| is midweek holiday | Boolean Type of CONSTRAINT LEVEL aggregation when it was midweek holiday (or was not) |
| holiday season | CONSTRAINT LEVEL aggregation on holiday season LEVEL. |
| week | CONSTRAINT LEVEL aggregation on weekly LEVEL. |
| annual week | CONSTRAINT LEVEL aggregation on annual week LEVEL. |
| month | CONSTRAINT LEVEL aggregation on monthly LEVEL. |
| semester | CONSTRAINT LEVEL aggregation on semester LEVEL. |
| quartile | CONSTRAINT LEVEL aggregation on quartile LEVEL. |
| year half | CONSTRAINT LEVEL aggregation on year half LEVEL. |
| year | CONSTRAINT LEVEL aggregation on yearly LEVEL. |
| month | CONSTRAINT LEVEL aggregation on monthly LEVEL. |
| year and month | CONSTRAINT LEVEL aggregation on year and month LEVEL. |
| year and week | CONSTRAINT LEVEL aggregation on year and week LEVEL. |
| . . . | |

Constraint Time Spans

TIME_SPAN restricts current PERFORMANCE_COUNTER_TIME_SERIES to be analyzed in ENGINE by defining start and end date times. Below is enlisting of typical TIME_SPANS. There may be many different parallel TIME_SPANS from which we can analyze CAPACITY_MANAGEMENT TIME_SERIES CONSTRAINTS:

TIME_SPAN SAMPLE VALUES

All TIME_SERIES: All the TIME_SERIES data from very beginning

Specific starting TIME_SPAN: All the TIME_SERIES data starting from desired start date Specific TIME_SPAN: All the TIME_SERIES data starting from desired start date and ending on desired end date Period to date YTD, MTD, WTD . . .

Running period: Running year, Running month, Running week, Running day . . .

All LEVEL members in all the TIME_SERIES: All months in all the TIME_SERIES, all weeks in all the TIME_SERIES, all days in all the TIME_SERIES . . .

All LEVEL members in selected TIME_SERIES: All months in from very beginning of TIME_SERIES, All weeks in starting from desired start date. All days in starting from desired start date and ending on desired end date . . .

Selected LEVEL members in all the TIME_SERIES: Only selected months in all the TIME_SERIES, selected weeks in all the TIME_SERIES, selected days in all the TIME_SERIES . . .

Selected LEVEL members in selected the TIME_SERIES: Only selected months from very beginning of TIME_SERIES, selected weeks in starting from desired start date, selected days in starting from desired start date and ending on desired end date . . .

As we can see, there may be many different parallel view points for TIME_SERIES analysis for each PERFORMANCE_COUNTER and it can vary on different abstraction LEVELS (SERVER, DBMS_INSTANCE, DATABASE . . . ) and data members (DATABASE x, DATABASE y, DATABASE z). So all the PERFORMANCE_COUNTERS can be individually set to meet our specific needs in general and as exceptions.

CONSTRAINT Data Model

Figure 4:
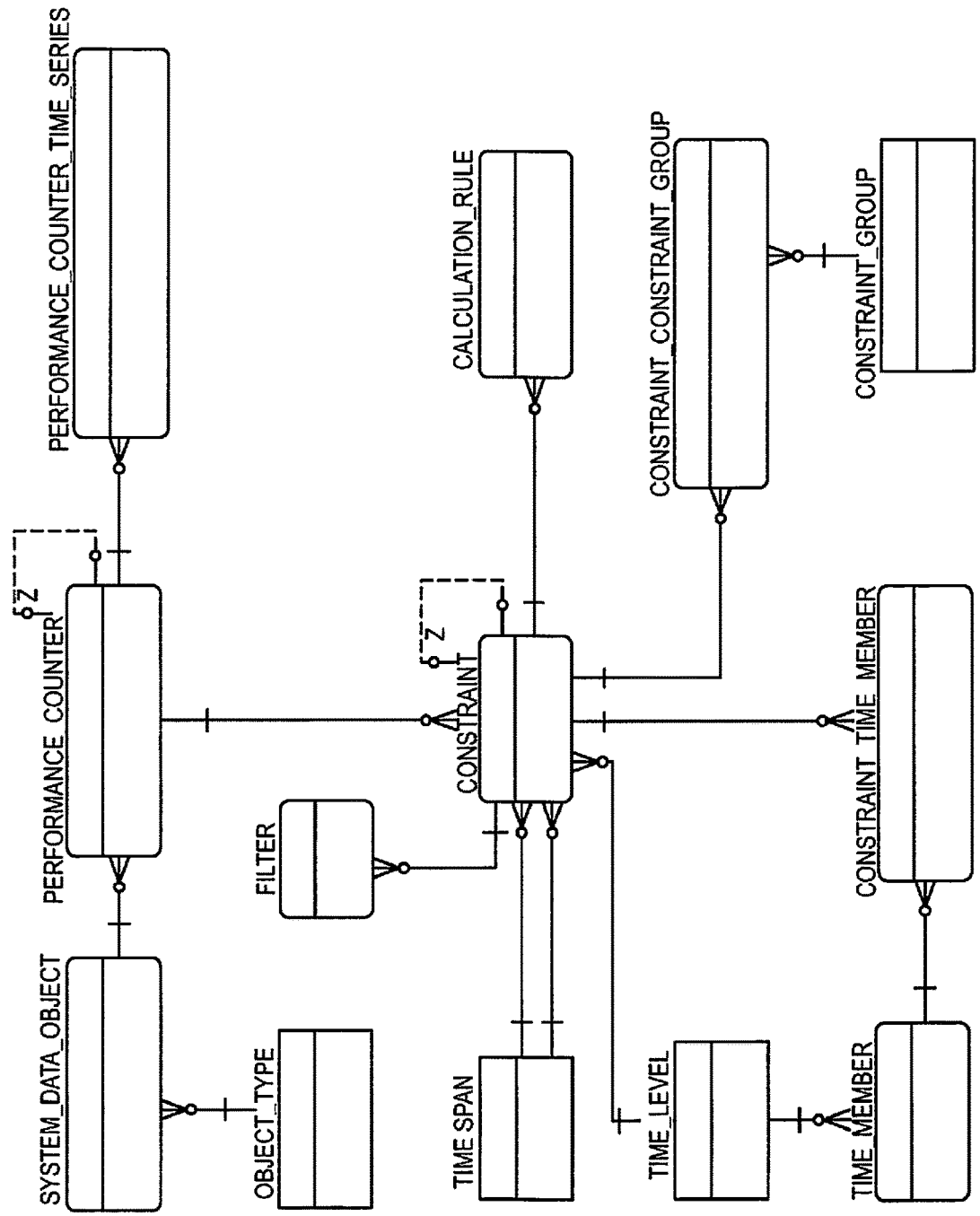
FIG. 4 shows a logical data model for handling CAPACITY_MANAGEMENT CONSTRAINTS for each performance counter.

One possible CONSTRAINT data model is described in this chapter. FIG. 4 shows a logical data model for handling CONSTRAINTS for each PERFORMANCE_COUNTER. For simplicity; we refer from each OBJECT in TOPOLOGY such as PHYSICAL_SERVER, DBMS_INSTANCE or DATABASE into a "SYSTEM_DATA_OBJECT".

CONSTRAINT OBJECTS are as follows:

SYSTEM_DATA_OBJECT. All the OBJECTS in TOPOLOGY such as certain PHYSICAL_SERVER or DATABASE should refer to a SYSTEM_DATA_OBJECT if they contain any PERFORMANCE_COUNTER(s) defined. If certain SYSTEM_DATA_OBJECT data row is not referenced, it means current data row is a default value row for current OBJECT_TYPE like SERVER. A PaaS or SaaS party may add these tables to refer into a separate CUSTOMER table as well.

OBJECT_TYPE Each SYSTEM_DATA_OBJECT refers to OBJECT_TYPE, which tells us in which LEVEL of the topological hierarchy current SYSTEM_DATA_OBJECT exists. These LEVEES are such as PHYSICAL_SERVER_RESOURCE_POOL, DBMS_INSTANCE AND DATABASE.

PERFORMANCE_COUNTER: PERFORMANCE_COUNTER defines a counter type and its THRESHOLD_VALUE properties like min, max, default WARNING and default ALERT value its OBJECT i.e. OBJECT_TYPE. Each PERFORMANCE_COUNTER depends on SYSTEM_DATA_OBJECT, which is either a default OBJECT (LEVEL "All") inherited for ail the SYSTEM_DATA_OBJECTS of certain OBJECT_TYPE or a specific instance of certain SYSTEM_DATA_OBJECT like "SERVER X", "DBMS_INSTANCE y" or "DATABASE z". Any PERFORMANCE_COUNTER which is dependent on such SYSTEM_DATA_OBJECT which is a default OBJECT (LEVEL "All"), refers to itself (implosion); into the default PERFORMANCE_COUNTER instance. For example; "SERVER x" PERFORMANCE_COUNTER refers to its parent instance which is a PERFORMANCE_COUNTER referring to a SYSTEM_DATA_OBJECT which is the default OBJECT (LEVEL "All").

PERFORMANCE_COUNTER_TIME_SERIES: These are the actual monitoring TIME_SERIES for each individual PERFORMANCE_COUNTER. Each PERFORMANCE_COUNTER_TIME_SERIES depends on PERFORMANCE_COUNTER.

CONSTRAINT: Each CONSTRAINT depend on certain PERFORMANCE_COUNTER yet though it is not necessary to have any CONSTRAINTS defined for each PERFORMANCE_COUNTER CONSTRAINT contains information on desired PERFORMANCE_COUNTER THRESHOLD_VALUE quantitative LIMITS in that particular case where TIMEPSAN, TIME_LEVEL, CONSTRAINT_TIME_MEMBERS and CONSTRAINT_FILTERS are set for that specific CONSTRAINT. CONSTRAINT refers into TIME_SPAN as a Rote Playing Dimension by 2 references; one for start date time and one for end date time of TIME_SERIES. CONSTRAINT refers into a desired TIME_LEVEL such as "weekday" and wanted member collection of that particular LEVEL like ("Monday", "Friday") which should be taken for that particular CONSTRAINT. CONSTRAINT may optionally be connected into FILTER(s) to restrict CONSTRAINT with any other logical CONSTRAINTS. CONSTRAINT may also be optionally connected into CALCULATION_RULE(s) which contain any kind of calculations and deduction logic for that Specific CONSTRAINT. CONSTRAINT may be given several CONSTRAINT_GROUPS as well. CONSTRAINT itself contains attributes such as CRITICALITY LEVEL of current CONSTRAINT. WARNING and default ALERT THRESHOLD_VALUES as well as quantitative LIMIT for WARNING and ALERT value occurrences over desired TIME_SERIES.

CONSTRAINT_GROUP: CONSTRAINTS may belong into 0 to many CONSTRAINT_GROUPS. An CONSTRAINT group is desired set of CONSTRAINTS that comprise together a weighted average THRESHOLD with desired weighting factor or maximum allowed THRESHOLD LEVEL exceeding count WARNING and ALERT value LIMITS with CRITICALITY LEVEL description that overall SYSTEM health should meet CONSTRAINT_CONSTRAINT_GROUP: This is intermediating bridge table between the CONSTRAINT and CONSTRAINT_GROUP.

TIME_SPAN TIME_SPAN defines start date and end dates for current PERFORMANCE_COUNTER CONSTRAINT which both can be set NULL, undefined reference row or actual data/time, TIME_LEVEL TIME_LEVEL defines wanted TIME_DIMENSION LEVEL for that particular CONSTRAINT.

TIME_MEMBER: TIME_MEMBER defines wanted member collection of that particular TIME_LEVEL like ("January", "February", "March") which should betaken for that particular CONSTRAINT. Each time member refers to a certain TIME_LEVEL CONSTRAINT_TIME_MEMBER: This is a bridge table between the CONSTRAINT and actual collection of desired one to many TIME_MEMBERS.

FILTER: CONSTRAINT may be optionally connected into FILTER(s) to restrict CONSTRAINT with any other logical time or other dimension CONSTRAINTS than TIME_SPAN. FILTER refers into one CONSTRAINT.

CALCULATION_RULE: CALCULATION_RULE contains any kind of calculations and deduction logic for that specific CONSTRAINT. CALCULATION_RULE may refer into a distinct CONSTRAINT.

CONSTRAINT_SCENARIO: One to many CONSTRAINT scenarios can be calculated. Each of these scenarios will give a different result for how long current RESOURCES are sufficient because you can make variations for same CONSTRAINT by changing its parameter values. In our sample data model, a CONSTRAIN_SCENARIO is instantiated an implosion of a CONSTRAINT referring to the original one.

Creating CONSTRAINTS: For a sample CONSTRAINT, we may define a WARNING and an ALERT THRESHOLD_VALUE LIMITS and their maximum allowed quantities for SERVER LEVEL PERFORMANCE_COUNTER AVERAGE CPU USAGE (%) for different time LEVELS on certain TIME_SPAN. We set AVERAGE CPU USAGE (%) ALERT LIMIT THRESHOLD_VALUE into 70% and WARNING LIMIT into 50% LEVEL for any 5-minute interval and ALERT LIMIT into 60% and WARNING UNIT into 40%. LEVEL for any 1-hour interval. This means, in long term; we want lesser workload on AVERAGE CPU USAGE (%) CONSTRAINT than on 5-minute basis on average. After this, we want to set desired TIME_SPAN both CONSTRAINTS defined: Let's select whole TIME_SERIES and no other restrictions. Now we are having 2 generic i.e. default CONSTRAINTS for one PERFORMANCE_COUNTER, AVERAGE CPU USAGE (%).

After defining generic CONSTRAINT for all the SERVERS 3S a default, we can override this setting with distinct, individual CONSTRAINTS for each individual SERVER so the SERVER A would use ALERT LIMIT 50% and WARNING LIMIT 30%, SERVER B ALERT LIMIT 80% and WARNING UNIT 60% and SERVER C the generic CONSTRAINT (70%, 50%) for any 5-minute interval. Furthermore; we can set ALERT LIMIT 40% and WARNING LIMIT 20%, SERVER B ALERT UNIT 70% and WARNING LIMIT 50% and SERVER C the generic CONSTRAINT (60%, 40%) for any 1-hour interval. After this corresponding TIME_SPAN both CONSTRAINTS should be set as earlier defined for generic ones. Now we are leaving total of 4 CONSTRAINTS for AVERAGE CPU USAGE (%) PERFORMANCE_COUNTER.

Next, we need to set a THRESHOLD_VALUE LIMITS for total occurrences exceeding ALERT LIMIT for each of our CONSTRAINTS. WARNINGS and ALERTS on ENGINE will be planned to be triggered with desired target percentage that should not exceed for each CONSTRAINT. All the occurrences that exceed this LIMIT will be count into CONSTRAINT THRESHOLDS for which formula is 100−(LIMIT exceeding occurrences on selected TIME_SPAN/all TIME SPAN members*100). In contrary; if the CONSTRAINT THRESHOLDS is exceeded the WARNING (or ALERT, depending on case) arises.

Now let's put as a sample a 5-minute THRESHOLD_VALUE WARNING UNIT for our first 2 CONSTRAINTS into 99.9% and ALERT UNIT into 99% and further on a 1-hour THRESHOLD_VALUE WARNING UNIT into 99% and ALERT LIMIT into 98%. Following listing shows us maximum allowed AVERAGE CPU USAGE (%) WARNING and ALERT occurrences from the start of our monitoring time for which we assume to be 1 year (365) days in this particular case, on different TIME_SPANS:

| TIME_SPAN | EVENT TYPE | TRESHOLD LEVEL | FORMULA | MAX ALLOWED OCCURRENCES |
|---|---|---|---|---|
| EVERY 1 MONTH | WARNING | 5 MINUTES | 0.001 * (12 * 24 * 365)/12 | 8 |
| EVERY 1 MONTH | ALERT | 5 MINUTES | 0.01 * (12 * 24 * 365)/12 | 87 |
| EVERY 1 YEAR | WARNING | 5 MINUTES | 0.001 * (12 * 24 * 365) | 105 |
| EVERY 1 YEAR | ALERT | 5 MINUTES | 0.01 * (12 * 24 * 365) | 1051 |
| EVERY 1 MONTH | WARNING | 1 HOUR | 0.01 * (24 * 365)/12 | 7 |
| EVERY 1 MONTH | ALERT | 1 HOUR | 0.02 * (24 * 365)/12 | 14 |
| EVERY 1 YEAR | WARNING | 1 HOUR | 0.01 * (24 * 365) | 87 |
| EVERY 1 YEAR | ALERT | 1 HOUR | 0.02 * (24 * 365) | 175 |

Capacity Forecasting and Machine Learning

After you have created all needed CONSTRAINTS for ENGINE you can calculate against all the wanted monitoring PERFORMANCE_COUNTER_TIME_SERIES and see current situation if desired WARNING and ALERT LIMITS are not exceeded for each CONSTRAINT, it is also possible to add up wanted non-weighted and weighted AGGREGATION_LEVELS to calculate different kinds of overall CONSTRAINTS if there is a need for that.

It is also possible to apply different kinds of TIME_SERIES-based TREND_CALCULATIONS to forecast future capacity needs on SOURCE_SYSTEM mirroring forecasted monitoring PERFORMANCE_COUNTER values against predefined CONSTRAINTS; Further on in this chapter we apply some machine learning techniques to proactively find most optimal TREND_CALCULATIONS for each PERFORMANCE_COUNTER TREND_LINE over time. In the end of this chapter we will also describe a mechanism which is able to deduce how planned hardware configuration changes would affect overall forecasts.

Interpreting CONSTRAINTS interpreting CONSTRAINTS comes in 3 LEVELS in our sample solution. First CONSTRAINT_GROUP priority should be checked, then CONSTRAINT_GROUP weighted average and then CONSTRAINT_GROUP max allowed occurrences over desired FORECAST TIME_SPAN.

CONSTRAINT GROUP Priority

If we are having certain CONSTRAINT (and possibly some other CONSTRAINTS as well) set to belong into a certain CONSTRAINT_GROUP, we need to first check out which priority current CONSTRAINT_GROUP has got. For example; if we have defined priorities "low", "medium" and "high" and their respective interpretation in terms of maximum CONSTRAINT THRESHOLD_VALUE LIMIT occurrences is "1" for high, "2" for medium and "5" for low and this CONSTRAINT belongs into CONSTRAINT_GROUP having priority "medium", we need to have more than 2 CONSTRAINTS belonging into current CONSTRAINT_GROUP exceeding their max allowed occurrence during the TIME_SPAN in order to fulfill the conditions of insufficient capacity situation.

CONSTRAINT GROUP Weighted Average

If above mentioned CONSTRAINT_GROUP priority rule is not met, next we will check if given weighted average of all the CONSTRAINTS defined exceeds with wanted weighting factor given in the CONSTRAINT_CONSTRAINT_GROUP table. For example, if we had CONSTRAINTS a (90%), b (92%) and c (99%) in CONSTRAINT_GROUP z with weighting factor ⅓ each and we have a weighted maximum CONSTRAINT THRESHOLD_VALUE LIMIT of 95% in CONSTRAINT_GROUP z, then we fulfill the conditions of insufficient capacity situation because (⅓*97)+(⅓*92)*(⅓*99)=96% which is more than allowed weighted maximum CONSTRAINT THRESHOLD_VALUE UNIT of 95%.

CONSTRAINT Max Allowed Occurrences

In a case where any of the CONSTRAINT THRESHOLD_VALUE WARNING LIMIT or THRESHOLD_VALUE ALERT LIMIT is being exceeded we are having insufficient capacity situation.

Setting up Multiple CONSTRAINT SCENARIOS if you need you can calculate one to many CONSTRAINT_SCENARIOS with different wanted CONSTRAINT LEVELS. This is referred in CONSTRAINT data model as an implosion to the CONSTRAINT. Each of these SCENARIOS will give a different result for how long current RESOURCES are sufficient. This is useful technique for example if you want to see how much each CONSTRAINT THRESHOLD % values need to be reduced from current in order to stretch SYSTEM LIFECYCLE by 12 months. It is a preferred idea to benchmark CONSTRAINT_SCENARIOS against PERFORMANCE_COUNTER monitoring history before starting actual forecast phase to see how realistic it is actually to preserve wanted CONSTRAINT THRESHOLD % values. After you have selected wanted CONSTRAINT_SCENARIO model, you can start FORECAST TREND_CALCULATION which is defined later on in this document.

Preparing TIME_SERIES for CONSTRAINT TREND CALCULATION

If you know there exists certain TIME_SERIES in overall monitored information which should not be taken in any of the CONSTRAINT calculations it is a good idea to add up this FILTER information for each CONSTRAINT FILTER settings when you do not want things like service maintenance breaks, non service times, testing and piloting phases and such distort actual CONSTRAINT LEVELS and TREND_CALCULATION. Per se, fully continuous TIME_SERIES calculations will produce the best end result in FORECAST TREND_CALCULATION. But still, user can reinforce missing parts of the TIME_SERIES by different TREND_CALCULATION techniques when they occur; if there really is a need for continuous TREND_CALCULATION and forecast over even fragmented TIME_SERIES. In some cases, this may actually improve TREND_CALCULATION FORECAST accuracy.

Possible SOURCE_SYSTEM configuration changes should be always updated for dependent ENVIRONMENT_VARIABLES, METADATA and USER SETTINGS in order to minimize TREND_CALCULATION inaccuracy when source data includes TIME_SERIES containing such changes. In ideal situation there should be 100% continuous, accurate and long TIME_SERIES and there are no remarkable configuration changes during the PERFORMANCE_COUNTER monitoring. Especially short PERFORMANCE_COUNTER monitoring TIME_SPANS, discrete and infrequently collected TIME_SERIES make TREND_CALCULATION more inaccurate in short term.

Defining TREND for CONSTRAINT TREND CALCULATION

This chapter defines some of the applicable mathematical PERFORMANCE_COUNTER TREND_CALCULATION methods. There is great number of mathematical models and algorithms to forecast TIME_SERIES data. From the perspective of CAPACITY_MANAGEMENT it is essential to be able to define, collect and estimate all the essential PERFORMANCE_COUNTERS against wanted CONSTRAINT LIMITS and to be able to understand and predict seasonal, accelerating, decelerating or peaking values in TIME_SERIES. CAPACITY_MANAGEMENT FORECAST can be implemented with any TIME_SERIES-based TREND_CALCULATION formula, mining model or algorithm. Mechanism can be different for each individual CONSTRAINT_SCENARIO and CONSTRAINT. Typical TREND_CALCULATION models are different kinds of regression analysis, running averages, exponential smoothing, causal models, TIME_SERIES analysis etc. Algorithm being used can be evaluated by inspecting current CONSTRAINT PERFORMANCE_COUNTER MONITORING_ DATA TIME_SERIES and its parts and to identify TREND is constant, regressive, linear, cyclic, growing cyclic, season-based, quadratic etc.

The type of data for each PERFORMANCE_COUNTER will basically define which kind of method to use. The most reliable TREND_LINE is one with R-Squared value of 100% or near to it. R-Squared is a statistical measure of how close the data points are to the fitted regression line, 0% points out the model explains none of the variability of the response data around its mean and 100% points out the model explains all the variability of the response data around its mean. As a rule of thumb, higher R-Squared means model fitting better your data.

Linear TREND LINE

This is a best fit straight line that is used with simple linear data sets. TIME_SERIES data is linear if the pattern in its data points reminds of a line. This kind of TREND_LINE typically shows PERFORMANCE_COUNTER data is increasing or decreasing at a steady rate. i.e. linearly.

Logarithmic TREND LINE

A logarithmic TREND_LINE is a best-fit curved line fit well when the rate of change in the data either decreases or increases rapidly and then LEVELS out. A logarithmic TREND_LINE can use both negative and/or positive values.

A polynomial TREND_LINE is a curved line that is used for fluctuating TIME_SERIES data. It is useful for analyzing gains and losses over a large data set. The order of the polynomial can be determined by the number of fluctuations in the data or by how many bends appear in the curve.

Power TREND LINE

A power TREND_LINE is as well a curved line that is best used with data sets that compare PERFORMANCE_COUNTER measurements that increase at a specific rate. You cannot create a power TREND_LINE if your PERFORMANCE_COUNTER data contains zero or negative values.

Exponential

An exponential TREND_LINE is a curved line too and fits best when data values rise or fall at increasing rates. You cannot create a power TREND_LINE if your PERFORMANCE_COUNTER data contains zero or negative values.

Moving Average

A moving average TREND_LINE smoothers out fluctuations in PERFORMANCE_COUNTER data to show a pattern or TREND more clearly. A moving average TREND_LINE uses a certain number of data points, averages them and uses this average value as a point in the TREND_LINE.

All of these TREND_CALCULATION methods are relatively trivial to benchmark. When selecting best fitting TREND_LINE for you each PERFORMANCE_COUNTER. TIME_SERIES data population. R Squared value is great way to go. In addition to these mechanisms there exists a lot of different kinds of TIME_SERIES TREND analysis mechanisms, calculations and heuristics. Feel free to apply them.

Heuristic TREND CALCULATION and Forecast Mechanisms

This chapter defines some alternative methods how to heuristically identify and forecast different kinds of TREND types. All of the samples defined are from month LEVEL annual TIME_SERIES because in a majority of the cases this is sufficient granularity for CAPACITY_MANAGEMENT TREND_CALCULATION and FORECAST use in DBMS environments where typical lifeline of PHYSICAL_SERVERS is from 3 to 7 years yet though similar calculation mechanisms can be applied on other date TIME_DIMENSION LEVELS and dynamically nested for drill down purposes into a more definite grain when useful.

Identifying seasonally linear TIME_SERIES

To identify a seasonally linear TIME_SERIES TREND is relatively simple. For example, if we want to know if our monthly TIME_SERIES from 2012-2015 is seasonal and linear, we can compare corresponding months from sequential years. If the change percentile of parallel months between sequential years (2012 to 2013, 2013 to 2014 and 2014 to 2015) has strong correlation we are having a seasonal linear TREND TIME_SERIES. In this case, following years 2016, 2017 etc. CAPACITY_MANAGEMENT FORECASTS can be calculated with this linear growth component alone.

Identifying Seasonally Non-Linear TIME_SERIES

To identify a seasonally developing TIME_SERIES is a bit more complex case because we are having a 2 dimensional TIME_SERIES to observe: The actual data growth component over time and a seasonal data growth component over time. So if there is no linear correlation between corresponding months from sequential years, we need to find possible correlation of parallel months between sequential years. For this, an individual TIME_SPAN should be created from each of the corresponding month sequences over time and define a TREND for them as described earlier in this document. If we are able to define such a TREND that strongly correlates between each of the corresponding months, the data is really seasonal but it is growing in non-linear fashion annually between the parallel periods (=months). In this case, following years 2016, 2017 etc. data management FORECASTS can be calculated with this linear growth component alone.

Identifying Non-Seasonal TIME_SERIES

For this kind of TIME_SERIES we may use traditional TREND definition mechanisms described earlier in this document.

Here a mechanism to forecast SYSTEM LIFECYCLE expectancy based on CONSTRAINTS is defined.

Figure 5:
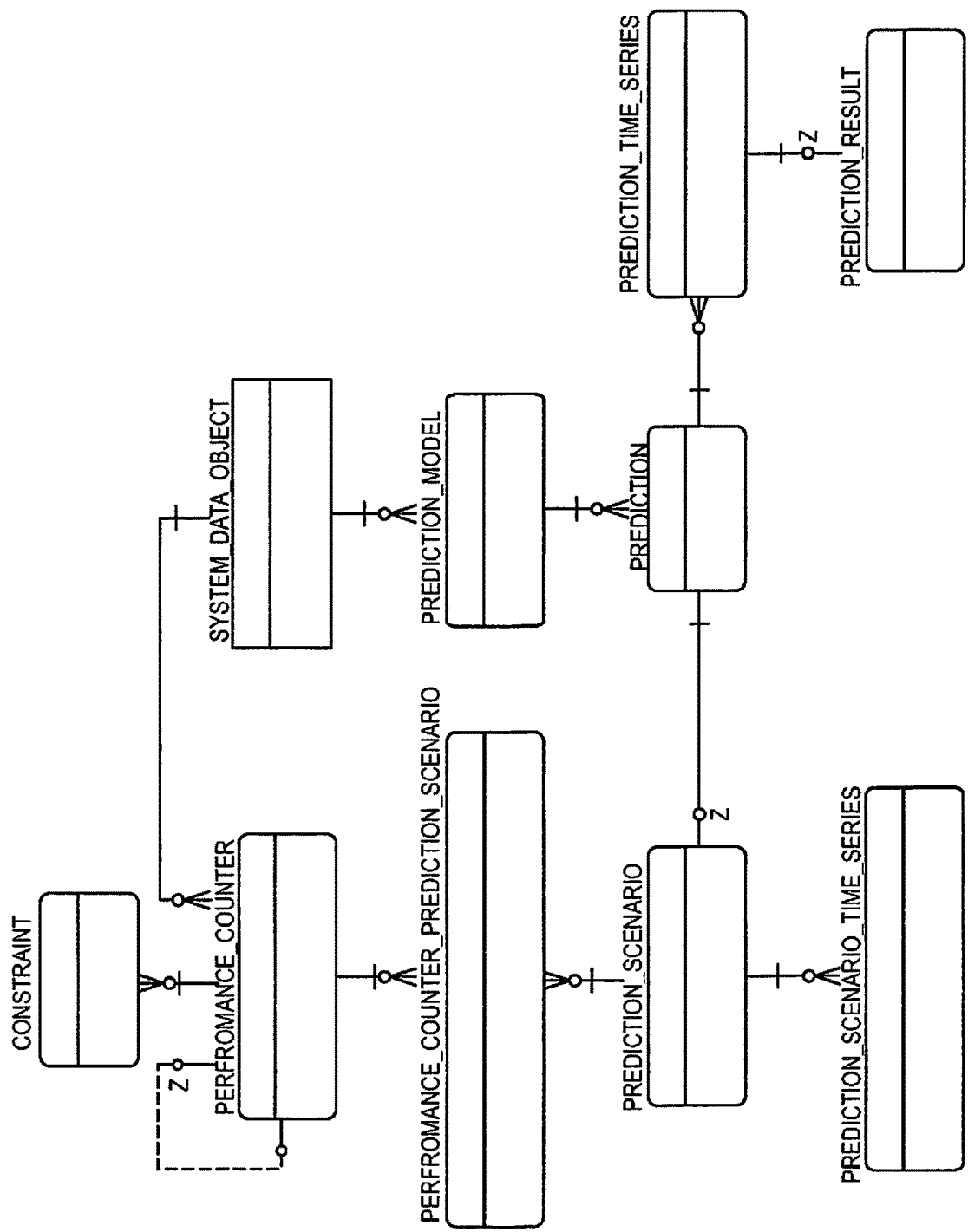
FIG. 5 shows 3 CAPACITY_MANAGEMENT forecasting data model.

FIG. 5 shows a FORECASTING data model.

FORECAST OBJECTS are as follows:

PREDICTION_MODEL: PREDICTION_MODEL refers into SYSTEM_DATA_OBJECT. Each PREDICTION_MODEL contains header information for every CONSTRAINT defined for each SYSTEM_DATA_OBJECT PERFORMANCE_COUNTER. PREDICTION_MODEL_DATA members are such as MONITORING_DATA sampling start date, sampling end date, prediction start date and prediction end date.

PREDICTION: PREDICTION refers into a PREDICTION_MODEL PREDICTION is actually a collection of all SYSTEM_DATA_OBJECT TREND_CALCULATION prediction algorithms. There can be many competing PREDICTIONS configured in parallel but only one of them is selected as actual PREDICTION at once. PREDICTION data members are such as RANK. R-Squared and TREND type for each SYSTEM_DATA_OBJECT PERFORMANCE_COUNTER.

PREDICTION_TIME_SERIES: PREDICTION_TIME_SERIES contains predicted PERFORMANCE_COUNTER_TIME_SERIES data on defined TIME_DIMENSION LEVEL in the CONSTRAINT for given PREDICTION.

PREDICTION_RESULT: After a PREDICTION TIME_SPAN has exceeded there will be actual PERFORMANCE_COUNTER monitoring PREDICTION_RESULT for each PREDICTION_TIME_SERIES. This makes it possible to proactively keep in track and to optimize predictions.

PREDICTION_SCENARIO: A PREDICTION_SCENARIO refers into a PREDICTION. This OBJECT contains information on different kinds of hypothetical PREDICTION_SCENARIOS like future hardware configuration change user can define and has corresponding attributes defined as PREDICTION. These scenarios can be run in parallel with actual PREDICTIONS and can be set to override PREDICTIONS as well.

PREDICTION_SCENARIO. TIME_SERIES: PREDICTION_SCENARIO. TIME_SERIES contains predicted hypothetical scenario of future PERFORMANCE_COUNTER_TIME_SERIES data on defined TIME_DIMENSION LEVEL in the CONSTRAINT for given PREDICTION.

About Selecting Source Data TIME_SERIES

After you have monitored desired set of PERFORMANCE_COUNTERS and after you have selected desired CONSTRAINT_SCENARIO to be used select a basic set of TIME_SERIES from which you want to predict overall SYSTEM LIFECYCLE expectation with desired CONSTRAINT LEVELS. This data set should comprise all those essential PERFORMANCE_COUNTER use cases which are distinctive for current SYSTEM CAPACITY_MANAGEMENT. As a rule of thumb, as said before, it would be ideal to monitor PERFORMANCE_COUNTER data TIME_SERIES as long as possible before we forecast our future TIME_SERIES.

For example; for a 2-year forecast it would be a good idea to have at least 2 years of MONITORING_DATA history available but in some non-seasonal highly predictably growing environments only a few months of monitoring would bring a decent sample set for TREND_CALCULATION to start from. Season oriented and regularly growing environments are naturally much easier to predict than more chaotic ones, luckily enough; many essential PERFORMANCE_COUNTERS in a variety of DBMS environments are quite well predictable. During the time you will learn more from the environment you are predicting.

Note! For very short-term forecasts you should collect TIME_SERIES from 1-second to 1-minute TIME_SERIES interval instead of 1-hour interval to be able to create short-term scenarios for next minute, hour, day, week or so.

Preparing Prediction Model

Create a PREDICTION_MODEL for each SYSTEM_DATA_OBJECT CONSTRAINT. You should derive the source TIME_SPAN settings from CONSTRAINTS into this PREDICTION_MODEL as well as the target TIME_S-PAN which defines how long into the future current prediction model is forecasting SOURCE_SYSTEM capacity needs.

Competing Prediction Models

For each PERFORMANCE_COUNTER to be predicted against given CONSTRAINTS you can add up more PREDICTIONS depending on current PREDICTION_MODEL but you should define a predictability RANK and R-squared for each of them based on your estimate of current TREND type. For this you can use a method defined earlier in the document or some other TREND type analysis method. For each SYSTEM_DATA_OBJECT, a PREDICTION_MODEL having the best TREND-to-data correlation (like R-Squared) against source TIME_SPAN shall be granted for highest RANK (value "1"), second best PREDICTION_MODEL will get RANK 2 and so on forecasts will be calculated in our example on monthly LEVEL, yet though this could be done as well on weekly-, daily- or hourly LEVEL as well. In most cases the monthly, weekly or daily LEVEL TIME_SERIES are accurate enough for CAPACITY_MANAGEMENT FORECAST purposes.

Populating Prediction Model TIME_SERIES

Next we will populate PREDICTION_TIME_SERIES for each PREDICTION under PREDICTION_MODEL for each defined SYSTEM_DATA_OBJECT CONSTRAINT with prediction data based on the attribute values defined in the previous step. TREND_CALCULATION can be done either mathematically or based on some heuristics.

Optimizing Capacity Forecast and Selecting most Accurate Prediction Model

So after the SYSTEM is monitored until the end date time defined in current PREDICTION_MODEL you can automate different PREDICTIONS out to tender against each other by periodically comparing their results against actualized PERFORMANCE_COUNTER SYSTEM_DATA_OBJECT TIME_SERIES over time and respectively automate their RANK and R-Squared calculation in order to change PREDICTION on the fly to another if it gives more accurate long term prediction than previous one. For example, if PREDICTION a RANK was 1, PREDICTION b RANK was 2 and PREDICTION c RANK was 3 before running actual monitoring during the TIME_SPAN set on current PREDICTION_MODEL and we find out in TREND comparison calculations (such as R-Squared value) that PREDICTION c was most accurate we should change it to be as master PREDICTION with RANK value 1 and if PREDICTION a was second best we will give it a value 2 and PREDICTION c RANK 3 for future PREDICTION_MODELS. Note that it would be a good idea to always use all the monitoring TIME_SERIES history available to get best fit for competing PREDICTION. Note also that only RANK 1 prediction is effective in actual forecast during the PREDICTION_MODEL TIME_SPAN. Sometimes, when collecting monitoring PERFORMANCE_COUNTER_TIME_SERIES data from very long time, it is possible that some TREND_CALCULATION method gives more accurate predictions in the beginning and less accurate prediction results later on or vice versa, especially when the SOURCE_SYSTEM configurations are essentially changed. That's why it is a good idea to also follow the TREND of prediction accuracy at least on annual LEVEL. In such cases it is a good idea to take in count only the last year or TIME_SERIES after essential configuration changes to estimate which PREDICTION is the most accurate. Only exception here is seasonal PERFORMANCE_COUNTERS; for them, most of the time it is a good idea to have 24-26 months of MONITORING. DATA to get better accuracy for long term PREDICTIONS.

CREATING PREDICTION SCENARIOS

Sometimes it is very practical to estimate beforehand how certain environment-, hardware- or configuration changes would hypothetically affect PREDICTIONS for SYSTEM_DATA_OBJECT CONSTRAINT without waiting hypothetical change to actualize. This is important and useful feature in terms of CAPACITY_MANAGEMENT FORECASTING for current SOURCE_SYSTEM: "What if I doubled RAM on SERVER x?", "What if I added one PHYSICAL CPU more for each of the production SERVERS", "How our SYSTEM manages user count grow exceptional 20% next year in our OLTP SYSTEM?" and so on.

For example; we want to create a PREDICTION_SCENARIO on use case where we would like to double PHYSICAL PROCESSOR count for certain SYSTEM_DATA_OBJECT SERVER x. First we need to define a PREDICTION_SCENARIO for each CONSTRAINT the change is supposed to affect and link the PREDICTION_SCENARIO to the respective PREDICTION. For this PREDICTION_SCENARIO we need to define RANK as well and a brief description of a use case, link it to actual SYSTEM_DATA_OBJECT CONFIGURATION and add a bridge table PERFORMANCE_COUNTER_PREDICTION_SCENARIO containing a reference to one or more PERFORMANCE_COUNTERS the PREDICTION could affect. All essential PERFORMANCE_COUNTERS such as AVERAGE CPU USAGE (%) should be added into this collection to make a prediction accurate. We need to also add a norm rule on PERFORMANCE_COUNTER_PREDICTION which contains the formula for converting PREDICTION. TIME_SERIES into PREDICTION_SCENARIO. TIME_SERIES. Many of these formulas are pretty straightforward. For finishing a SCENARIO, we need to copy each of the PREDICTION_TIME_SERIES under the PREDICTION_SCENARIO. In this case all the CPU related PREDICTION_SCENARIO. TIME_SERIES are being split amongst the PREDICTION_TIME_SERIES now. So if we had overall average of AVERAGE CPU USAGE (%) PERFORMANCE_COUNTER of 50% for a PREDICTION_TIME_SERIES, we will have a normed PREDICTION_SCENARIO_TIME_SERIES overall average of AVERAGE CPU USAGE (%) of 25%.

Below is enlisted some typical configuration change scenarios and how they would affect some PERFORMANCE_COUNTER calculations.

Adding RAM on (virtual or PHYSICAL) SERVER: Normed CONSTRAINT TIME_SERIES for RAM-based SERVER PERFORMANCE_COUNTERS such as AVERAGE AVAILABLE MEMORY (MB) is: (new RAM/old RAM*performance factor)*old AVERAGE AVAILABLE MEMORY (MB) CONSTRAINT %, if OS memory paging is being used one should take it in count for the PERFORMANCE_COUNTERS utilizing it. Note that you would need to take in count some virtualization factors in case of PHYSICAL and VIRTUAL_SERVER norm calculations such as RAM speed.

Growing DBMS_INSTANCE max memory LIMIT: After adding some RAM on PHYSICAL/VIRTUAL_SERVER we will probably want to raise maximum instance memory LIMIT for wanted DBMS_INSTANCE(s) on that particular SERVER. Normed CONSTRAINT TIME_SERIES for DBMS_INSTANCE and its RESOURCE_POOLS normed CONSTRAINT TIME_SERIES for RAM-based instance PERFORMANCE_COUNTERS such as AVERAGE MEMORY USAGE (MB) is then: old AVERAGE AVAILABLE MEMORY (MB) CONSTRAINT %*(old MAX MEMORY LIMIT (MB)/new MAX MEMORY LIMIT (MB)).

Adding PROCESSORS on PHYSICAL_SERVER: Normed CONSTRAINT TIME_SERIES for CPU-based PHYSICAL_SERVER PERFORMANCE_COUNTERS such as AVERAGE CPU USAGE (%) is: (old CPU count/new CPU count*performance factor)*old AVERAGE CPU USAGE (%) CONSTRAINT %. Use relative performance factor if you are substituting ail existing cores into different PROCESSORS on motherboard having different clock speed etc.

Adding CPUS on VIRTUAL_SERVER: Normed CONSTRAINT TIME_SERIES for CPU-based VIRTUAL_SERVER PERFORMANCE_COUNTERS such as AVERAGE CPU USAGE (%) is: (old CPU count/new CPU count*performance factor)*old AVERAGE CPU USAGE (%) CONSTRAINT %. Note that you would need to take in count some virtualization factors in case of VIRTUAL_SERVER norm calculations such as multithreading setting, dedicated CPU speed, priority/pool settings and so on.

Average count of SYSTEM users, executables, transactions etc. will grow predefined exceptional amount from previous year/season: Normed CONSTRAINT TIME_SERIES for any PERFORMANCE_COUNTERS where growth of amount of users, executables, and transactions or such as AVERAGE CPU USAGE (%) can be count when we have proven a strong correlation between a PERFORMANCE_COUNTER and cumbering RESOURCE. Against this correlation we are able to count actual correlation factor. For example; if we have proven a strong correlation between OLTP SYSTEM user amount and AVERAGE CPU USAGE (%) over time so that every 100 new users will cause 10%+−1 percentile units more CPU load on current PHYSICAL_SERVER, we will benefit from this knowledge critically when we know we will have 500 new users starting from the beginning of the next year to use our OLTP SYSTEM and we are currently having running annual average of 40% AVERAGE CPU USAGE (%). It is self-explanatory we will face major performance problems if no configuration changes, DBMS optimization or new hardware attainments will be done because forecasted annual AVERAGE CPU USAGE (%) would be 40+(5*11)=95% which is way too high AVERAGE CPU USAGE (%).

When running normed PREDICTION_SCENARIO against wanted PREDICTION, there will usually be a lot of PERFORMANCE_COUNTERS and their respective CONSTRAINTS without actual PREDICTION_SCENARIO. That's why, when you want to run overall PREDICTION_SCENARIO FORECAST for your SOURCE_SYSTEM with your PREDICTION_SCENARIO. TIME_SERIES, in addition to these normed TIME_SERIES you need to also run those PREDICTION. TIME_SERIES which do not overlap with PREDICTION_SCENARIO. TIME_SERIES. This is how you are able to predict the big picture; a FORECAST with a scenario.

Utilizing Predicted TIME_SERIES after Configuration Change

As described earlier, after creating a hardware/configuration PREDICTION_SCENARIO we will give a different kind of future FORECAST for the SOURCE_SYSTEM. If PREDICTION_SCENARIO will lead into a decision and act of a configuration change, we need to decide if we want to replace monitoring history TIME_SERIES with these PREDICTION_SCENARIO. TIME_SERIES in future calculations or do we want to leave monitoring history TIME_SERIES as they are. Anyway, the original monitoring history TIME_SERIES is often inaccurate, especially during the first days, weeks and months compared to normed PREDICTION_SCENARIO. TIME_SERIES after actual configuration changes because old PERFORMANCE_COUNTER and CONSTRAINT calculations were taken against different(=old) configuration. More the differences in configuration, more chaos for history-based TIME_SERIES predictions.

It is a good idea to use PREDICTION_SCENARIO. TIME_SERIES calculations instead of old MONITORING_DATA TIME_SERIES when forecasting future capacity needs when the configuration change was trivial. But if was not, you should compare ordinary PREDICTIONS and PREDICTION_SCENARIOS over time and make your decision based on factual information for which gave the greatest accuracy. In these cases; it is actually not enough to follow only the RANK but R-Squared or corresponding factual measure about how accurate each TIME_SERIES FORECAST has been between the PREDICTION and PREDICTION_SCENARIO. Note that a PREDICTION_SCENARIO. TIME_SERIES differ from PREDICTION TIME_SERIES from only during defined PREDICTION_SCENARIO. TIME_SPAN. Most important in PREDICTION_SCENARIO_TIME_SERIES FORECAST calculations is to be sure you have ail the essential PERFORMANCE_COUNTERS and CONSTRAINTS with you and they are calculated correctly. This is why you should use history data norming only for highly predictable, dean configuration changes with minimal downside side effects like doubling PHYSICAL PROCESSOR count for a PHYSICAL_SERVER.

DETAILED DESCRIPTION OF SOME EMBODIMENTS

The following embodiments are exemplary. Although the specification may refer to "an", "one", or "some" embodiment(s), this does not necessarily mean that each such reference is to rite same embodiments), or that the feature only applies to a single embodiment. Single features of different embodiments may be combined to provide further embodiments.

In the following, features of the invention will be described with a simple example of a device architecture in which various embodiments of the invention may be implemented. Only elements relevant for illustrating the embodiments are described in detail.

Data Model

So far we have dealt with CAPACITY_MANAGEMENT part of the invention, which mostly defines preliminary steps for ENGINE to be able to FORECAST CAPACITY_PLANNING. In order to be able to do some comprehensive CAPACITY_PLANNING it is a good best practice to create overall data model to match your existing and planned LOGICAL_TOPOLOGY to more efficiently serve your CAPACITY_PLANNING needs and to solve more complex and wider CAPACITY_PLANNING SCENARIOS. Because overall LOGICAL_TOPOLOGY has a potential to contain easily over 150 data objects and over 5000 data fields we will define only those OBJECTS and data fields essential for gaining understanding of CAPACITY_PLANNING method.

Exemplary CAPACITY_PLANNING OBJECTS are as follows:

SETTINGS: This is a OBJECT for having different kinds of settings information concerning the LOGICAL_TOPOLOGY such as different kinds of trend types, data mining algorithms and calculation formulas to be selected from in CAPACITY_PLANNING ENGINE FORECASTING.

SOLUTION: SOLUTION is the topmost CAPACITY_PLANNING OBJECT. SOLUTION holds information for filtered collection of OBJECTS from SOURCE_SYSTEM being forecasted to be replaced into TARGET_SYSTEM, which TIME_SPAN(s) from SOURCE_SYSTEM MONITORING_DATA TIME_SERIES is taken into calculations, how many CPUS, CPU cores and threads there exists in SOURCE_SYSTEM according to the filter criteria, for how long TARGET_SYSTEM LIFECYCLE FORECAST will be calculated and so on. This OBJECT also includes a set of different variables and CONSTRAINTS needed in CAPACITY_PLANNING for any set of DBMS_INSTANCES and their relative OBJECTS to be forecasted.

PROJECT: CAPACITY_PLANNING SOLUTION consists of one to many PROJECTS. For each PROJECT there are same SOLUTION level input parameters. Idea of having multiple PROJECTS is to be able to create different LOGICAL_TOPOLOGY PLANNING_SCENARIOS with different HARDWARE and/or virtualization setups to find out which option indicates to provide the most optimal PLANNING_SCENARIO compared to each other. So basically PROJECT is just an OBJECT for one or more PLANNING_SCENARIOS.

PLANNING_SCENARIO: PROJECT contains one to many PLANNING_SCENARIOS. Each PLANNING_SCENARIO is to compare different CPU_BENCHMARK results from different vendors or own benchmark data for different kinds of use cases such as integer and float computation power. PLANNING_SCENARIO also holds the information of ending result in CAPACITY_PLANNING ENGINE calculations of how many CPUS, CPU cores and threads are being forecasted to be needed in TARGET_SYSTEM compared to the SOURCE_SYSTEM cores stored in SOLUTION OBJECT. By selecting wanted PLANNING_SCENARIO and comparing their CPU_BENCHMARK values one is able to see which PROJECT to prefer as filial implementation of becoming TARGET_SYSTEM, CPU_BENCHMARK_ALGORITHM: For each PLANNING_SCENARIO one should select an integer-based CPU_BENCHMARK ALGORITHM and/or a floating-point-based CPU_BENCHMARK_ALGORITHM and the name and provider of that algorithm being used. All becoming TARGET_SYSTEM CAPACITY_PLANNING calculations are based on these performance figures and some other variables.

CPU_MODEL: CPU_MODEL OBJECT contains model data for hypothetical CPUS used on TARGET_SYSTEM. It tells us CPU_MODEL brand, model, generation and series, CPU name, clock speed, socket, core count, thread count and some other essential specifications such as L1 and L2 cache figures.

SERVER_MODEL contains model data for hypothetical PHYSICAL_SERVERS on TARGET_SYSTEM, it tells us SERVER_MODEL brand, model, generation and series and some other essential options such as maximum socket count and maximum RAM memory.

SERVER_SETUP is a hypothetical setup of a SERVER_MODEL with predefined configuration. Therefore, it refers to SERVER_MODEL and CPU_MODEL. This OBJECT also tells us its name, if it is host setup server for VIRTUAL_SERVERS and which virtualization platform it uses, if it has hyper threaded processors and how many configured CPUS, cores and hyper threads it is planned to have.

VIRTUAL_SERVER_SETUP_POOL is an OBJECT for any such host server virtualization pool which may refer to one to many SERVER_SETUPS and from which can be a reference from one to many VIRTUAL_SERVER_SETUP_POOL via BRIDGE_OBJECT. This means any virtualization pool may be dedicated to certain host server or spread amongst several host servers so each VIRTUAL_SERVER_SETUP_POOL consists of a subset of distinct SERVER_SETUP hardware RESOURCES or a superset of a group of SERVER_SETUP hosts and has properties suets as virtual pool name, default overhead and configured RAM and CPU reserve SERVER_SETUP_VIRTUAL_SERVER_SETUP_POOL: This is a BRIDGE_OBJECT between SERVER_SETUP and VIRTUAL_SERVER_SETUP_POOL and contains list of one to many SERVER_SETUPS belonging to one to many VIRTUAL_SERVER_SETUP_POOLS i.e. virtualization pools.

VIRTUAL_SERVER_SETUP is a hypothetical virtual server referring to a VIRTUAL_SERVER_SETUP_POOL with predefined configuration. This OBJECT tells us essential properties such as virtual server name, if it has dedicated or shared virtual CPUS, the count of vcpu:s, cores and threads, virtual cpu clock speeds, if it has hyper threads as logical processors, how much it utilizes VIRTUAL_SERVER_SETUP_POOL RESOURCES, which is the calculative default overhead, all relative cpu_benchmark data etc. You should input all the data fields here affecting CAPACITY_PLANNING CALCULATIONS to be able to fit SOURCE_SYSTEM Cpu RESOURCES against defined VIRTUAL_SERVER_SETUP.

STORAGE_UNIT_MODEL contains model data for hypothetical STORAGE_UNITS on TARGET_SYSTEM. It tells us STORAGE_UNIT_MODEL brand, model, generation and series and some other essential options such as MAXIMUM_TOTAL_IOPS, MAXIMUM_RANDOM_READ_IOPS, MAXIMUM_RANDOM_WRITE_IOPS, MAXIMUM_SEQUENTIAL_READ_IOPS, MAXIMUM_SEQUENTIAL_WRITE_IOPS, MAXIMUM_RANDOM_READ_MBPS, MAXIMUM_RANDOM_WRITE_MBPS, MAXIMUM_SEQUENTIAL_READ_MBPS, MAXIMUM_SEQUENTIAL, WRITE_MBPS, MAXIMUM_DISK_STORAGE_GB and MAXIMUM_PHYSICAL_NETWORK_THROUGHPUT_MBS.

STORAGE_VOLUME_MODEL contains model data for hypothetical STORAGE_MODEL VOLUMES on TARGET_SYSTEM. It tells us STORAGE_VOLUME_MODEL type, brand, model, generation and series and some other essential options such as MAXIMUM_TOTAL_IOPS, MAXIMUM_RANDOM_READ_IOPS, MAXIMUM_RANDOM_WRITE_IOPS, MAXIMUM_SEQUENTIAL_READ_IOPS, MAXIMUM_SEQUENTIAL_WRITE_IOPS, MAXIMUM_RANDOM_READ_MBPS, MAXI- MUM_RANDOM_WRITE_MBPS, MAXIMUM_SEQUENTIAL_READ_MBPS, MAXIMUM_SEQUENTIAL_WRITE_MBPS and MAXIMUM_DISK_STORAGE_GB.

STORAGE_UNIT_MODEL_STORAGE_VOLUME_MODEL: This is a BRIDGE_OBJECT between STORAGE_UNIT_MODEL and STORAGE_VOLUME_MODEL and contains list of suitable STORAGE_VOLUME_MODELS for each STORAGE_UNIT_MODEL STORAGE_UNIT_BLOCK_MODEL contains model data for hypothetical STORAGE_UNIT_BLOCKS on TARGET_SYSTEM. It tells us some other essential options such as MAXIMUM_TOTAL_IOPS, MAXIMUM_RANDOM_READ_IOPS, MAXIMUM_RANDOM_WRITE_IOPS, MAXIMUM_SEQUENTIAL_READ_IOPS, MAXIMUM_SEQUENTIAL_WRITE_IOPS, MAXIMUM_RANDOM_READ_MBPS, MAXIMUM_RANDOM_WRITE_MBPS, MAXIMUM_SEQUENTIAL_READ_MBPS, MAXIMUM_SEQUENTIAL_WRITE_MBPS, MAXIMUM_DISK_STORAGE_GB and MAXIMUM_PHYSICAL_NETWORK_THROUGHPUT_MBS.

STORAGE_UNIT_SETUP is a hypothetical setup of a STORAGE_UNIT_MODEL with predefined configuration. Therefore, it refers to STORAGE_UNIT_MODEL and NETWORK. This OBJECT also tells us its name and configured properties for opposing STORAGE_UNIT_MODEL such as CONFIGURED_TOTAL_IOPS, CONFIGURED_DISK_STORAGE_GB etc.

STORAGE_UNIT_BLOCK_SETUP is a hypothetical setup of a STORAGE_UNIT_BLOCK_MODEL with predefined configuration. Therefore, it refers to STORAGE_UNIT_BLOCK_MODEL, STORAGE_UNIT_SETUP and NETWORK. This OBJECT also tells us its name and configured properties for opposing STORAGE_UNIT_BLOCK_MODEL such as CONFIGURED_TOTAL_IOPS, CONFIGURED_DISK_STORAGE_GB etc.

SERVER_MODEL_CPU_MODEL: This is a BRIDGE_OBJECT between SERVER_MODEL and CPU_MODEL and contains list of suitable CPU_MODELS for each SERVER_MODEL.

CPU_BENCHMARK: For each CPU_MODEL in CAPACITY_PLANNING PROJECT PLANNING_SCENARIO one should have selected at least one private or public CPU_BENCHMARK test results run against certain CPU_BENCHMARK_ALGORITHM for all the CPU_MODELS used in CAPACITY_PLANNING ENGINE calculations. CPU_BENCHMARK contains data members such as benchmark url data, link or opposing, CPU_RATIO, calculative CORE_RATIO and THREAD_RATIO numbers and some other METADATA like benchmark date. These are the actual BENCHMARK results of selected CPUS running on TARGET_SERVERS_CPU_RATIO tells us a benchmark result on PHYSICAL_CPU i.e. SOCKET LEVEL such as number "250" for floating point continuous performance benchmark, CORE_RATIO tells us the very same BENCHMARK performance benchmark on core level so if our CPU has got 4 logical cores its opposing CORE_RATIO is 250/4–"62.5" and if current CPU is hyper threaded then it would bring with total of 8 hyper threads a 250/8="31.25" THREAD_RATIO. This information is essential in adjusting the SOURCE_SYSTEM OBJECTS with given CPU_BENCHMARK data to match defined TARGET_SYSTEM in most efficient way according to the CAPACITY_PLANNING CONSTRAINTS defined.

CPU_BENCHMARK_SERVER is as well a list of benchmark test results. Idea of this OBJECT is to hold statistics of self-driven benchmark tests or tests run oneself or by other parties for each CPU_MODEL, with or without certain PHYSICAL_SERVER. This OBJECT refers to certain or none SERVER_MODEL. CPU_MODEL and CPU_BENCHMARK_ALGORITHM. This OBJECT contains data such as benchmark date, link to current benchmark test results, number of CPUS, CPU cores and hyper threads used in benchmark test and relative CPU_PERFORMANCE_RATIO numbers on CPU, core and hyper thread level.

CPU_BENCHMARK_VIRTUAL_SERVER is also a list of benchmark test results for VIRTUAL_SERVERS, idea of this OBJECT is to hold statistics of self-driven benchmark tests for each VIRTUAL_SERVER. OBJECT refers to certain or none VIRTUAL_SERVER and CPU_BENCHMARK_ALGORITHM. This OBJECT contains data such as benchmark date and relative CPU_PERFORMANCE_RATIO numbers on CPU, core and hyper thread level.

NETWORK_INTERFACE_TYPE is a list of different network interface types such as router and switch.

NETWORK_INTERFACE_MODEL contains model data for hypothetical NETWORK_INTERFACE_SETUPS such as switches in TARGET_SYSTEM. It tells us NETWORK_INTERFACE_MODEL brand, model, generation, series and some other essential options such as PHYSICAL network throughput mb/s.

NETWORK_INTERFACE_SETUP is a hypothetical setup of a NETWORK_INTERFACE_MODEL with predefined configuration. Therefore, it refers to NETWORK_INTERFACE_MODEL. This OBJECT also tells us its name, and some essential configuration properties for CAPACITY_PLANNING purposes like port count and configured PHYSICAL network throughput mb/s etc.

SERVER_SETUP_INTERFACE_MODEL contains model data for hypothetical NETWORK_INTERFACES such as NIC card for PHYSICAL_SERVER on TARGET_SYSTEM. It tells us SERVER_SETUP_INTERFACE_MODEL brand, model, generation, series and some other essential options such as PHYSICAL network throughput mb/s.

SERVER_MODEL_SERVER_SETUP_INTERFACE_MODEL: This is a BRIDGE_OBJECT between SERVER_MODEL and SERVER_INTERFACE_MODEL and contains list of suitable SETUP_INTERFACE_MODELS for each SERVER_MODEL.

SERVER_SETUP_INTERFACE is a hypothetical network interface setup such as NIC card of a SERVER_INTERFACE_MODEL with predefined configuration. Therefore, it refers to SERVER_SETUP_INTERFACE_MODEL and NETWORK_INTERFACE_SETUP. This OBJECT also tells us data such as its name, if it is primary interface, current configuration type, configured port count, CONFIGURED_PHYSICAL_NETWORK_THROUGHPUT_MBS etc.

VIRTUAL_SERVER_SETUP_SERVER_INTERFACE: This is a hypothetical virtual network interface setup such as virtual NIC card of a VIRTUAL_SERVER with predefined configuration. Therefore, it refers to VIRTUAL_SERVER_SETUP and SERVER_SETUP_INTERFACE. This OBJECT also tells us data such as its name, if it is primary interface, current configuration type, configured port count, CONPIGURED_PHYSICAL_NETWORK_THROUGHPUT_MBS etc.

VIRTUAL_SERVER_SETUP_STORAGE_UNIT_SETUP_INTERFACE is a hypothetical virtual network interface setup such as switch between VIRTUAL_SERVER_SETUP and STORAGE_SETUP with predefined configuration. Therefore, it refers to VIRTUAL_SERVER_SETUP and SERVER_SETUP_STORAGE_UNIT_SETUP_INTERFACE.

SERVER_SETUP_STORAGE_UNIT_SETUP_INTERFACE is a hypothetical network interface setup such as switch between SERVER_SETUP and STORAGE_SETUP with predefined configuration. Therefore, it refers to SERVER_SETUP, NETWORK_INTERFACE_SETUP, SERVER_INTERFACE_MODEL, STORAGE_UNIT_SETUP and PROJECT. This OBJECT also tells us data such as its name, if it is primary interface, current configuration type, configured port count, CONFIGURED_PHYSICAL_NETWORK_THROUGHPUT_MBS etc.

SERVER_SETUP_INTERFACE_PORT: This is a BRIDGE_OBJECT between SERVER_SETUP and INTERFACE_PORT and contains list of suitable PORTS designed to be configured for current SERVER_SETUP.

SERVER_BENCHMARK: This is a BRIDGE_OBJECT between SOURCE_SERVER and CPU_BENCHMARK_SERVER and contains a list of benchmark test results done for that SOURCE_SERVER frame. It is used for both SOURCE_SERVERS and TARGET_SERVERS.

SERVER_NETWORK: This is a BRIDGE_OBJECT between SOURCE_SERVER and NETWORK because there can be multiple NETWORKS for where the SOURCE_SERVER is connected into. It tells us some essential configuration properties for CAPACITY_PLANNING purposes like port count and configured PHYSICAL network throughput mb/s etc.

DOMAIN_NETWORK: This is a BRIDGE_OBJECT between DOMAIN and NETWORK.

SERVER_SOLUTION: This is a BRIDGE_OBJECT between SOURCE_SERVER and SOLUTION because there can be many SOURCE_SERVERS in one SOLUTION but also one SOURCE_SERVER may exist in many SOLUTIONS.

PARTY: Any OBJECT from DATA_CENTER level to a distinct DATABASE level in LOGICAL_TOPOLOGY, both on SOURCE_SYSTEM and TARGET SYSTEM may optionally refer to PARTY, which can be a company, association, public organization etc. PARTY can be used, for example; as a filtering rule for MIGRATION projects concerning only some PARTIES from overall LOGICAL_TOPOLOGY.

PARTY_DATA_CENTER: This is a BRIDGE_OBJECT between PARTY and DATA_CENTER and basically lists us which PARTIES are spread on which DATA_CENTERS.

FAILOVER_CLUSTER:This is a OBJECT for SOURCE_SYSTEM and TARGET_SYSTEM FAILOVER_CIUSTERS, FAILOVER_CLUSTER type can be such as Active—Passive or Active—Active and it may contain any number of FAILOVER_CLUSTER nodes. FAILOVER_CLUSTER can be also a virtual FAILOVER_CLUSTER. PHYSICAL_SERVER or VIRTUAL_SERVER may belong to a FAILOVER_CLUSTER. IS_VIRTUAL property tells us if current FAILOVER_CLUSTER is virtualized, PROJECT_TARGET_SERVER_SETUP: This OBJECT holds collection of TARGET_SYSTEM SERVER_SETUP OBJECTS. Each row in this OBJECT refers to a certain PROJECT, SERVER_SETUP, TARGET_NETWORK, TARGET_DOMAIN, TARGET_FAILOVER_CLUSTER, and optionally SOURCE_SERVER. Each row is telling us how many (1 to many to unlimited) servers of certain SERVER_SETUP in TARGET_SYSTEM should be applied for CAPACITY_PLANNING ENGINE calculations and which is desired fill level such as MAX_FILL_LEVEL_PERCENT_RAM for each SERVER_SETUP OBJECT in CAPACITY_PLANNING ENGINE calculations. See more from the detailed description of the method itself.

PROJECT_TARGET_STORAGE_UNIT_SETUP: This optional OBJECT holds collection of TARGET_SYSTEM STORAGE UNIT_SETUP OBJECTS. Each row in this OBJECT refers to a certain PROJECT, STORAGE_UNIT_SETUP, TARGET_NETWORK and TARGET_DOMAIN and optionally SOURCE_STORAGE_UNIT. Each row is telling us how many (1 to many to unlimited) storage units of certain STORAGE_UNIT_SETUP in TARGET_SYSTEM should be applied for CAPACITY_PLANNING ENGINE calculations and which is desired fill level such as MAX_FILL_LEVEL_TOTAL_IOPS for each STORAGE_DEVICE_SETUP OBJECT in CAPACITY_PLANNING ENGINE calculations. See more from the detailed description of the method itself.

PROJECT_TARGET_VIRTUAL_SERVER_SETUP: This OBJECT holds collection of TARGET_SYSTEM VIRTUAL_SERVER_SETUP OBJECTS. Each row in this OBJECT refers to a certain PROJECT. VIRTUAL_SERVER_SETUP, TARGET_NETWORK. TARGET_DOMAIN, TARGET_FAILOVER_CLUSTER, and optionally SOURCE_SERVER. Each row is telling us how many (1 to many to unlimited) servers of certain SERVER_SETUP in TARGET_SYSTEM should be applied for CAPACITY_PLANNING ENGINE calculations and which is desired fill level such as MAX_FILL_LEVEL_PERCENT_COMPUTING for each VIRTUAL_SERVER_SETUP OBJECT in CAPACITY_PLANNING ENGINE calculations. See more from the detailed description of the method itself.

SOURCE_SERVER_VIRTUAL_SERVER_POOL: This is a BRIDGE_OBJECT between SOURCE_SERVER and VIRTUAL_SERVER_POOL. One SOURCE_SERVER may exist in many VIRTUAL_SERVER_POOLS and vice versa.

TARGET_SERVER: This OBJECT refers to TARGET_DOMAIN, TARGET_NETWORK, CPU_BENCHMARK_SERVER, PLANNING_SCENARIO, SERVER_SETUP and TARGET_FAILOVER_CLUSTER and it holds forecasted list of SERVERS in TARGET_SYSTEM (DOMAIN, NETWORK) and its preferred configuration calculated by CAPACITY_PLANNING_ENGINE for certain PLANNING_SCENARIO. It shows forecast results as PERFORMANCE_COUNTERS fill level on TARGET_SERVER as a whole. It also shows all necessary statistics of how much configured TARGET_SERVER RESOURCES are remaining on current server on given hardware configuration and other configuration properties affecting CAPACITY_PLANNING. See more from the detailed description of the method itself.

TARGET_SERVER_FILL_LEVEL_TIME_SERIES: This OBJECT holds TIME_SERIES data for TARGET_SERVER_PERFORMANCE_COUNTERS fill level data from HARDWARE CAPACITY_PLANNING derived point of view from instance level PERFORMANCE_COUNTERS such as CPU, RAM and disk usage and it refers to TARGET_SERVER OBJECT. See more from the detailed description of the method itself.

TARGET_VIRTUAL_SERVER: This OBJECT refers to TARGET_DOMAIN, TARGET_SERVER, TARGET_NETWORK, CPU_BENCHMARK, VIRTUAL_SERVER, PLANNING_SCENARIO, SERVER_SETUP and TARGET_VIRTUAL_FAILOVER_CLUSTER and it holds forecasted list of VIRTUAL_SERVERS in TARGET_SYSTEM (DOMAIN, NETWORK) and its preferred configuration calculated by CAPACITY_PLANNING_ENGINE for certain PLANNING, SCENARIO. It shows forecast results as PERFORMANCE_COUNTERS fill level on TARGET, VIRTUAL_SERVER as a whole, it also shows all necessary statistics of how much configured TARGET_VIRTUAL_SERVER RESOURCES are remaining on current server on given hardware configuration and other configuration properties affecting CAPACITY_PLANNING. See more from the detailed description of the method itself.

TARGET_VIRTUAL_SERVER_FILL_LEVEL_TIME_SERIES: This OBJECT holds TIME_SERIES data for TARGET_VIRTUAL_SERVER_PERFORMANCE_COUNTERS fill level data from HARDWARE CAPACITY_PLANNING derived point of view from virtual instance level PERFORMANCE_COUNTERS such as CPU, RAM and disk usage and it refers to TARGET_VIRTUAL_SERVER OBJECT. See more from the detailed description of the method itself.

TARGET_INSTANCE: This OBJECT holds forecasted list of DBMS_INSTANCES in TARGET_SERVER (DOMAIN, NETWORK) and its preferred configuration calculated by CAPACITY_PLANNING_ENGINE for certain PLANNING_SCENARIO and it refers to TARGET_SERVER and SOURCE_INSTANCE. It shows forecast results as PERFORMANCE_COUNTERS fill level on TARGET_INSTANCE as a whole. In addition to this it shows all other necessary statistics concerning the CAPACITY_PLANNING and other configuration properties. See more from the detailed description of the method itself.

TARGET_INSTANCE_PERFORMANCE_COUNTER: This OBJECT holds list of PERFORMANCE_COUNTERS for referred TARGET_INSTANCE (DOMAIN, NETWORK) having reference from both SOURCE_INSTANCE TIME_SERIES and TARGET_INSTANCE forecasted TIME_SERIES data. See more from the detailed description of the method itself.

TARGET_INSTANCE_TIME_SERIES: This OBJECT refers to TARGET_INSTANCE_PERFORMANCE_COUNTER and holds copied list of SOURCE_INSTANCE_TIME_SERIES in SOURCE_SERVER (DOMAIN, NETWORK) with desired SAMPLING_START_DATE to SAMPLING_END_DATE time interval defined in SOLUTION OBJECT. These TIME_SERIES data are source data for CAPACITY_PLANNING_ENGINE norming calculations against new TARGET_SERVER.

TARGET_INSTANCE_TIME_SERIES_PREDICTION: This OBJECT holds forecasted list of referred instance level PERFORMANCE_COUNTERS in TARGET_SERVER (DOMAIN, NETWORK) and its preferred configuration calculated by CAPACITY_PLANNING_ENGINE for certain PLANNING_SCENARIO over time. It shows forecast results as PERFORMANCE_COUNTERS fill level on TARGET_INSTANCE over predicted TIME_SERIES. See more from the detailed description of the method itself.

TARGET_VIRTUAL_INSTANCE: This OBJECT holds forecasted list of DBMS_VIRTUAL_INSTANCES in TARGET_VIRTUAL_SERVER (DOMAIN, NETWORK) and its preferred configuration calculated by CAPACITY_PLANNING_ENGINE for certain PLANNING_SCENARIO and it refers to TARGET_VIRTUAL_SERVER and SOURCE_INSTANCE. It shows forecast results as PERFORMANCE_COUNTERS fill level on TARGET_VIRTUAL_INSTANCE as a whole. In addition to this it shows all other necessary statistics concerning the CAPACITY_PLANNING and other configuration properties. See more from the detailed description of the method itself.

TARGET_VIRTUAL_INSTANCE_PERFORMANCE_COUNTER; This OBJECT holds list of PERFORMANCE_COUNTERS for referred TARGET_VIRTUAL_INSTANCE (DOMAIN, NETWORK) having reference from both SOURCE_INSTANCE TIME_SERIES and TARGET_VIRTUAL_INSTANCE forecasted TIME_SERIES data. See more from the detailed description of the method itself.

TARGET_VIRTUAL_INSTANCE_TIME_SERIES: This OBJECT refers to TARGET_VIRTUAL_INSTANCE PERFORMANCE_COUNTER and holds copied list of SOURCE_INSTANCE_TIME_SERIES in SOURCE_SERVER (DOMAIN, NETWORK) with desired SAMPLING_START_DATE to SAMPLING_END_DATE time interval defined in SOLUTION OBJECT. These TIME_SERIES data are source data for CAPACITY_PLANNING_ENGINE norming calculations against new TARGET_VIRTUAL_SERVER.

TARGET_VIRTUAL_INSTANCE_TIME_SERIES_PREDICTION: This OBJECT holds forecasted list of referred instance level PERFORMANCE_COUNTERS in TARGET_VIRTUAL_SERVER (DOMAIN, NETWORK) and its preferred configuration calculated by CAPACITY_PLANNING_ENGINE for certain PLANNING_SCENARIO over time. It shows forecast results as PERFORMANCE_COUNTERS fill level on TARGET_VIRTUAL_INSTANCE over predicted TIME_SERIES. See more from the detailed description of the method itself.

TARGET_DATABASE: This OBJECT holds forecasted list of DATABASES in TARGET_INSTANCE (DOMAIN, NETWORK) and its preferred configuration calculated by CAPACITY_PLANNING_ENGINE for certain PLANNING_SCENARIO and it refers to TARGET_INSTANCE, TARGET_DATA_STORAGE_UNIT, TARGET_LOG_STORAGE_UNIT AND TARGET_BACKUP_STORAGE_UNIT. It shows forecast results as PERFORMANCE_COUNTERS fill level on TARGET_DATABASE as a whole. In addition to this it shows all other necessary statistics concerning the CAPACITY_PLANNING results. See more from the detailed description of the method itself.

TARGET_DATABASE_PERFORMANCE_COUNTER: This OBJECT holds list of PERFORMANCE_COUNTERS for referred TARGET_DATABASE (DOMAIN, NETWORK) having reference from both SOURCE_DATABASE TIME_SERIES and TARGET_DATABASE forecasted TIME_SERIES data. See more from the detailed description of the method itself.

TARGET_DATABASE_TIME_SERIES: This OBJECT refers to TARGET_DATABASE_PERFORMANCE_COUNTER and holds copied list of SOURCE_DATABASE_TIME_SERIES in SOURCE_INSTANCE (DOMAIN, NETWORK) with desired SAMPLING_START_DATE to SAMPLING_END_DATE time interval defined in SOLUTION OBJECT. These TIME_SERIES data are source data for CAPACITY_PLANNING_ENGINE norming calculations against TARGET_INSTANCE.

TARGET_DATABASE_TIME_SERIES_PREDICTION: This OBJECT holds forecasted list of TARGET_DATABASE_TIME_SERIES_PREDICTION in TARGET_INSTANCE (DOMAIN, NETWORK) and its preferred configuration calculated by CAPACITY_PLANNING_ENGINE for certain PLANNING_SCENARIO overtime. It shows forecast results as referred PERFORMANCE_COUNTER fill levels on TARGET_DATABASE over predicted TIME_SERIES. See more from the detailed description of the method itself.

TARGET_VIRTUAL_DATABASE: This OBJECT holds forecasted list of VIRTUAL_DATABASES in TARGET_VIRTUAL_INSTANCE (DOMAIN, NETWORK) and its preferred configuration calculated by CAPACITY_PLAN- NING_ENGINE for certain PLANNING_SCENARIO and it refers to TARGET_VIRTUAL_INSTANCE, TARGET_DATA_STORAGE_UNIT, TARGET_LOG_STORAGE_UNIT AND TARGET_BACKUP_STORAGE_UNIT. It shows forecast results as PERFORMANCE_COUNTERS fill level on TARGET_VIRTUAL_DATABASE as a whole. In addition to this it shows ail other necessary statistics concerning the CAPACITY_PLANNING results. See more from the detailed description of the method itself.

TARGET_VIRTUAL_DATABASE_PERFORMANCE_COUNTER: This OBJECT holds list of PERFORMANCE_COUNTERS for referred TARGET_VIRTUAL_DATABASE (DOMAIN, NETWORK) having reference from both SOURCE_DATABASE TIME_SERIES and TARGET_VIRTUAL_DATABASE forecasted TIME_SERIES data. See more from the detailed description of the method itself.

TARGET_VIRTUAL_DATABASE_TIME_SERIES This OBJECT refers to TARGET_VIRTUAL_DATABASE_PERFORMANCE_COUNTER and original SOURCE_DATABASE and holds copied list of SOURCE_INSTANCE_TIME_SERIES in SOURCE_SERVER (DOMAIN, NETWORK) with desired SAMPLING_START_DATE to SAMPLING_END_DATE time interval defined in SOLUTION OBJECT. These TIME_ SERIES data are source data for CAPACITY_PLANNING_ENGINE norming calculations against new VIRTUAL_TARGET_INSTANCE.

TARGET_VIRTUAL_DATABASE_TIME_SERIES_PREDICTION: This OBJECT refers to TARGET_VIRTUAL_DATABASE_PERFORMANCE_COUNTER and original SOURCE_DATABASE and holds forecasted list of TARGET_VIRTUAL_DATABASE_TIME_SERIES_PREDICTION in TARGET_VIRTUAL_INSTANCE (DOMAIN, NETWORK) and its preferred configuration calculated by CAPACITY_PLANNING_ENGINE for certain PLANNING_SCENARIO over time. It shows forecast results as referred PERFORMANCE_COUNTER fill levels on TARGET_VIRTUAL_DATABASE over predicted TIME_SERIES. See more from the detailed description of the method itself.

TARGET_SERVICE_TIER: This exemplary OBJECT holds a list of actual or hypothetical TARGET_SERVICE_TIERS in actual or hypothetical DATA_CENTER and its preferred configuration calculated by CAPACITY_PLANNING_ENGINE for certain PLANNING_SCENARIO. It shows forecast results as PERFORMANCE_COUNTERS fill level on SERVICE_TIER as a whole. In addition to this it shows all other necessary statistics concerning the CAPACITY_PLANNING and other configuration properties. See more from the detailed description of the method itself.

TARGET_SERVICE_TIER_TIME_SERIES: This exemplary OBJECT refers to TARGET_SERVICE_TIER and shows cumulated fill level list of predicted TARGET_DATABASE_TIME_SERIES in DATA_CENTER with desired SAMPLING_START_DATE to SAMPLING_END_DATE time interval defined in SOLUTION OBJECT for each PREDICTION on CAPACITY_PLANNING_ENGINE.

TARGET_DBAAS_DATABASE: This OBJECT holds forecasted list of database as a service (DBaaS) type of databases in TARGET_SERVICE_TIER and its preferred configuration calculated by CAPACITY_PLANNING_ENGINE for certain PLANNING_SCENARIO and it refers to TARGET_SERVICE_TIER, TARGET_DATA_STORAGE_TIER, TARGET_LOG_STORAGE_TIER AND TARGET_BACKUP_TIER. It shows forecast results as PERFORMANCE_COUNTERS fill level on TARGET_DBAAS_DATABASE as a whole. In addition to this it shows all other necessary statistics concerning the CAPACITY_PLANNING results. See more from the detailed description of the method itself.

TARGET_DBAAS_DATABASE_PERFORMANCE_COUNTER: This OBJECT holds list of PERFORMANCE_COUNTERS for referred TARGET_DBAAS_DATABASE having reference from both SOURCE_DATABASE TIME_SERIES and TARGET_DBAAS_DATABASE forecasted TIME_SERIES data. See more from the detailed description of the method itself.

TARGET_DBAAS_DATABASE_TIME_SERIES: This object refers to TARGET_DBAAS_DATABASE_PERFORMANCE_COUNTER and original SOURCE_DATABASE and holds copied list of SOURCE_INSTANCE_TIME_SERIES in SOURCE_SERVER (DOMAIN, NETWORK) with desired SAMPLING_START_DATE to SAMPLING_END_DATE time interval defined in SOLUTION OBJECT. These TIME_SERIES data are source data for CAPACITY_PLANNING_ENGINE norming calculations against new TARGET_SERVICE_TIER (VIRTUAL_TARGET_INSTANCE).

TARGET_DBAAS_DATABASE_TIME_SERIES_PREDICTION: This OBJECT refers to TARGET_DBAAS_DATABASE_PERFORMANCE_COUNTER and original SOURCE_DATABASE and holds forecasted list of TARGET_DBAAS_DATABASE_TIME_SERIES_PREDICTION in TARGET_SERVICE_TIER (DOMAIN, NETWORK) and its preferred configuration calculated by CAPACITY_PLANNING_ENGINE for certain PLANNING_SCENARIO over time, it shows forecast results as referred PERFORMANCE_COUNTER fill levels on TARGET_DBAAS_DATABASE over predicted TIME_SERIES. See more from the detailed description of the method itself.

PROJECT_AVAILABLE_STORAGE_UNIT_MODELS: This is a BRIDGE_OBJECT between PROJECT and STORAGE_UNIT_MODELS. It can be used to restrict CAPACITY_PLANNING for only certain STORAGE,_UNIT_MODELS.

PROJECT_AVAILABLE_SERVER_MODELS: This is a BRIDGE_OBJECT between PROJECT and SERVER_MODELS. It can be used to restrict CAPACITY_PLANNING for only certain SERVER_MODELS.

Figure 6:
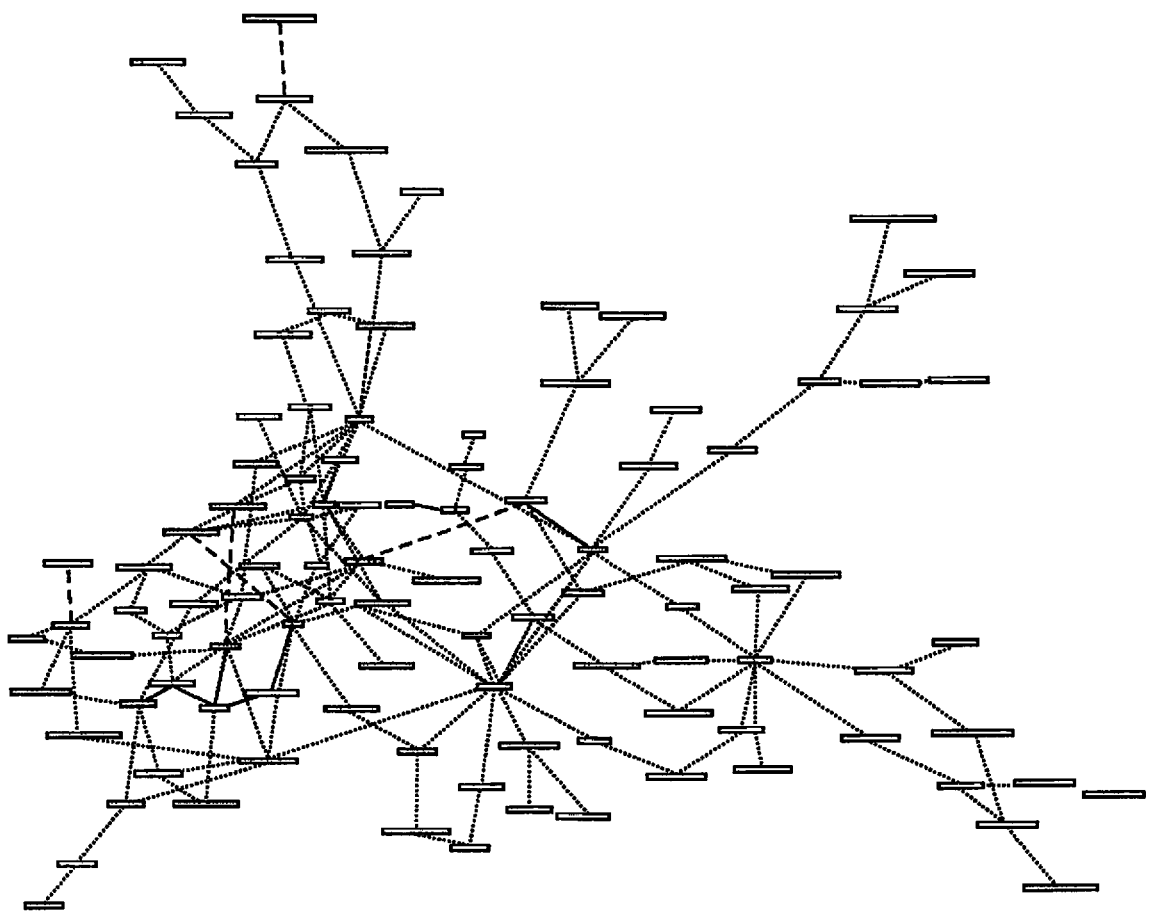
FIG. 6 shows data model relationships of an example LOGICAL_TOPOLOGY for CAPACITY_MANAGEMENT OBJECTS.
Figure 7:
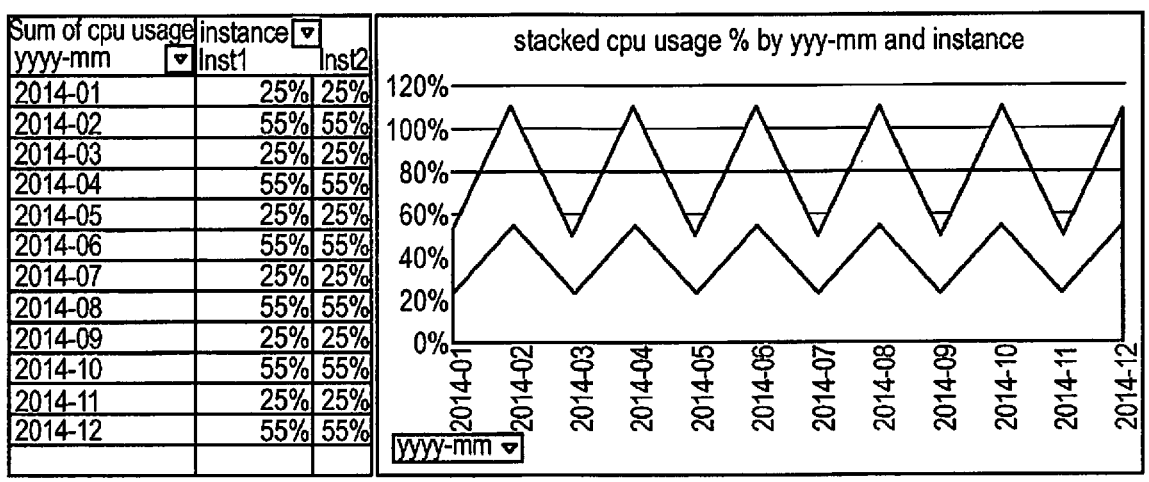
FIG. 7 shows a sample SOURCE_SYSTEM variable-based calculation for a desired DBMS instance in a SOURCE_SYSTEM to prepare it for fitting into a TARGET_SYSTEM server.

FIG. 6 shows data model relationships in an example LOGICAL_TOPOLOGY.

There may exists thousands of overall variables in capacity planning but defining only a few dozen archetypes we can get a good overall understanding of the functional logic behind CAPACITY_PLANNING ENGINE, which makes it possible to apply these principles for various different LOGICAL_TOPOLOGIES and usage scenarios. Ahead is described the most essential input variables for calculation. Note that most of these variables differ from CAPACITY_MANAGEMENT calculation variables yet though there exist a few variables in common between CAPACITY_MANAGEMENT and CAPACITY_PLANNING.

There exists (n) different kinds of SOURCE_SYSTEM Adjustment variables.
  Input variables
  Validation variables
  Adjustment variables
  Output variables Most of the variables act as a functions, some as variables, some as CONSTRAINTS. They have certain input parameters, they analyze existing performance counter TIME_SERIES data and return a modified result set based on proceeded analysis.

| Variable | Sample use cases | Formula | Description |
| --- | --- | --- | --- |
| Targeted aggregation threshold value limit (one to many) Type: Input variable. | Sample aggregation #1 Average cpu usage should be under 50% calculated over all TIME_SERIES data members for a certain performance counter. Sample aggregation #2 Average cpu usage should be under 60% calculated over day level TIME_SERIES data members for a certain performance counter. | On case basis. | Variable can be an aggregation of a performance counter over source data TIME_SERIES at any time dimension level (from all TIME_SERIES data into most atomic level such as one day). This input variable can be set for any number of PERFORMANCE_COUNTERS for any LOGICAL_TOPOLOGY OBJECTS on any desired level of the time dimension. |
| Valuated aggregation threshold value limit (one to many) Type: Validation variable. | Sample valuation for aggregation #1 Calculated average cpu usage was 57.5% over all TIME_SERIES data members in SOURCE_SYSTEM for a certain performance counter, which was 7.5 percent units more than allowed CONSTRAINT was set to. Sample valuation for aggregation #2 Calculated average cpu usage was 59% over day level TIME_SERIES data members in SOURCE_SYSTEM for a certain performance counter, which was 1.0 percent units less than maximum allowed CONSTRAINT was set to. | On case basis. | These variables are matching pairs for each targeted aggregation threshold value limit. These variables tell us actual calculation result against analyzed TIME_SERIES from original SOURCE_SYSTEM TIME_SERIES data. If calculation results exceed given targeted aggregation threshold value limit for any performance counter, the extract between these two parameters tells us how much gap there exists. |
| Targeted CONSTRAINT threshold value limit (one to many) | Sample CONSTRAINT #1 There can be only maximum of 4.17% of monthly TIME_SERIES data members exceeding given CONSTRAINT threshold limit of 70% in average_cpu_usage_% calculated over all TIME_SERIES data members (or contrary minimum of 95.83% of monthly TIME_SERIES data members not exceeding given CONSTRAINT threshold limit of 70% in average_cpu_usage_% calculated over all TIME_SERIES data members). Sample CONSTRAINT #2 There can be only maximum of 0.55% of daily TIME_SERIES data members exceeding given CONSTRAINT threshold limit of 80% in average_cpu_usage_% calculated over running (or rolling) year (or contrary minimum of 99.45% of monthly TIME_SERIES data members not exceeding given CONSTRAINT threshold limit of 80% in average_cpu_usage_% calculated over running (or rolling) year. | On case basis. | Variable can be a performance counter—driven CONSTRAINT such as SLA over source data TIME_SERIES at any time dimension level (from all TIME_SERIES data into most atomic level such as one day) having each desired threshold limit settings. This input variable can be set for any number of PERFORMANCE_COUNTERS for any LOGICAL_TOPOLOGY OBJECTS on any desired level of the time dimension. This variable acts as a function so we need to set many different parameters for it: TIME_SPAN for analysis i.e. source data TIME_SERIES start datetime and end datetime Time dimension level we want to calculate current performance counter against to Threshold limit value for identifying data member validity over all data members defined on selected time dimension level and TIME_SPAN Threshold limit value alert limit i.e. how many data member occurrences (quantitative or percentile-based) over all TIME_SERIES at selected time dimension level is allowed to exceed given threshold limit value. This is sla kind of parameter. Threshold limit value warning limit i.e. how many data member occurrences (quantitative or percentile-based) over all TIME_SERIES at |

-continued

| Variable | Sample use cases | Formula | Description |
| --- | --- | --- | --- |
| | | | selected time, dimension level is allowed to exceed given threshold limit value. This is sla kind of parameter. |
| Valuated CONSTRAINT threshold value limit (one to many) Type: Validation variable. | Sample valuation for CONSTRAINT #1 For our exemplary performance counter it was constrained to be only maximum of 4.17% of monthly TIME_SERIES data members exceeding given CONSTRAINT threshold limit of 70% in average_cpu_usage_%. Validated result from the SOURCE_SYSTEM performance counter TIME_SERIES was exactly 4.17% so it was ok. Sample valuation for CONSTRAINT #2 For our exemplary performance counter it was constrained to be only maximum of 0.55% of daily TIME_SERIES data members exceeding given CONSTRAINT threshold limit of 80% in average_cpu_usage_%. Validated result from the SOURCE_SYSTEM performance counter TIME_SERIES was 1.1% for a certain performance counter, which was 0.55 percent units more than allowed CONSTRAINT was set to. | On case basis. | These variables are matching pairs for each targeted CONSTRAINT threshold value limit. These variables tell us actual calculation result against analyzed TIME_SERIES from original SOURCE_SYSTEM TIME_SERIES data. If calculation results exceed given targeted CONSTRAINT threshold value limit for any performance counter, the extract between these two parameters tells us how much gap there exists. |
| Adjustment percentile Type: Adjustment variable | Sample adjustment Sample aggregation #1 Average cpu usage should be under 50% calculated over all TIME_SERIES data members for a certain performance counter. Sample valuation for aggregation #1 Calculated average cpu usage was 57.5% over all TIME_SERIES data members in SOURCE_SYSTEM for a certain performance counter, which was 7.5 percent units more than allowed CONSTRAINT was set to. Sample adjustment #1 targeted aggregation 50, threshold value limit 0% valuated aggregation 57, threshold value limit 5% Aggregation adjustment 13, centile 0% Calculated capacity adjustment needed for average cpu usage is 13%. | =(Targeted CONSTRAINT threshold value limit − Valuated CONSTRAINT threshold value limit)/ Targeted CONSTRAINT threshold value limit, =(Targeted aggregation threshold value limit − Valuated aggregation threshold value limit) / Targeted aggregation threshold value limit | This variable can be added to any of Targeted CONSTRAINT threshold values whenever we want to adjust SOURCE_SYSTEM capacity to meet their respective aggregation threshold and conttstraint threshold value limits acceptably according to the rules set. Variable calculates us the capacity demands adjustment percentile needed for each performance counter TIME_SERIES to meet their respective CONSTRAINTS before calculating capacity needs against actual TARGET_SYSTEM OBJECTS. |
| Annual growth percentile Type: Adjustment variable | Sample Annual growth percentile (59.9%-55.1%)/55.1% = 8.8% There is average lift of 8.8% in average cpu usage from year 2011 to year 2012. This information could be used to calculate cpu usage needs for year 2013. | Many possible ways to calculate this and depend on case basis as defined in CAPACITY_MANAGEMENT part of the document. Can be for example annual trend, a fixed or dynamic percentile calculated | System is estimated to grow this amount over annual lifecycle period. One should prefer trend-based analysis mechanism over long TIME_SERIES to get more precise estimate over TIME_SPAN t be predicted. |

| Variable | Sample use cases | Formula | Description |
| --- | --- | --- | --- |
| | | over wanted time period unit or whole TIME_SERIES to be predicted, such as: =(AVERAGE(2012) – AVERAGE(2011)/ AVERAGE(2011) | |
| Lifecycle Type: Input variable | 5 years | n/a | lifecycle time dimension level for over capacity planning being calculated such as 365 days or 5 years. |
| Lifecycle growth percentile Type: Adjustment variable | 52.3% In this sample case; a linear capacity growth forecast over next 5: years. | =((((((1 + (1 * P1)) * (1 + P2)) * (1 + P3)) * (1 + P4))) * (1 + P5)) – 1 Wherein the "P" refers to a period to be forecasted. Example above may be used to calculate prediction over 5 years based on Annual growth percentile estimated for each period P(1 . . . N). | System is estimated to grow this amount over lifecycle period to be forecasted. |
| Lifecycle total adjustment percentile Type: Adjustment variable | 72.1% In this sample case; a linear capacity growth forecast over next 5 years. | =(1 + aggregation adjustment centile) * (1 + lifecycle growth percentile) – 1 | How much in % we need more performance counter processing capacity such as avg cpu usage capacity in TARGET_SYSTEM for defined Lifecycle. |
| Source benchmark Type: Adjustment variable | For example we may have benchmarked relative floating point calculation performance with certain algorithm for certain 2.60 Ghz Intel Xeon processor having a relative CPU_PERFORMANCE_RATIO of 100 for floating point calculation. This processor is used in one SOURCE_SYSTEM SERVER in 2 sockets therefore having relative CPU_PERFORMANCE_RATIO of 100 + 100 = 200 on current server. Now, If we want to know how much relative cpu processing capacity it took for certain SOURCE_SERVER DBMS_INSTANCE, we should multiply this relative number with its opposing average cpu usage percentile over all TIME_SERIES data members, such as: 200 * 57.5% = 115. | (Parent OBJECT Source benchmark * Child OBJECT TIME_SERIES member percentile of parent) | This variable can be set for any number of PERFORMANCE_COUNTERS for any LOGICAL_TOPOLOGY OBJECTS on any desired level of the time dimension and it defines relative benchmark value over all TIME_SERIES in different levels. It is a best practice to have relative benchmark values always calculated for cpu related PERFORMANCE_COUNTERS preferring floating point and integer operations both, especially floating point operations. There are many global benchmark parties, benchmark test result sites and vendor benchmarks, which may be used as a base data for these calculations between actual SOURCE_SYSTEM OBJECTS and actual to hypothetical TARGET_SYSTEM OBJECTS. |
| Source margin adjustment Type: Adjustment variable | 30% This value can be fixed adjustment like 30% or it can vary on case basis. | n/a | Amount of margin left for SOURCE_SYSTEM PERFORMANCE_COUNTER capacity calculations for each OBJECT. |

| Variable | Sample use cases | Formula | Description |
| --- | --- | --- | --- |
| Target benchmark Type: Adjustment variable | For example we may have calculated a source benchmark value of relative cpu processing capacity for certain SOURCE_SERVER DBMS_INSTANCE over all TIME_SERIES data members as 100 and Source margin adjustment is set to 30% and Lifecycle total adjustment percentile set to 72.1%. We will get as follows: 115 * (1 + 72.1%) * (1 + 30%) = 223.8 | = Source benchmark * (1 + lifecycle total adjustment percentile) * (1 + source margin adjustment) | This variable can be set for any number of PERFORMANCE_COUNTERS for any LOGIGAL_TOPOLOGY OBJECTS on any desired level of the time dimension and it defines relative benchmark value over all TIME_SERIES in different levels. This will be the overall benchmark value for that particular OBJECT for each TIME_SERIES data member to be compared to the TARGET_SYSTEM OBJECTS. |

A sample SOURCE_SYSTEM variable-based calculation for desired DBMS_INSTANCE in SOURCE_SYSTEM to prepare it for fitting into (any) TARGET_SYSTEM SERVER can be seen in FIG. 8.

A sample TARGET_SYSTEM variable-based calculation for desired DBMS_INSTANCES in SOURCE_SYSTEM to fit into certain TARGET_SYSTEM SERVER can be seen in FIG. 9.

CAPACITY_PLANNING method can be divided in main use case and in variations of a base case wherein any of the variations can be mixed together by maintaining the same basic idea. The basic idea is to be able to try all the logical combinations of DBMS_INSTANCE and/or DATABASE PERFORMANCE_COUNTER TIME_SERIES from SOURCE_SYSTEM with their respective CONSTRAINTS defined to fit into any kind of existing, hypothetical or mixed TARGET_SYSTEM in a fashion wherein minimum RESOURCES are needed to use for desired PERFORMANCE_COUNTER TIME_SERIES with their respective CONSTRAINTS in prioritized order. It is very obvious when automating this calculation process by trying all the logical combinations we are able to find the most optimal configurations based on current SOURCE_SYSTEM_LOGICAL_TOPOLOGY as well as TARGET_SYSTEM LOGICAL_TOPOLOGY in case where we have refactored some essential elements concerning the CAPACITY_PLANNING calculations in a way as described in our sample data model.

If trying to use only aggregations over all TIME_SERIES such average cpu usage per DBMS_INSTANCE from 2014 in SOURCE_SYSTEM SERVER to forecast capacity needs in 2015 TARGET_SYSTEM SERVER having CONSTRAINT of maximum 80% average cpu usage per month per TARGET_SERVER. FIG. 9 points out why looking and comparing SOURCE_SYSTEM PERFORMANCE_COUNTER TIME_SERIES aggregations over whole TIME_SPAN or as rough as annual aggregations instead of more detailed TIME_SERIES analysis variations in different time dimension levels over time alone may give as an unbalanced solution wherein, for example in SOURCE_SYSTEM with summed up average cpu usage is 80% on annual level in 2014 for 2 equally behaving DBMS_INSTANCES having same amount of average cpu usage on monthly TIME_SERIES from different SOURCE_SERVERS we will have a situation where a method in TARGET_SYSTEM would lead into non-optimal solution by locating these 2 DBMS_INSTANCES on same TARGET_SERVER is TARGET_SERVER had respective cpu processing capacity. But when looking at TIME_SERIES on monthly level, we actually find out these SOURCE DBMS_INSTANCES generate summed up(=stacked in diagram) average cpu usage capacity need of 55+55–110% of maximum on every other month, which is more or less critical error. To prevent this, as a best practice, we should define a great variety of variables to solve these problems such as SOURCE_SYSTEM and TARGET_SYSTEM CONSTRAINTS, a comprehensive trend calculation and CAPACITY_MANAGEMENT mechanism (as described earlier in the method), and of course, a TIME_SERIES based analysis for fitting different SOURCE_SYSTEM OBJECTS into TARGET_SYSTEM TOPOLOGY like certain SOURCE_SYSTEM DBMS_INSTANCES into TARGET_SYSTEM TARGET_SERVERS.

For a method of fitting SOURCE_SYSTEM CONTAINER OBJECTS into a TARGET_SYSTEM, it is beneficial to use a TIME_SERIES-based, CONSTRAINED method. And to make even more detailed forecasts, we need to set CONSTRAINTS like SLAS into TIME_SERIES analysis.

One of the essential elements are the CAPACITY_MANAGEMENT CONSTRAINTS such as SLAS defined for each TIME_SERIES and ability to convert existing PERFORMANCE_COUNTER TIME_SERIES from SOURCE_SYSTEM into their respective TIME_SERIES refactored to match their RESOURCE consumption in TARGET_SYSTEM. Without a CONSTRAINT-driven CAPACITY_MANAGEMENT method described earlier in this document it would be harder to estimate a risk level for certain PERFORMANCE_COUNTERS over time from sla standpoint. When we are not only having a FORECAST for aggregated PERFORMANCE_COUNTER TIME_SERIES data over time (peaking, minimum, maximum, average etc.) but also a FORECAST of how much potential sla issues may occur over time it is easier to estimate risk levels and we are able to adjust smaller SAFETY_MARGIN in most of the cases.

As obvious, on hardware side most essential PERFORMANCE_COUNTERS for PHYSICAL and VIRTUAL network interfaces are the ones that generate network throughput, for PHYSICAL and VIRTUAL_SERVERS they are RAM memory, local system disks disk io, their read and write capacity and especially cpu performance figures (integer operations per second, floating-point operations per second), for storage devices they are disk io, their read, write and storage capacity etc. For all these (and many other) PERFORMANCE_COUNTERS it is a best practice to monitor TIME_SERIES data for such as average, minimum, maximum and peaking values (running, rolling) over different TIME_SPANS we need to be able to count CONSTRAINTS such as SLAS to and for which we need to renorm and refactor against new potential TARGET_SYSTEM/hardware configuration.

Without proper capacity management method, it is very hard to be able to FORECAST becoming capacity needs. That's why one possible, CONSTRAINT based CAPACITY_MANAGEMENT method is well defined in the beginning of this document referred to as CAPACITY_MANAGEMENT.

In bask use case, TARGET_SYSTEM LOGICAL_TOPOLOGY is predefined into a certain set of hardware, network and virtualization OBJECTS such as networks, domains and PHYSICAL host servers. Instead of privately held PHYSICAL host and VIRTUAL_SERVERS we can as well use public or hybrid cloud capacity like SQL Server in Azure Virtual Machine (Azure VM) as Infrastructure as a Service (IaaS) solution or Azure SQL Database as a Database as a Service (DbaaS) or Software as a Service (SaaS) solution and the method for CAPACITY_PLANNING remains all the same, the only big difference is in DbaaS case we are typically allocating the databases in a cloud from different size categories straight against cloud computing capacity instead of instance layer in LOGICAL_TOPOLOGY. The DbaaS use case is a bit different from our sample LOGICAL_TOPOLOGY data model but it is basically a simpler one because there are fewer abstraction layers to take in count in capacity calculations. For a DbaaS use case we would typically connect a DATABASE OBJECT straight into TARGET_SERVICE_TIER abstraction layer instead of DBMS_INSTANCE. This makes the CAPACITY_PLANNING ENGINE calculations even easier than in our LOGICAL_TOPOLOGY use cases because there are lesser abstraction layers to calculate becoming capacity needs against to.

One is free to decide and analyze on which OBJECT levels TIME_SERIES analysis for desired TARGET_SYSTEM is done. As a general rule of thumb is to define in SOURCE_SYSTEM which DATABASES (virtual or PHYSICAL) cannot be detached from their respective TARGET_INSTANCES (or TARGET_SERVICE. TIERS) in TARGET_SYSTEM, which DBMS_INSTANCES cannot be detached from their respective TARGET_SERVERS (virtual or PHYSICAL) in TARGET_SYSTEM, how much one should leave extra capacity (overhead) for each SOURCE_SYSTEM OBJECT and TARGET_SYSTEM OBJECT, which TIME_SERIES should be excluded from CAPACITY_PLANNING CALCULATIONS or fixed and how etc.

The following enlists some data fields for supporting CAPACITY_PLANNING method calculations:

CAPACITY PLANNING Over Static Setup Topology
1. Select RESOURCE(s) to be prioritized in calculation for against which the TARGET_SYSTEM will be optimized to RESOURCES to be prioritized can be such as CPU_CORE_COUNT and they act as input variables for our CAPACITY_PLANNING ENGINE calculations. Each prioritized RESOURCE must be bound to a certain level in LOGICAL_TOPOLOGY OBJECT in SOURCE_SYSTEM and/or in TARGET_SYSTEM. If more than one RESOURCE will be chosen, their respective priority i.e. processing order and OBJECT level in LOGICAL_TOPOLOGY must be chosen for each case and each of these OBJECTS in SOURCE_SYSTEM LOGICAL_TOPOLOGY and TARGET_SYSTEM LOGICAL_TOPOLOGY. If there is a need to calculate capacity for some of the RESOURCES on different level than the others, then CAPACITY_PLANNING SOLUTION may be split into as many separate SOLUTIONS as is needed to be able to CALCULATE overall capacity need for becoming TARGET_SYSTEM because their calculation rules and their OBJECT abstraction level differ from each other in any way. This may be a case for example in hybrid SOURCE_SYSTEM architecture scenarios wherein some of the SOURCE_SYSTEM data may exist in CLOUD_SERVICE like DATABASES bound to DBaaS SERVICE_TIER without a DBMS_INSTANCE OBJECT in between and the rest of the data may reside on a DATA_CENTER wherein all the DATABASES reside under a certain DBMS_INSTANCE. It is very obvious we must in such case have a different abstraction level for these different RESOURCES to be fit not only from SOURCE_SYSTEM but also into a TARGET_SYSTEM: DBaaS DATABASES will have PERFORMANCE_COUNTER TIME_SERIES and possible CONSTRAINTS count on DATABASE level but DATA_CENTER DATABASES will have PERFORMANCE_COUNTER TIME_SERIES and possible CONSTRAINTS count on DBMS_INSTANCE level, as well is most logical in fitting the data into TARGET_SYSTEM as well.

For example; if we want to minimize CPU_CORE_COUNT to be used in TARGET_SYSTEM LOGICAL_TOPOLOGY from existing DBaaS SOURCE_SYSTEM for each CAPACITY_PLANNING SOLUTION PROJECT on TARGET_SYSTEM, we must give a priority 1 for each relevant CPU-bound PERFORMANCE_COUNTER (such as AVERAGE_CPU_% as defined earlier in this document) on SOURCE_SYSTEM and TARGET_SYSTEM on DATABASE OBJECT level and then our method is able to calculate against each given TARGET_SYSTEM LOGICAL_TOPOLOGY defined within given CONSTRAINTS wherein the least CPU_CORE_COUNT is being used to replace existing SOURCE_SYSTEM CAPACITY in primary. If we want to set another CONSTRAINT such as MAXIMUM_RAM_USAGE on DATABASE OBJECT level in LOGICAL_TOPOLOGY we will give it a processing priority 2 and so on. This makes it actually possible to optimize overall capacity between such scenarios wherein the could remain more than 1 possible TARGET_SYSTEM SETUP possibility against given conditions because when priority 1 RESOURCES are optimized the method will proceed to priority 2 RESOURCE and so on until all the prioritized combinations are tried. It is important to understand a RESOURCE having a priority 1 is in most of the cases the most powerful variable to define becoming LOGICAL_TOPOLOGY and next input variables having processing priority {2, 3 . . . n} can affect overall calculation much less because the variable with priority 1 tells us we should have certain fixed CPU_CORE_COUNT (which is the minimum) in our LOGICAL_TOPOLOGY and therefore only limited possibilities exist for overall MAXIMUM_RAM_USAGE optimization.

NOTE! The rest of the CONSTRAINTS are in equal order: If any of them fail according to their individual rules that is not a possible TARGET_SYSTEM SETUP alternative!

2. Select PERFORMANCE_COUNTERS for which you want to create a planning engine forecast for Select only those PERFORMANCE_COUNTERS that you need for capacity planning purposes. Typically, these are such as network PERFORMANCE_COUNTERS, disk io and disk capacity PERFORMANCE_COUNTERS, ram consumption and cpu PERFORMANCE_COUNTERS such as AVERAGE_CPU_USAGE_%. You must have at least most essential PERFORMANCE_COUNTERS belonging for each RESOURCE you have selected in step 1 such as AVERAGE_CPU_USAGE_% is for CPU_COUNT resource and MAXIMUM_RAM_USAGE_GB and AVERAGE_RAM_USAGE are for RAM MEMORY RESOURCE.

3. Collect PERFORMANCE_COUNTERS MONITORING_DATA

Collect PERFORMANCE_COUNTERS monitoring TIME_SERIES for each OBJECT from desired start and end date TIME_SPAN such as 1.1.2014-31.12.2015.

4. Define the rules for each performance counter against which predicted TIME_SERIES are validated As a best practice there are a couple of best practices to define these rules:

One way is to define aggregation-based rules for each performance counter TIME_SERIES. One of the rules can be for example a rule that performance counter AVERAGE_CPU_USAGE_% should be under 50% for ail the TIME_SERIES for certain (one to many) or all of the DBMS_INSTANCES and furthermore AVERAGE_CPU_USAGE should be under 70% for monthly TIME_SERIES for certain (one to many) or all of the DBMS_INSTANCES.

Another way is to define CONSTRAINT such as sla-based rules for each performance counter TIME_SERIES. One of the rules could be for example that performance counter AVERAGE_CPU_USAGE_% should be under 70% calculated over all daily TIME_SERiES in 99.9% of TIME_SERIES members for certain (one to many) or all of the DBMS_INSTANCES.

Third way is to combine these two techniques which is preferred for most accurate overall CAPACITY_PLANNING FORECAST.

These rules set a baseline for becoming capacity needs.

5. Adjust SOURCE_SYSTEM OBJECT CONSTRAINTS and TIME_SERIES data

In this step we calculate all the TIME_SERIES adjusting and prepare the data for TARGET_SYSTEM.

After we have set these rules in SOURCE_SYSTEM against monitored data we are able to calculate current RESOURCE sufficiency and see how much we need to apply more capacity to meet all given CONSTRAINTS between monitored start date and end date. If this criterion is already met no TIME_SERIES adjusting has to be done on this side. But if criterion is not met, such as if AVERAGE_CPU_USAGE_% for certain performance counter was 57.5% over all TIME_SERIES for certain DBMS_INSTANCE, we need to calculate how much we should Apply more relative cpu processing capacity to meet given CONSTRAINT (and other CONSTRAINTS naturally). In this case, when AVERAGE_CPU_USAGE_% had to be under 50% for all the TIME_SERIES, we need to add 13% more cpu processing capacity: ((measured value−constrained value)/measured value)*100).

We also need to adjust TIME_SERIES over becoming lifecycle. For these purposes we have calculated growth estimate, based on CONSTRAINTS such as SLAS or plain trends for each performance counter. Based on these calculations we are able to count relative extra capacity for current performance counter. For our example; we want to plan 5 years lifecycle for our system and we have calculated a linear trend of 8.8% on annual level: (AVERAGE_CPU_USAGE_% 2015−AVERAGE_CPU_USAGE_% 2014)/AVERAGE_CPU_USAGES 2014*100) for extra capacity so therefore we need a 52.3% extra capacity for this current dbmsjnstance performance counter in 5 years: (((((((1*(1*ANNUAL_GROWTH_%))*(1*ANNUAL_GROWTH_%))*(1+ANNUAL_GROWTH_%))* (1*ANNUAL_GRQWTH_%)))*(1+ANNUAL_GROWTH_%))−1)*100.

By combining these 2 figures; a relative need to grow existing capacity within rules set multiplied by a forecast for extra future capacity needs we can calculate overall relative capacity needs for next 5 years which is 72.1%: ((1+extra capacity needs %)*(1+future capacity needs %)−1)*100.

Now, because we have selected CPU_CORE_COUNT as a prioritized RESOURCE, we need to adjust it against generic trustworthy cpu benchmark results or some cpu benchmark tests of our own. The grand idea behind using cpu benchmarks is that because we are using relative norming we can use these cpu benchmark results to compare cpu performance in different server models and setups, virtual server pools. VIRTUAL_SERVERS, DBMS instances and even service tier-based public cloud database in DbaaS environments. This makes it possible to forecast not only absolute values like RAM capacity needs but also CPU usage needs in the future in different hardware configurations and on different cloud/virtualization platforms.

For example, if certain benchmark test has given relative integer processing benchmark result of 500 and floating point processing benchmark result of 1000 to a SOURCE_SYSTEM SERVER a for which is given 20% of all cpu RESOURCES for each dbms instance in Resource governor it means each dbms instance has got relative integer processing benchmark result of: (500/5−100) and floating point processing benchmark result of 1000/5−200. Furthermore; an OS reserve and application/service reserve running on source server can be set as fine-tuning variables to realistically reduce overall host capacity before spreading rest of the RESOURCES into these 5 dbms instances evenly (as in this case it was), yet though this is typically very little overhead because database servers and services are often dedicated for their use. This data can be ideally monitored on OS level when it comes to cpu because an estimation or statistics based variable is not that accurate compared to the real fife statistics.

Now, after we have calculated TIME_SERIES prediction over wanted prediction start date and prediction end date for each performance counter against given CONSTRAINTS, we are furthermore able to evaluate each performance counter CONSTRAINT over all selected TIME_SERIES and mark those time dimension members qualified that meet the CONSTRAINT threshold value with desired SAFETY_MARGIN. This target margin can be set when we want to count in a little safety margin for our calculations. For our example we will give it a big 30% so it means in overall cpu capacity benchmark needs for TARGET_SYSTEM DBMS_INSTANCE from level for our sample to raise from 100 to 223.8 for integer operations and 447.6 for floating point operations.

Now we can copy SOURCE_SYSTEM OBJECT TIME_SERIES into TARGET_SYSTEM cache/retention in order to start actual capacity profile fitting.

6. Define TARGET_SYSTEM LOGICAL_TOPOLOGY with desired OBJECTS setup, their wanted configurations, maximum count for each setup OBJECT type and possible processing order In this phase we will define wanted LOGICAL_TOPOLOGY in terms wherein we tell which kind of DATA_CENTERS, NETWORKS, DOMAINS, SERVERS, VIRTUAL_SERVERS, STORAGE_SERVICES, SERVICE_TIERS, and such we are having and how many of them we can use at maximum each. After we have created wanted hardware setups from our existing hardware model data, in case of privately field TARGET_SYSTEM, we need to choose from which server setup we start filling in the capacity TIME_SERIES against each TARGET_SYSTEM OBJECT.

For example, we may have a SERVER_MODELS Dell Power edge X320 and Dell Power edge X830 xd selected as our TARGET_SYSTEM TARGET_SERVER models and define in which configuration they can be used (socket count and which cpu we are using, RAM amount etc.) and we may have certain amount of SERVICE_TIER capacity reserved for our TARGET_DATABASES in TARGET_SYSTEM.

7. Adjust TARGET_SYSTEM OBJECT CONSTRAINTS, benchmarks and TIME_SERIES data

Now, based on respective benchmark data for these servers we are actually able to use adjusted data on existing SOURCE_SYSTEM OBJECTS to fill in their respective performance counter TIME_SERIES and see how they fit the best because we know the CONSTRAINTS for each TARGET_SERVER SETUP in this phase as well as their respective benchmark such as relative integer processing benchmark result of 1000 and floating point processing benchmark result of 2000 for Dell 320 with certain intel Xeon processor setup and benchmark result of 1500 and floating point processing benchmark result of 3000 for Dell 830 xd with certain intel Xeon processor setup. In this phase we should proceed all similar operations with opposing variables as earlier but this time for becoming/hypothetical TARGET_SYSTEM such as setting desired TARGET_SYSTEM CONSTRAINTS and server reserve such as OS RAM reserve and normed CPU ratio reserve. Here we calculate TARGET_SYSTEM TIME_SERIES CONSTRAINTS as ratio numbers for each performance counter against given configuration CONSTRAINTS based on trend calculation or aggregation calculations such as averages or any mathematical formula for each member of each TIME_SERIES for each SOURCE_SYSTEM topology OBJECT. There can be different CONSTRAINT limits for each performance counter to fulfill.

8. Evaluate and compare all needed refactored SOURCE_SYSTEM OBJECT PERFORMANCE_COUNTER TIME_SERIES against given TARGET_SYSTEM with preconfigured LOGICAL_TOPOLOGY and processing order of OBJECT_SETUP_DATA to have minimum amount of RESOURCES in prioritized order for all the TARGET_SYSTEM OBJECT LEVELS meeting their respective CONSTRAINTS 9. Output results (order from best to worse for example)

CAPACITY_PLANNING by Adding Cost-Based CONSTRAINTS

1. Select RESOURCE(s) and/or cost-based CONSTRAINTS to be prioritized in calculation for against which the TARGET_SYSTEM will be optimized to
2. Select PERFORMANCE_COUNTERS for which you want to create a planning engine forecast for
3. Collect PERFORMANCE_COUNTERS MONITORING_DATA
4. Define the rules for each performance counter against which predicted TIME_SERIES are validated
5. Adjust SOURCE_SYSTEM OBJECT CONSTRAINTS and TIME_SERIES data
6. Define TARGET_SYSTEM LOGICAL_TOPOLOGY with desired OBJECTS setup, their wanted configurations, maximum count for each setup OBJECT type and possible processing order
7. Adjust TARGET_SYSTEM OBJECT CONSTRAINTS, benchmarks and TIME_SERIES data
8. Set desired TARGET_SYSTEM CONSTRAINTS and server reserve such as OS RAM reserve and normed CPU ratio reserve
9. Calculate TARGET_SYSTEM TIME_SERIES CONSTRAINTS as ratio numbers for each performance counter against given configuration CONSTRAINTS based on trend calculation or aggregation calculations such as averages or any mathematical formula for each member of each TIME_SERIES for each SOURCE_SYSTEM topology OBJECT. There can be (n)different CONSTRAINT limits for each performance counter to fulfill
10. Evaluate and compare all needed refactored SOURCE_SYSTEM OBJECT PERFORMANCE_COUNTER TIME_SERIES against given TARGET_SYSTEM with preconfigured LOGICAL_TOPOLOGY and processing order of OBJECT SETUP_DATA to have minimum amount of RESOURCES in prioritized order for all the TARGET_SYSTEM OBJECT LEVELS meeting their respective CONSTRAINTS
11. Output results CAPACITY_PLANNING Over Static Setup Topology by Optimizing Last OBJECT Setup 1. Select RESOURCE(s) to be prioritized in calculation for against which the TARGET_SYSTEM will be optimized to
2. Select PERFORMANCE_COUNTERS for which you want to create a planning engine forecast for
3. Collect PERFORMANCE_COUNTERS MONITORING_DATA
4. Define the rules for each performance counter against which predicted TIME_SERIES are validated
5. Adjust SOURCE_SYSTEM OBJECT CONSTRAINTS and TIME_SERIES data
6. Define TARGET_SYSTEM LOGICAL_TOPOLOGY with desired OBJECTS setup, their wanted configurations, maximum count for each setup OBJECT type and possible processing order
7. Adjust TARGET_SYSTEM OBJECT CONSTRAINTS, benchmarks and TIME_SERIES data
8. Set desired TARGET_SYSTEM CONSTRAINTS and server reserve such as OS RAM reserve and normed CPU ratio reserve
9. Calculate TARGET_SYSTEM TIME_SERIES CONSTRAINTS as ratio numbers for each performance counter against given configuration CONSTRAINTS based on trend calculation or aggregation calculations such as averages or any mathematical formula for each member of each TIME_SERIES for each SOURCE_SYSTEM topology OBJECT. There can be (n)different CONSTRAINT limits for each performance counter to fulfill
10. Evaluate and compare all needed refactored SOURCE_SYSTEM OBJECT PERFORMANCE_COUNTER TIME_SERIES against given TARGET_SYSTEM with preconfigured LOGICAL_TOPOLOGY and processing order of OBJECT SETUP_DATA to have minimum amount of RESOURCES in prioritized order for all the TARGET_SYSTEM OBJECT LEVELS meeting their respective CONSTRAINTS
11. After last topology OBJECT is filled find smallest configuration of system RESOURCES to meet respective CONSTRAINTS
12. Output results CAPACITY_PLANNING Over Dynamic Setup Topology 1. Select RESOURCE(s) to be prioritized in calculation for against which the TARGET_SYSTEM will be optimized to
2. Select PERFORMANCE_COUNTERS for which you want to create a planning engine forecast for
3. Collect PERFORMANCE_COUNTERS MONITORING_DATA
4. Define the rules for each performance counter against which predicted TIME_SERIES are validated
5. Adjust SOURCE_SYSTEM OBJECT CONSTRAINTS and TIME_SERIES data
6. Define TARGET_SYSTEM LOGICAL_TOPOLOGY with desired OBJECTS setup, their wanted configurations, maximum count for each setup OBJECT type and possible processing order
7. Adjust TARGET_SYSTEM OBJECT CONSTRAINTS, benchmarks and TIME_SERIES data
8. Set desired TARGET_SYSTEM minimum and maximum range CONSTRAINTS and server reserve such as OS RAM reserve and normed CPU ratio reserve
9. Calculate TARGET_SYSTEM TIME_SERIES CONSTRAINTS as ratio numbers for each performance counter against given configuration CONSTRAINTS based on trend calculation or aggregation calculations such as averages or any mathematical formula for each member of each TIME_SERIES for each SOURCE_SYSTEM topology OBJECT. There can be (n)different CONSTRAINT limits for each performance counter to fulfill
10. Create a scenario for each desired logical combination of TARGET_SYSTEM setups
11. Evaluate and compare all needed refactored SOURCE_SYSTEM OBJECT PERFORMANCE_COUNTER TIME_SERIES against given TARGET_SYSTEM with preconfigured LOGICAL_TOPOLOGY and processing order of OBJECT SETUP_DATA to have minimum amount of RESOURCES in prioritized order for all the TARGET_SYSTEM OBJECT LEVELS meeting their respective CONSTRAINTS
12. Output results CAPACITY_PLANNING Over Static Model Topology
1. Select RESOURCE(s) to be prioritized in calculation for against which the TARGET_SYSTEM will be optimized to
2. Select PERFORMANCE_COUNTERS for which you warn to create a planning engine forecast for
5. Collect PERFORMANCE_COUNTERS MONITORING_DATA
4. Define the rules for each performance counter against which predicted TIME_SERIES are validated
5. Adjust SOURCE_SYSTEM OBJECT CONSTRAINTS and TIME_SERIES data
6. Define TARGET_SYSTEM LOGICAL_TOPOLOGY with desired OBJECTS setup, their wanted configurations, maximum count for each setup OBJECT type and possible processing order
7. Adjust TARGET_SYSTEM OBJECT CONSTRAINTS, benchmarks and TIME_SERIES data
8. Set desired TARGET_SYSTEM minimum and maximum range CONSTRAINTS and server reserve such as OS RAM reserve and normed CPU ratio reserve
9. Calculate TARGET_SYSTEM TIME_SERIES CONSTRAINTS as ratio numbers for each performance counter against given configuration CONSTRAINTS based on trend calculation or aggregation calculations such as averages or any mathematical formula for each member of each TIME_SERIES for each SOURCE_SYSTEM topology OBJECT. There can be (n)different CONSTRAINT limits for each performance counter to fulfill
10. Create a scenario for each desired logical combination of TARGET_SYSTEM setups according to the model data
11. Evaluate and compare all needed refactored SOURCE_SYSTEM OBJECT PERFORMANCE_COUNTER TIME_SERIES against given TARGET_SYSTEM with preconfigured LOGIC_TOPOLOGY and processing order of OBJECT SETUP_DATA to have minimum amount of RESOURCES in prioritized order for all the TARGET_SYSTEM OBJECT LEVELS meeting their respective CONSTRAINTS
12. Output result CAPACITY_PLANNING by Competing Different Static Setup Topologies
1. Select RESOURCES) to be prioritized in calculation for against which the TARGET_SYSTEM will be optimized to
2. Select PERFORMANCE_COUNTERS for which you want to create a planning engine forecast for
3. Collect PERFORMANCE_COUNTERS MONITORING_DATA
4. Define the rules for each performance counter against which predicted TIME_SERIES are validated
5. Adjust SOURCE_SYSTEM OBJECT CONSTRAINTS and TIME_SERIES data
6. Define TARGET_SYSTEM LOGICAL_TOPOLOGY with desired OBJECTS setup, their wanted configurations, maximum count for each setup OBJECT type and possible processing order
7. Iterate steps from 8 to 11 for each competing OBJECT LOGICAL_TOPOLOGY setup
8. Adjust TARGET_SYSTEM OBJECT CONSTRAINTS, benchmarks and TIME_SERIES data in LOGICAL_TOPOLOGY setup (n)
9. Set desired TARGET_SYSTEM minimum and maximum range CONSTRAINTS and server reserve such as OS RAM reserve and normed CPU ratio reserve in LOGICAL_TOPOLOGY setup (n)
10. Calculate TARGET_SYSTEM TIME_SERIES CONSTRAINTS as ratio numbers for each performance counter against given configuration CONSTRAINTS based on trend calculation or aggregation calculations such as averages or any mathematical formula for each member of each TIME_SERIES for each SOURCE_SYSTEM topology OBJECT. There can be (n) different CONSTRAINT limits for each performance counter to fulfill in LOGICAL_TOPOLOGY setup (n)
11. Evaluate and compare all needed refactored SOURCE_SYSTEM OBJECT PERFORMANCE_COUNTER TIME_SERIES against given TARGET_SYSTEM with preconfigured LOGICAL_TOPOLOGY and processing order of OBJECT SETUP_DATA to have minimum amount of RESOURCES in prioritized order for all the TARGET_SYSTEM OBJECT LEVELS meeting their respective CONSTRAINTS
12. Output and compare results CAPACITY_PLANNING by Competing Different Dynamic Setup Topologies
1. Select RESOURCE(s) to be prioritized in calculation for against which the TARGET_SYSTEM will be optimized to
2. Select PERFORMANCE_COUNTERS for which you want to create a planning engine forecast for 3. Collect PERFORMANCE_COUNTERS MONITORING_DATA
4. Define the rules for each performance counter against which predicted TIME_SERIES are validated
5. Adjust SOURCE_SYSTEM OBJECT CONSTRAINTS and TIME_SERIES data
6. Define TARGET_SYSTEM LOGICAL_TOPOLOGY with desired OBJECTS setup, their wanted configurations, maximum count for each setup OBJECT type and possible processing order
7. Iterate steps from 8 to 12 for each competing OBJECT LOGICAL_TOPOLOGY setup
8. Adjust TARGET_SYSTEM OBJECT CONSTRAINTS, benchmarks and TIME_SERIES data in LOGICAL_TOPOLOGY setup (n)
9. Set desired TARGET_SYSTEM minimum and maximum range CONSTRAINTS and server reserve such as OS RAM reserve and normed CPU ratio reserve in LOGICAL_TOPOLOGY setup (n)
10. Calculate TARGET_SYSTEM TIME_SERIES CONSTRAINTS as ratio numbers for each performance counter against given configuration CONSTRAINTS based on trend calculation or aggregation calculations such as averages or any mathematical formula for each member of each TIME_SERIES for each SOURCE_SYSTEM topology OBJECT. There can be (n) different CONSTRAINT limits for each performance counter to fulfill in LOGICAL_TOPOLOGY setup (n)
11. Create a scenario for each desired logical combination of TARGET_SYSTEM setups
12. Evaluate and compare all needed refactored SOURCE_SYSTEM OBJECT PERFORMANCE_COUNTER TIME_SERIES against given TARGET_SYSTEM with preconfigured LOGICAL_TOPOLOGY and processing order of OBJECT SETUP_DATA to have minimum amount of RESOURCES in prioritized order for all the TARGET_SYSTEM OBJECT LEVELS meeting their respective CONSTRAINTS
13. Output and compare results CAPACITY_PLANNING by Competing Different Static Model Topologies
1. Select RESOURCE(s) to be prioritized in calculation for against which the TARGET_SYSTEM will be optimized to
2. Select PERFORMANCE_COUNTERS for which you want to create a planning engine forecast for
3. Collect PERFORMANCE_COUNTERS MONITORING_DATA
4. Define the rules for each performance counter against which predicted TIME_SERIES are validated
5. Adjust SOURCE_SYSTEM OBJECT CONSTRAINTS and TIME_SERIES data
6. Define TARGET_SYSTEM LOGICAL_TOPOLOGY with desired OBJECTS setup, their wanted configurations, maximum count for each setup OBJECT type and possible processing order
7. Iterate steps from 8 to 12 for each competing OBJECT LOGICAL_TOPOLOGY model
8. Adjust TARGET_SYSTEM OBJECT CONSTRAINTS, benchmarks and TIME_SERIES data in LOGICAL_TOPOLOGY setup (n)
9. Set desired TARGET_SYSTEM minimum and maximum range CONSTRAINTS and server reserve such as OS RAM reserve and normed CPU ratio reserve
10. Calculate TARGET_SYSTEM TIME_SERIES CONSTRAINTS as ratio numbers for each performance counter against given configuration CONSTRAINTS based on trend calculation or aggregation calculations such as averages or any mathematical formula for each member of each TIME_SERIES for each SOURCE_SYSTEM topology OBJECT. There can be (n) different CONSTRAINT limits for each performance counter to fulfill in LOGICAL_TOPOLOGY setup (n)
11. Create a scenario for each desired logical combination of TARGET_SYSTEM setups according to the model data
12. Evaluate and compare all needed refactored SOURCE_SYSTEM OBJECT PERFORMANCE_COUNTER TIME_SERIES against given TARGET_SYSTEM with preconfigured LOGICAL_TOPOLOGY and processing order of OBJECT SETUP_DATA to have minimum amount of RESOURCES in prioritized order for all the TARGET_SYSTEM OBJECT LEVELS meeting their respective CONSTRAINTS
13. Output and compare results CAPACITY_PLANNING by Competing Different Planning Scenarios
1. Select RESOURCE(s) to be prioritized in calculation for against which the TARGET_SYSTEM will be optimized to
2. Select PERFORMANCE_COUNTERS for which you want to create a planning engine forecast for
3. Collect PERFORMANCE_COUNTERS MONITORING_DATA
4. Define the rules for each performance counter against which predicted TIME_SERIES are validated
5. Adjust SOURCE_SYSTEM OBJECT CONSTRAINTS and TIME_SERIES data
6. Define or auto create each possible case to compete for TARGET_SYSTEM LOGICAL_TOPOLOGY with desired OBJECTS setup, their wanted configurations, maximum count for each setup OBJECT type and possible processing order
7. Iterate steps from 8 to 12 for each competing planning scenario of LOGICAL_TOPOLOGY setup with different models, setups, maximum count and processing order
8. Adjust TARGET_SYSTEM OBJECT CONSTRAINTS, benchmarks and TIME_SERIES data in LOGICAL_TOPOLOGY setup (n)
9. Set desired TARGET_SYSTEM minimum and maximum range CONSTRAINTS and server reserve such as OS RAM reserve and normed CPU ratio reserve in LOGICAL_TOPOLOGY setup (n)
10. Calculate TARGET_SYSTEM TIME_SERIES CONSTRAINTS as ratio numbers for each performance counter against given configuration CONSTRAINTS based on trend calculation or aggregation calculations such as averages or any mathematical formula for each member of each TIME_SERIES for each SOURCE_SYSTEM topology OBJECT. There can be (n) different CONSTRAINT limits for each performance counter to fulfill in LOGICAL_TOPOLOGY setup (n)
11. Create a scenario for each desired logical combination of TARGET_SYSTEM setups
12. Evaluate and compare all needed refactored SOURCE_SYSTEM OBJECT PERFORMANCE_COUNTER TIME_SERIES against given TARGET_SYSTEM with preconfigured LOGICAL_TOPOLOGY and processing order of OBJECT SETUP_DATA to have minimum amount of RESOURCES in prioritized order for ail the TARGET_SYSTEM OBJECT LEVELS meeting their respective CONSTRAINTS
13. Output and compare results Any CAPACITY_PLANNING Method Described Above may be Applied:
  Across multiple DATA_CENTERS by utilizing cloud aggregation
  On DATA_CENTER level
  On NETWORK_GROUP level On NETWORK level
On DOMAIN level
On PHYSICAL_SERVE R level
On PHYSICAL_SERVER VIRTUALIZATION_RESOURCE_POOL level
On PHYSICAL_FAILOVER_CLUSTER level
On VIRTUAL_FAILOVER_CLUSTER level
On VIRTUAL_SERVER level
On SERVICE_TIER level
On DBMS_INSTANCE level
On DBMS_INSTANCE RESOURCE_POOL level
On DATABASE level
On STORAGE_UNIT level
Any of the network switches, interfaces and ports in between
Any logical combination of above mentioned
etc.

It is not rare that there exists PLANNING_SCENARIOS having the same number of TARGET_SERVERS but containing different SOURCE_INSTANCES inside the TARGET_SERVERS. In terms of scalability and TARGET_SYSTEM lifecycle expectancy, it is important to find the most optimal distribution of overall capacity such as cpu usage between the servers. According to an embodiment, in any of the variations of, one more step may be added before the last, "outputting results" step, which makes the method even more accurate in cases wherein minimal amount of TARGET_SERVERS is used for SOURCE_INSTANCES.

Figure 10:
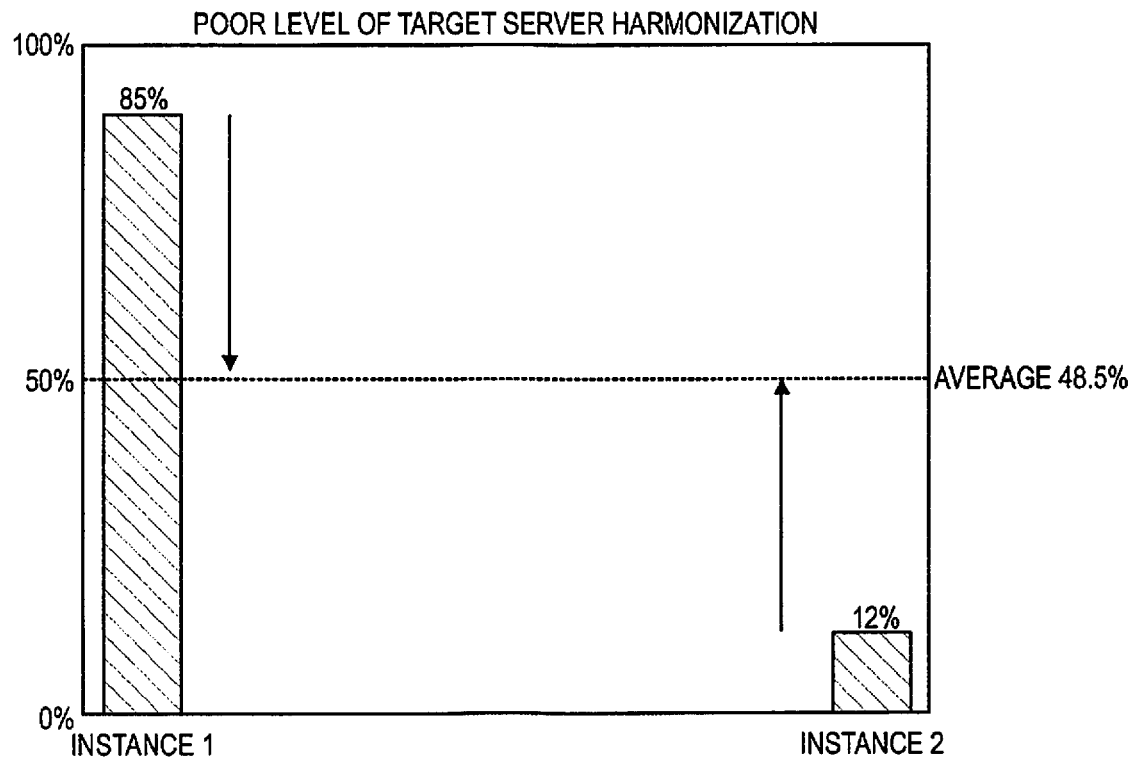
FIG. 10 shows a poor level of target, server harmonization
Figure 11:
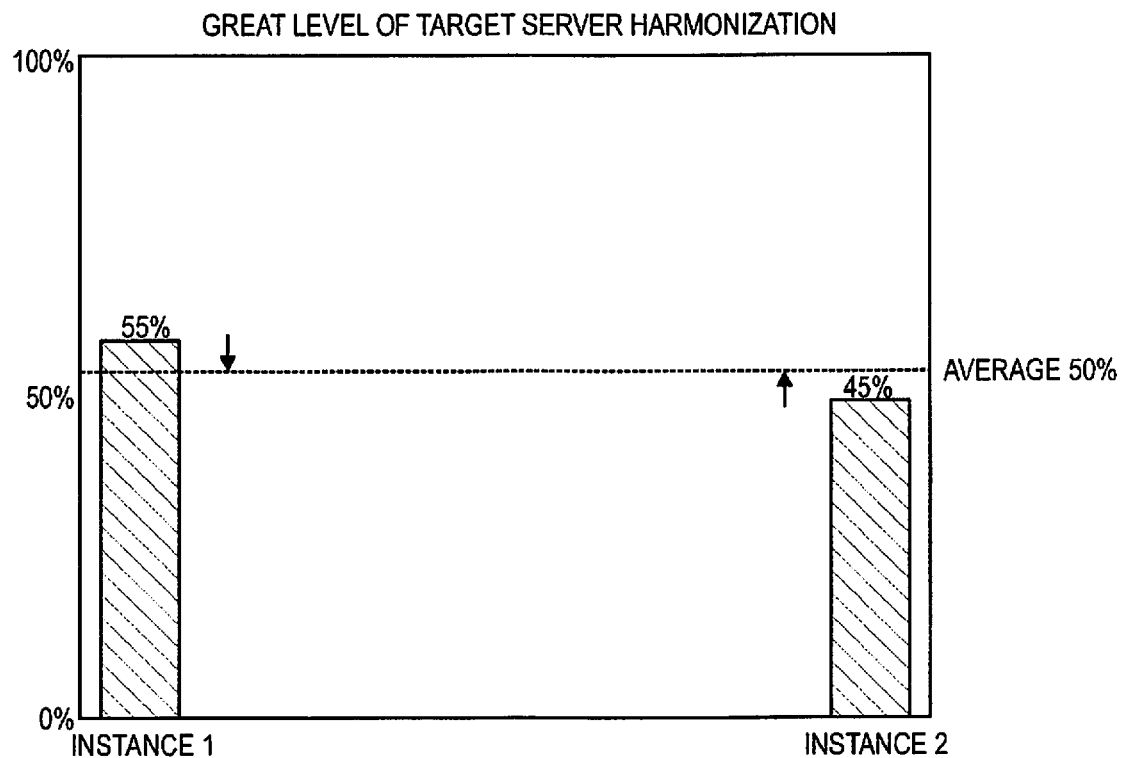
FIG. 11 shows a good level of target server harmonization

First form of the calculation comes from harmonization of the distribution of SOURCE_INSTANCES between the TARGET_SERVERS: This can be done by counting the average of each TARGET_SERVER cpu consumption inside a PLANNING_SCENARIO and counting how much the absolute value of each contained SOURCE_INSTANCE average cpu consumption differs from average TARGET_SERVER cpu consumption, summed up together on PLANNING_SCENARIO level. This calculates the most evenly balanced option between similar TARGET_SYSTEM_TOPOLOGIES having same amount of TARGET_SERVERS: The smaller the sum, the more evenly distributed these instances are inside the server over the PLANNING_SCENARIO. This prediction is preferably calculated over the whole LIFECYCLE of the TARGET_SYSTEM. FIG. FIG. 10 shows a poor level of target server harmonization and FIG. 11 shows a good level of target server harmonization.

Figure 12:
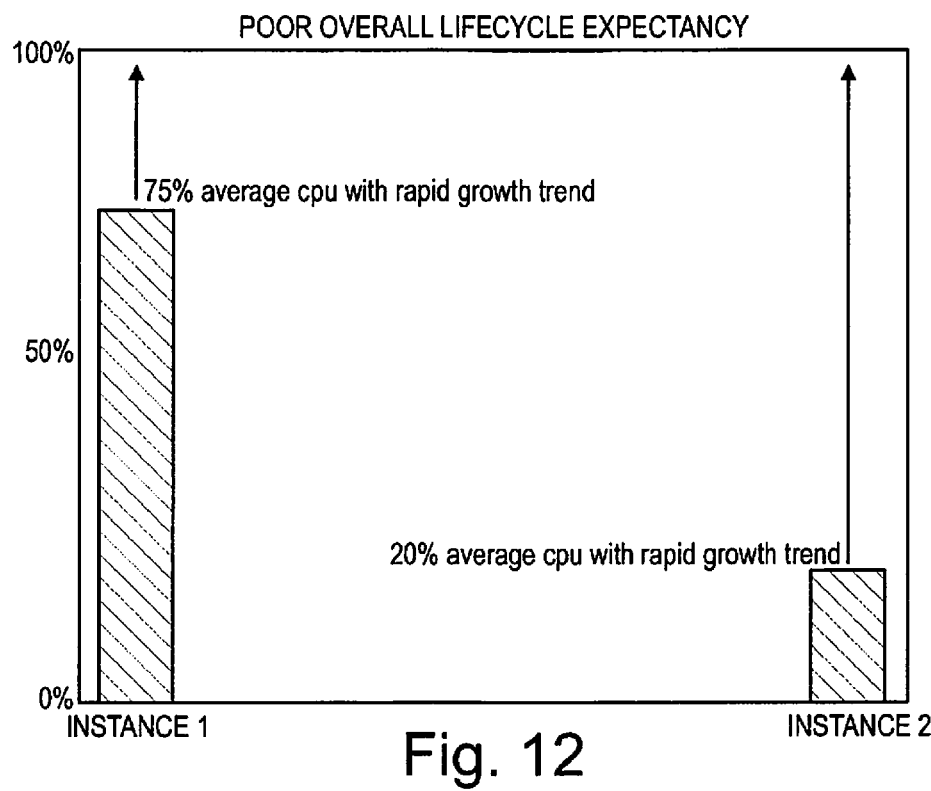
FIG. 12 shows a poor overall lifecycle expectancy
Figure 13:
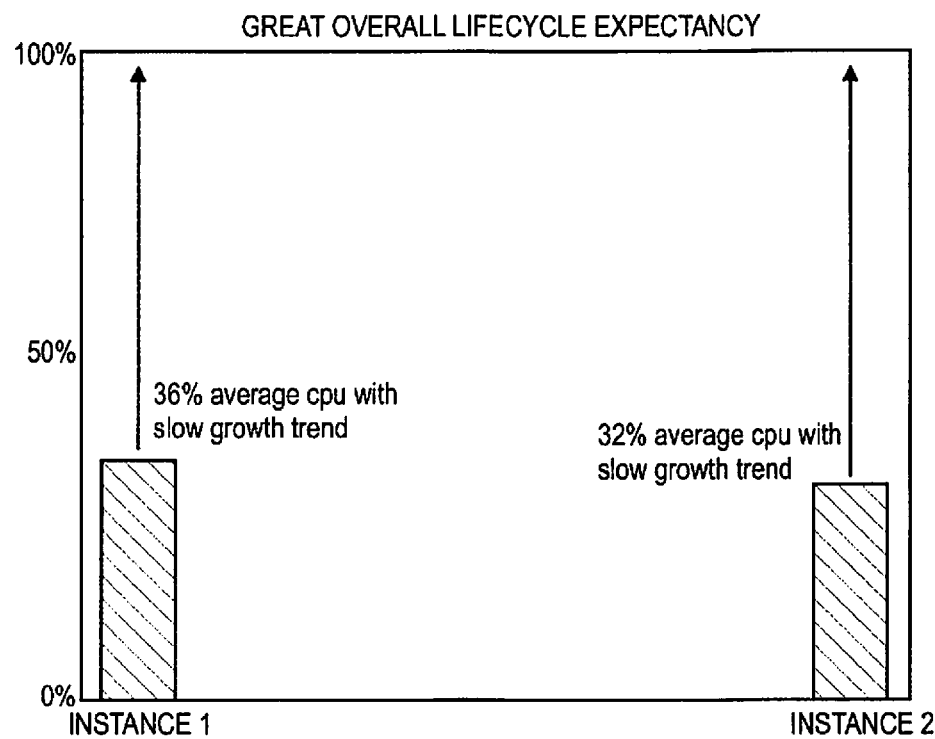
FIG. 13 shows a good overall lifecycle expectancy

Second form of the calculation comes from optimization of the lifecycle expectancy of SOURCE_INSTANCES between the TARGET_SERVERS: This can be done by calculating the maximum lifecycle expectation for desired PERFORMANCE_COUNTERS such as average cpu usage per SOURCE_INSTANCE inside the TARGET_SERVER inside PLANNING_SCENARIO and calculating which is the first PERFORMANCE_COUNTER to limit the expected lifecycle of each TARGET_SERVER. Then, by summing up these duration values on PLANNING_SCENARIO level, the largest overall duration gives us the best overall scalability in terms of lifecycle expectancy between otherwise equal PLANNING_SCENARIO TARGET_SERVER installations having same amount of TARGET_SERVERS. FIG. 12 shows a poor overall lifecycle expectancy and FIG. 13 shows a good overall lifecycle expectancy.

Figure 14:
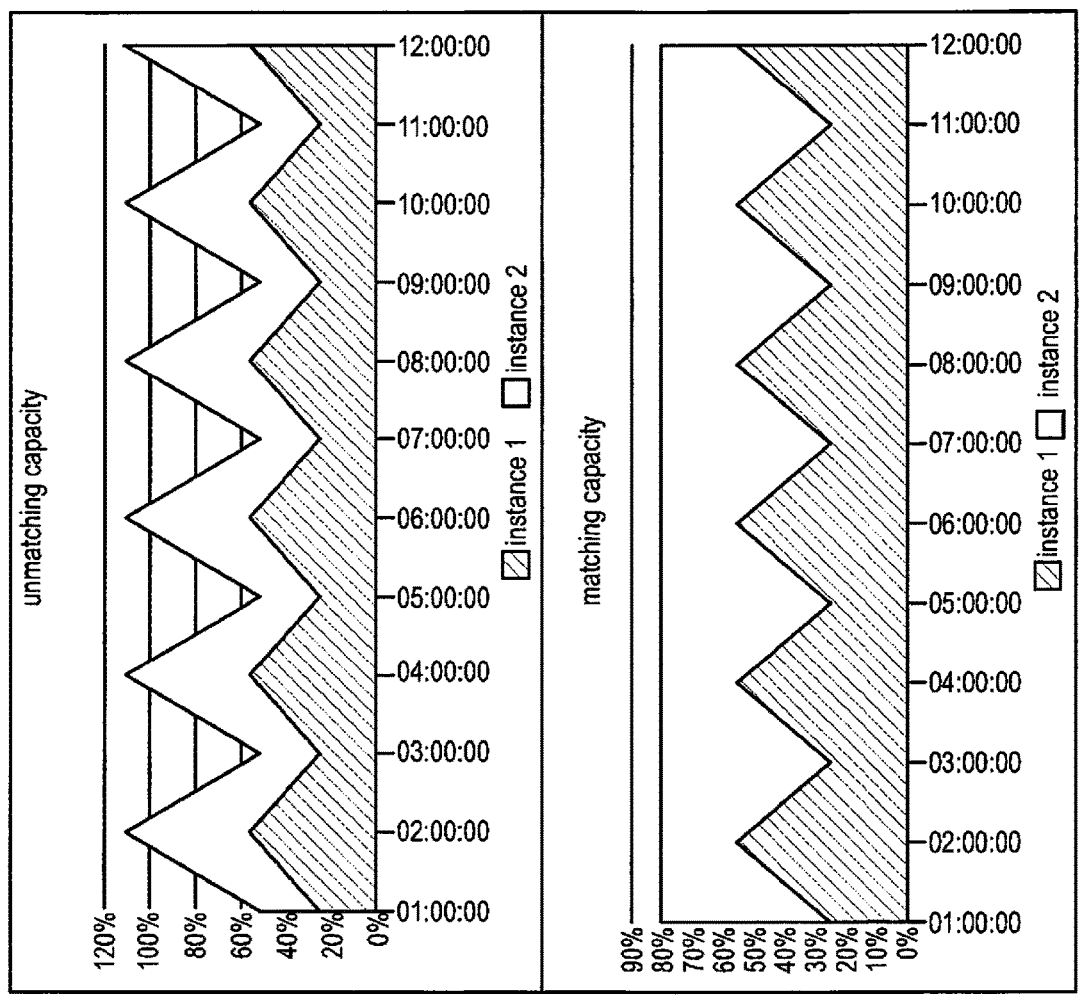
FIG. 14 shows example of unmatched and matched capacity over time

FIGS. 14 and 15 illustrate calculating scenarios of how to find the best fit for DBMS_INSTANCES IN TARGET_SERVERS.

In FIGS. 14 and 15 the very different characteristics as time series of performance data having equal averages over time is shown, in the "unmatching capacity" diagram of FIG. 14 there are two DBMS_INSTANCES which do not fit the target server capacity because they have average cpu usage peaking at the same time for over 100%. In the "matching capacity" diagram of FIG. 15 there are different peaking intervals which causes both DBMS_INSTANCES easily fit in TARGET_SERVER capacity. This is advantageous in how to save overall TARGET_SERVER capacity: To find each of those PERFORMANCE_COUNTER time series that have the least overall capacity need as parallel time series inside the TARGET_SERVERS

The invention claimed is:

1. A method performed by a computer for capacity planning of a database management system (DBMS), the method comprising:

selecting at least one resource against which a target DBMS servers system will be optimized;

selecting at least one performance counter for which a planning engine forecast is created;

collecting the performance counter monitoring data;

defining rules for each performance counter against which a predicted time series is validated;

adjusting system object constraints set to performance counters of system objects of an existing DBMS servers system and adjusting time series data of system objects of the existing DBMS servers system, wherein the adjusting time series data comprises at least adjusting time series data over a planned lifecycle of the target DBMS servers system for each performance counter based on a growth estimate calculated based on constraints or trends;

defining target DBMS servers system hardware setup with desired objects setup, preferred configurations, maximum count for each setup object type and possible processing order;

adjusting target DBMS servers system object constraints, benchmarks and time series data of the target DBMS servers system; and evaluating and comparing all needed refactored existing DBMS servers system object performance counter time series against target DBMS servers system for finding the most optimal distribution of overall capacity by harmonization of the distribution of instances installed on the existing DBMS servers system between the target DBMS servers system servers by finding performance counter time series that cause least overall capacity need as parallel time series inside the target DBMS servers system servers, so that the target DBMS servers system has minimum amount of the selected at least one resource for all the target DBMS servers system resources that meet their respective constraints.

2. The method of claim 1, wherein the selecting at least one resource comprises selecting at least one resource and/or cost-based constraint to be prioritized in calculation for against which the target DBMS servers system will be optimized to at any level of the existing DBMS servers system and/or target DBMS servers system hardware setup.

3. The method of claim 1, further comprising finding a smallest capacity of system resources to meet respective constraints.

4. The method of claim 1, further comprising setting desired target DBMS servers system minimum and maximum range constraints and any kind of object reserve and a step of creating a scenario for each desired logical combination of target DBMS servers system setups.

5. The method of claim 4, wherein a server reserve is one or more of an OS RAM reserve and/or a normed CPU ratio reserve.

6. The method of claim 1, further comprising setting desired target DBMS servers system minimum and maximum range constraints and any kind of object reserve and creating a scenario for each desired logical combination of target DBMS servers system setups according to the model data.

7. The method of claim 1, further comprising selecting at least one resource against which the target DBMS servers system will be optimized wherein, any of the prioritized resources may be bound to a certain level in hardware setup object in the existing DBMS servers system and/or in the target DBMS servers system.

8. The method of claim 1, further comprising selecting at least one resource against which the target DBMS servers system will be optimized wherein capacity planning is split into multiple solutions having their own prioritized resources which may be bound to a certain level in hardware setup object in the existing DBMS servers system and/or in the target DBMS servers system.

9. The method of claim 1, further comprising selecting at least one resource against which the target DBMS servers system will be optimized wherein if any prioritized resource is CPU, CPU benchmark-based calculation is used.

10. The method of claim 1, further comprising selecting at least one performance counter for which a planning engine forecast is created, wherein if any CPU related performance counter is used, CPU benchmark-based calculation is used.

11. The method of claim 1, further comprising setting desired target DBMS minimum and maximum range constraints and optionally a server reserve and creating a scenario for each desired logical combination of target DBMS servers system setups.

12. The method of claim 1, further comprising setting desired target DBMS servers system minimum and maximum range constraints and optionally a server reserve and creating a scenario for each desired logical combination of target DBMS servers system setups according to the model data.

13. The method of claim 1, further comprising defining rules for each performance counter against which a predicted time series is validated, wherein aggregation-based and/or constraint including sla-based rules for any performance counter time series are defined.

14. The method of claim 1, further comprising adjusting existing DBMS servers system object constraints and time series data, wherein time series is adjusted against aggregation-based and/or constraint including sla-based rules for any performance counter.

15. The method of claim 1, further comprising adjusting existing DBMS servers system object constraints and time series data, wherein time series is adjusted against trend-based calculation for any performance counter.

16. The method of claim 1, further comprising adjusting existing DBMS servers system object constraints and time series data, wherein CPU-benchmark based calculation may be used.

17. The method of claim 1, further comprising evaluating and comparing all needed refactored existing DBMS servers system object performance counter time series against target DBMS servers system, wherein CPU-benchmark based calculation may be used with any server setup and/or virtual server setup parameters.

18. A computer-readable medium having stored thereon a computer program that when run on a computer implements the method according to claim 1.

* * * * *